US006952204B2

(12) United States Patent
Baumberg et al.

(10) Patent No.: US 6,952,204 B2
(45) Date of Patent: Oct. 4, 2005

(54) 3D COMPUTER MODELLING APPARATUS

(75) Inventors: Adam Michael Baumberg, Berkshire (GB); Alexander Ralph Lyons, Berkshire (GB); Aaron William Christopher Kotcheff, London (GB)

(73) Assignee: Canon Kabushiki Kaisha, Tokyo (JP)

( * ) Notice: Subject to any disclaimer, the term of this patent is extended or adjusted under 35 U.S.C. 154(b) by 421 days.

(21) Appl. No.: 10/164,562

(22) Filed: Jun. 10, 2002

(65) Prior Publication Data

US 2002/0186216 A1 Dec. 12, 2002

(30) Foreign Application Priority Data

Jun. 11, 2001 (GB) ............................................. 0114158

(51) Int. Cl.[7] .......................................... G06T 15/00
(52) U.S. Cl. .................................................... 345/420
(58) Field of Search ................................. 345/419, 420, 345/421, 422, 619, 629

(56) References Cited

U.S. PATENT DOCUMENTS

| 6,016,150 | A | * | 1/2000 | Lengyel et al. ............. 345/426 |
| 6,064,393 | A | * | 5/2000 | Lengyel et al. ............. 345/427 |
| 6,704,018 | B1 | * | 3/2004 | Mori et al. .................. 345/502 |
| 2001/0056308 | A1 | | 12/2001 | Petrov et al. .................. 700/98 |
| 2002/0050988 | A1 | | 5/2002 | Petrov et al. ............... 345/418 |

FOREIGN PATENT DOCUMENTS

| EP | 0 898 245 A1 | 2/1999 |
| JP | 09-170914 A | 6/1997 |
| WO | WO-A-01/39124 | 5/2001 |

OTHER PUBLICATIONS

Leung, M.K. et al., "*Dynamic Strip Algorithm in Curve Fitting,*" Computer Vision, Graphics and Image Processing 51(2), pp. 146–165 (Aug. 1990).

Hartley, R.I., "*Euclidean Reconstruction from Uncalibrated Views,*" Applications of Invariance in Computer Vision (Azores 1993), pp. 237–256, Mundy, Zisserman and Forsyth eds.

Kobbelt, L.P., et al., "*Feature Sensitive Surface Extraction From Volume Data,*" ACM SIGRAPH Computer Graphics, Annual Conference Series (2001), pp. 57–66.

Potmesil, M., "*Generating Octree Models of 3D Objects From Their Silhousttes in a Sequence of Images,*" Graphics and Image Processing 40 (1987), pp. 1–29.

Prasad, M., "*Intersection of Line Segments,*" GRAPHICS GEMS II, Section 1.2 (1991), pp. 7–9, ISBN 0–12–064481–9.

(Continued)

*Primary Examiner*—Phu K. Nguyen
(74) *Attorney, Agent, or Firm*—Fitzpatrick, Cella, Harper & Scinto

(57) ABSTRACT

In a computer processing apparatus 3002, a number of depth maps 3200–3270 of a subject object 3300 are processed to generate a 3D computer model of the subject object. The points in each depth map are connected to give a 2D mesh, and each 2D mesh is then projected into 3D space in dependence upon the depths of the points in the mesh, thereby giving a 3D mesh 3610. Side faces for each edge of the 3D mesh are added extending away from the depth map, thereby generating a respective polyhedron 3600 for each depth map. The 3D computer model of the subject object is generated by calculating the intersections of the polyhedra.

25 Claims, 37 Drawing Sheets

OTHER PUBLICATIONS

Weiler, K., "An Incremental Angle Point in Polygon Test," GRAPHICS GEMS IV, Section 1.3 (1994), pp. 16–46, ISBN 0–12–336155–9.

Green, D., et al., "Fast Polygon–Cube Intersection Testing," GRAPHICS GEMS V, Section VII.2 (1995), pp. 375–379, ISBN 0–12–543455–3.

Matusik, W., et al., "Image–Based Visual Hulls," ACM SIGGRAPH, Computer Graphics, Annual Conference Series (2000), pp. 369–374.

Szeliski, R., "Rapid Octree Construction From Image Sequences," Image Understanding (1993), vol. 58, No. 1, pp. 23–32.

Gortler, S., et al., "The Lumigraph," Computer Graphics Proceedings, Annual Conference Series (1996), ACM–0–89791–746–4/96/008, pp. 43–52.

Laurentini, A., "The Visual Hull Concept for Silhouette–Based Image Understanding," IEEE Transactions on Pattern Analysis and Machine Intelligence (PAMI), vol. 16, No. 2 (1994), pp. 150–162.

Vaillant, R., et al., "Using Extremal Boundaries For 3–D Object Modeling," IEEE Transactions on Pattern Analysis and Machine Intelligence (PAMI), vol. 14, No. 2 (1992), pp. 157–173.

Turk, G., et al., "Zippered Polygon Meshes From Range Images," ACM SIGGRAPH 94, Addison–Wesley, ISBN 0–201–60795–6.

Okutomi, M., et al., "A Multiple–Baseline Stereo," IEEE Transactions on Pattern Analysis and Machine Intelligence, vol. 15, No. 4 (Apr. 1993), pp. 353–363.

Szilvási–Nagy, M., "An Algorithm for Determining the Intersection of Two Simple Polyhedra," North–Holland Computer Graphics Forum 3 (1984), pp. 219–225.

Niem, W., "Automatic Reconstruction of 3D Objects Using a Mobile Camera," Image and Vision Computing 17 (1999), pp. 125–134.

Niem, W., et al., "Automatic Reconstruction of 3D Objects Using a Mobile Monoscopic Camera," Institut für Theoretische Nachrichtentechnik und Informationsverarbeitung, Hannover, IEEE 0–8186–7943–3/97, Image and Vision Computing 17 (1999), pp. 173–180.

Löhlein, M., Diplomarbeit, "A Volumetric Intersection Algorithm for 3d–Reconstruction Using a Boundary–Representation," Okt. 1998, at http://i31www.ira.uka.de/diplomarbeiten/da_martin_loehlein/Reconstruction.html.

Smith, A.R., et al., "Blue Screen Matting," ACM SIGGRAPH Computer Graphics, Annual Conference Series (1996), pp. 259–268.

Wheeler, M., et al., "Consensus Surfaces for Modeling 3D Objects from Multiple Range Images," Proceedings of International Conferences on Computer Vision (1998), pp. 917–924, published by Narosa, ISBN 81–7319–221–9.

Illingworth, J., et al., "Looking to Build a Model World: Automatic Construction of Static Object Models Using Computer Vision," Electronics & Communication Engineering Journal (Jun. 1998), pp. 103–113.

Lorensen, W., et al., "Marching Cubes: A High Resolution 3D Surface Construction Algorithm," ACM SIGGRAPH Computer Graphics, Annual Conference Series (1987), pp. 163–169.

Hoppe, H., et al., "Mesh Optimization," ACM SIGGRAPH 93, Addison–Wesley, ISBN 0–201–58889–7, pp. 19–26.

Woo, M., et al., "Tessellators and Quadrics," Open GL Programming Guide 2nd Edition, Chapter 11, ISBN 0–201–46138–2.

Seitz, S., et al., "Photorealistic Scene Reconstruction by Voxel Coloring," CVPR (1997), pp. 1067–1073.

Seitz, S., et al., "Photorealistic Scene Reconstruction by Voxel Coloring," Internatinal Journal of Computer Vision (1999), vol. 35, No. 2, pp. 1–32.

Matsusik, W., et al., "Polyhedral Visual Hulls For Real–Time Rendering," Proceedings of 12th Eurographics Workshop on Rendering (Jun. 2001), London, England, pp. 115–125.

* cited by examiner

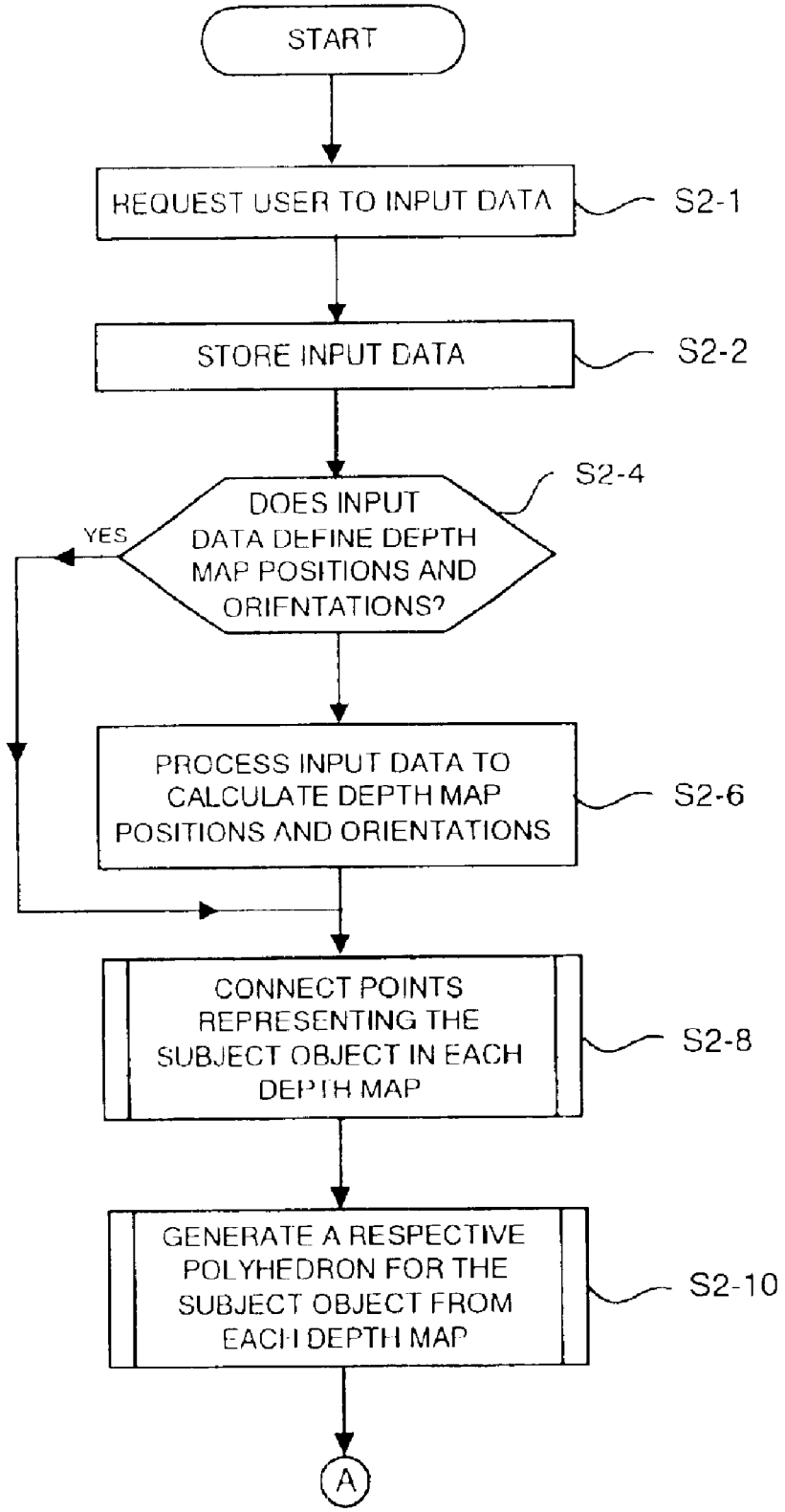

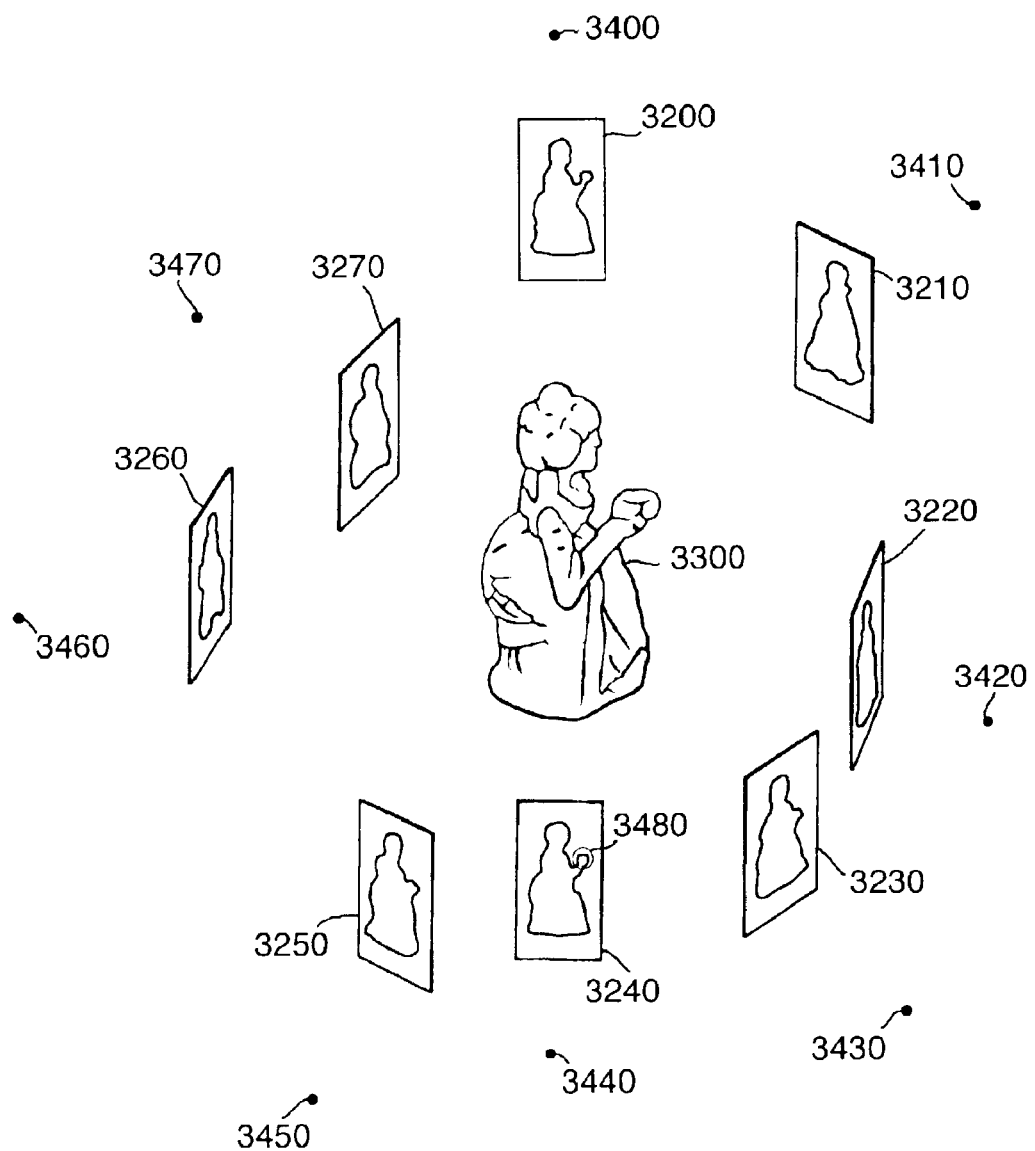

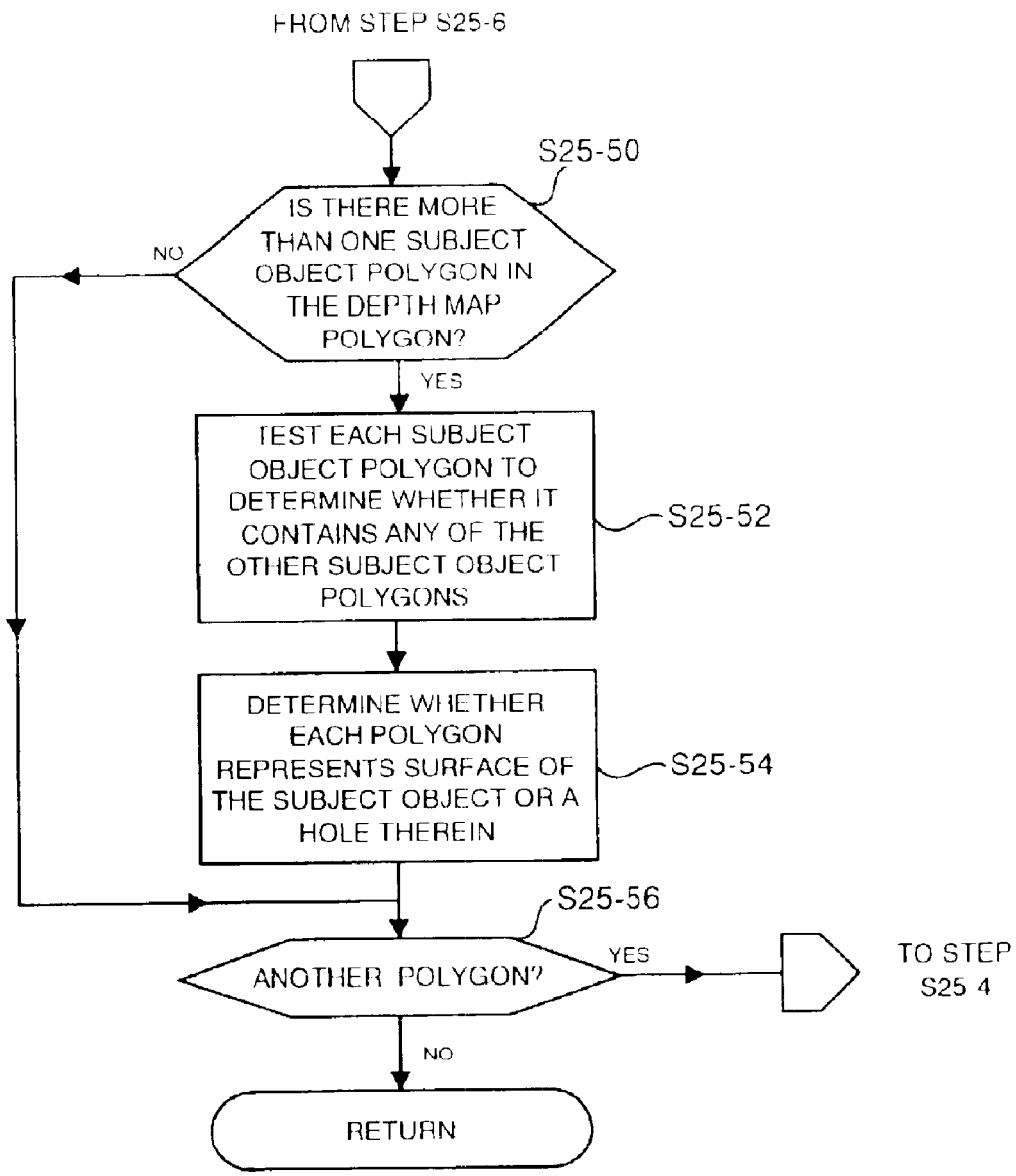

3D COMPUTER MODELLING APPARATUS

The present invention relates to computer processing to generate a three-dimensional (3D) computer model of an object from a plurality of depth maps (that is, a set of values defining distances of points on the object from a reference point).

A number of methods are known in the prior art for generating a 3D computer model of an object starting with a plurality of depth maps (sometimes referred to as "range images") of the object.

In these known methods, the data from all of the depth maps is placed in the same coordinate system, and the 3D points defined by each depth map are connected to form a plurality of 3D surface meshes, one for each depth map. The separate surface meshes are then combined into a single surface representing the surface of the object using one of two types of method, namely:

(1) The individual surface meshes are "zipped" together if they are sufficiently close in 3D space, for example as described in "Zippered Polygon Meshes from Range Images" by Turk and Levoy in SIGGRAPH 94 (ACM), published by Addison-Wesley, ISBN 0-201-60795-6.
(2) A "marching-cubes" volume-based approach is used. In this method, the 3D space of the coordinate system is divided into voxels (cuboids), and a "signed distance" is calculated for each voxel defining the distance from at least one point in the voxel (such as each of its vertices or its centre) to the nearest 3D point from a depth map and whether it is inside (negative value), outside (positive value) or on (zero value) the object's surface. A surface mesh of connected polygons is then generated by "marching" around the voxels calculating the way in which the zero value surface must pass through the voxels based on the signed distance values previously calculated. Such a technique is described, for example, in "Consensus Surfaces for Modelling 3D Objects from Multiple Range Images" by Wheeler et al in Proceedings of International Conference on Computer Vision 1998, pages 917–924, published by Narosa, ISBN 81-7319-221-9.

Both of these methods suffer from a number of problems, however.

More particularly, the "mesh zippering" method suffers from the problem that it requires considerable processing resources and processing time, and also produces a surface which does not accurately represent the surface of the subject object.

The marching-cubes voxel-based approach suffers from the problem that the accuracy (resolution) of the resulting surface representing the object is determined by the size of the voxels into which the 3D space is divided. However, reducing the size of the voxels to increase the model resolution significantly increases the number of voxels needing to be tested, resulting in long processing times.

Both the mesh zippering and the marching-cubes voxel-based approach require the points in a depth map relating to the subject object to be identified from other points (for example representing surfaces behind the object or the surface on which the object is standing). However, methods to distinguish between points representing the object being modelled and other points often result in points being misclassified, causing the final 3D computer model to be inaccurate. For example, in one method, an "arbitrary" maximum depth change is used to identify sudden changes in depth where an edge of the object occurs. However, this can result in many points being misclassified because many objects have surfaces with sudden changes of depth.

The present invention has been made with the above problems in mind, and aims to address one or more of the problems.

According to the present invention, there is provided a computer processing apparatus and method, in which a 3D computer model of a subject object is generated by converting each of a number of depth maps of the subject object into a respective polyhedron and calculating the intersections of the polyhedra.

Preferably, each polyhedron is generated by connecting points in a depth map to give a 2D polygon mesh, and projecting the 2D mesh into three-dimensional space to give a 3D mesh in dependence upon the known depths of the points in the mesh. A respective side face for each edge of the 3D mesh may be added extending away from the depth map to an arbitrary large distance.

In this way, the outline shape (silhouette) of the subject object can be combined with the depth data to generate each respective polyhedron.

Because the method intersects volumes, it is not necessary to segment each depth map to identify points relating to the subject object and points relating to other objects.

The method results in a 3D model comprising the points of intersection of the polyhedra. Accordingly, it is not necessary to use any voxel-based technique.

The present invention also provides a computer program product, embodied for example as a storage device or signal, including instructions for causing a programmable processing apparatus to become operable to perform a method as set out above or to become configured as an apparatus as set out above.

Embodiments of the invention will now be described, by way of example only, with reference to the accompanying drawings in which:

FIG. 1 schematically shows the components of a first embodiment of the invention, together with the notional functional processing units into which the processing apparatus component may be thought of as being configured when programmed by programming instructions;

FIG. 2, comprising FIGS. 2a and 2b, shows the processing operations performed by the processing apparatus in FIG. 1 to process input data in the first embodiment;

FIG. 3 shows an example to illustrate depth maps and their positions and orientations defined in the input data stored at step S2-2 in FIG. 2;

Figure 2B:
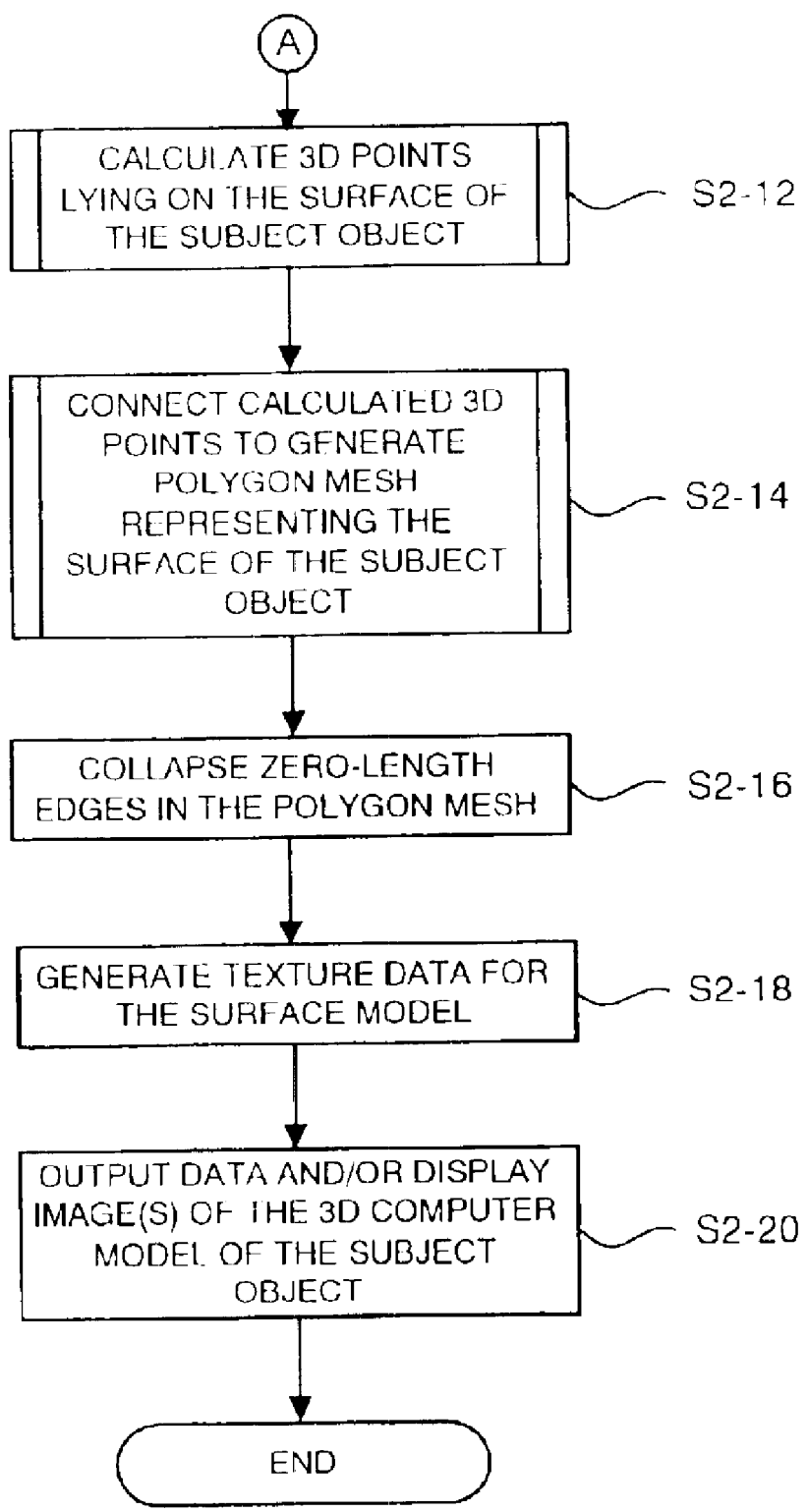
Figure 8A:
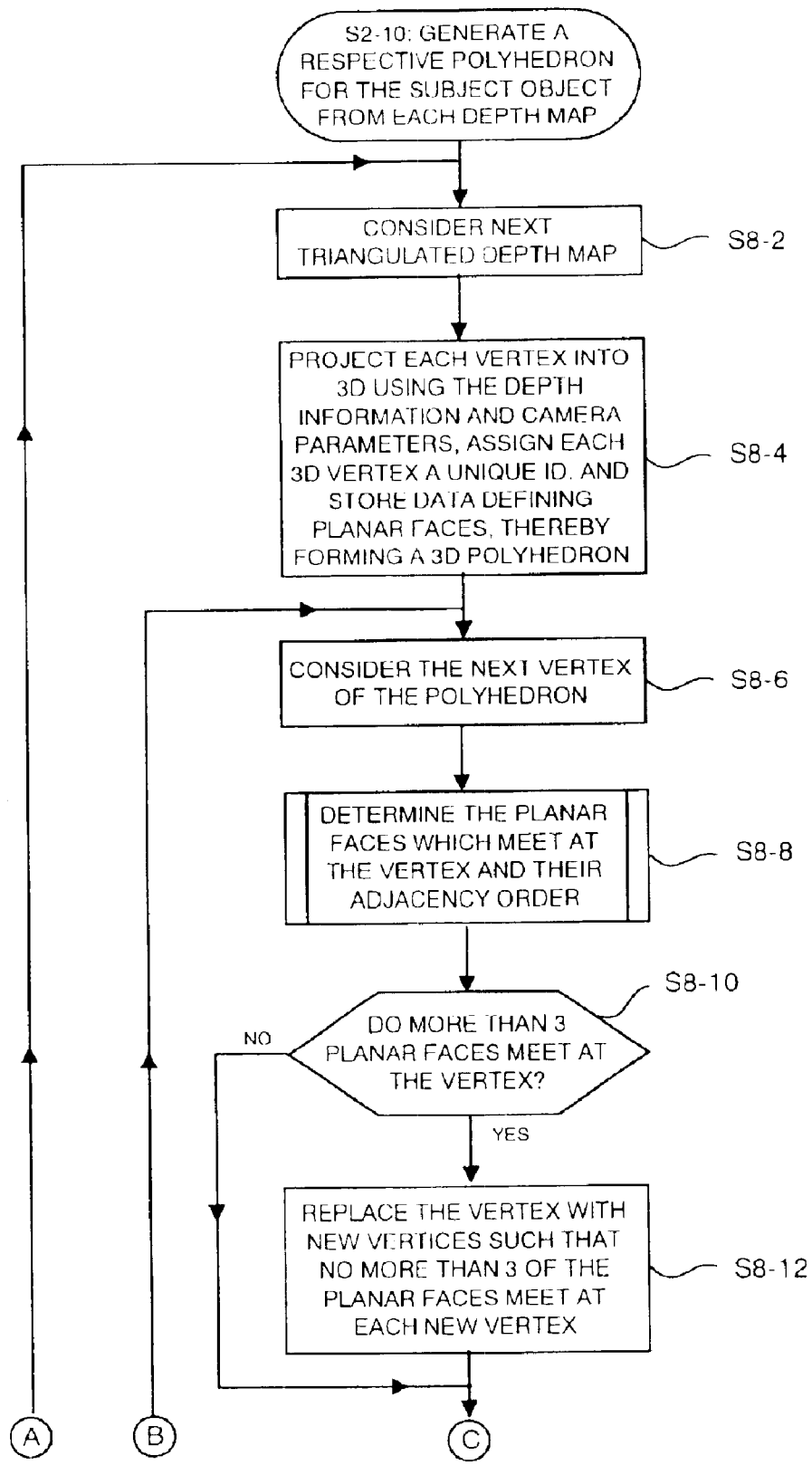
Figure 8B:
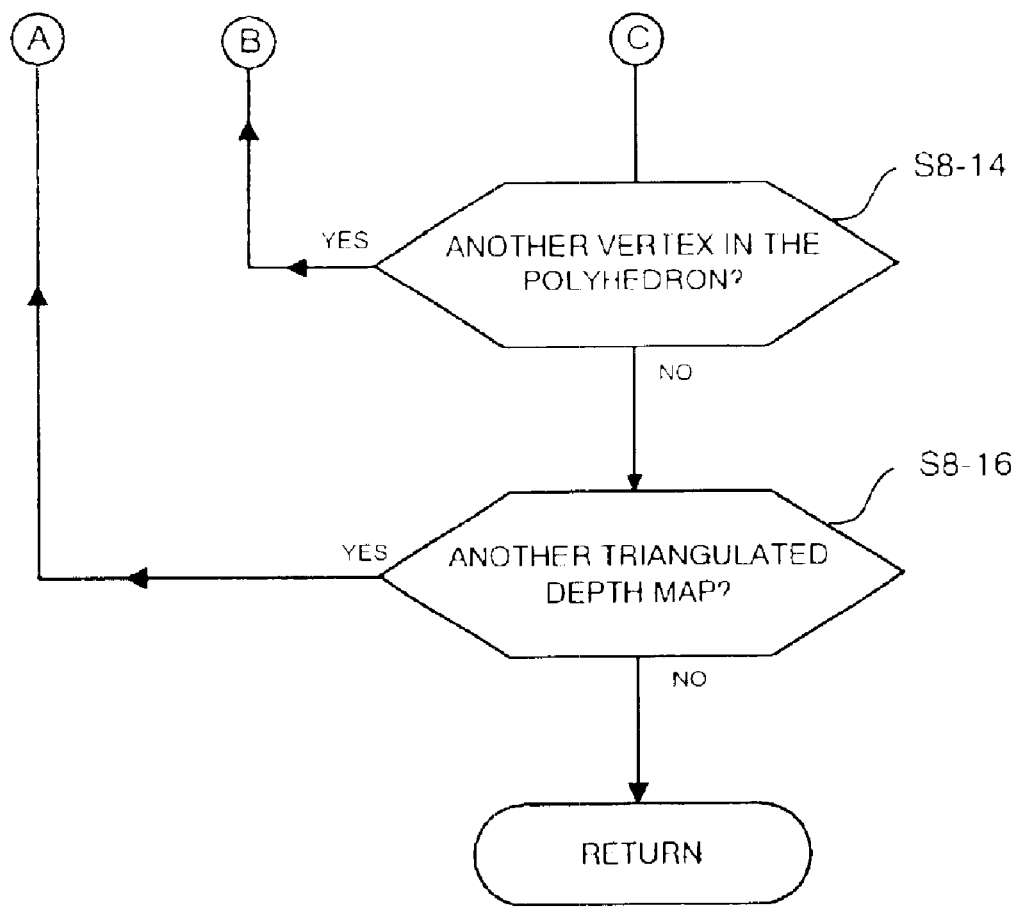
Figure 9A:
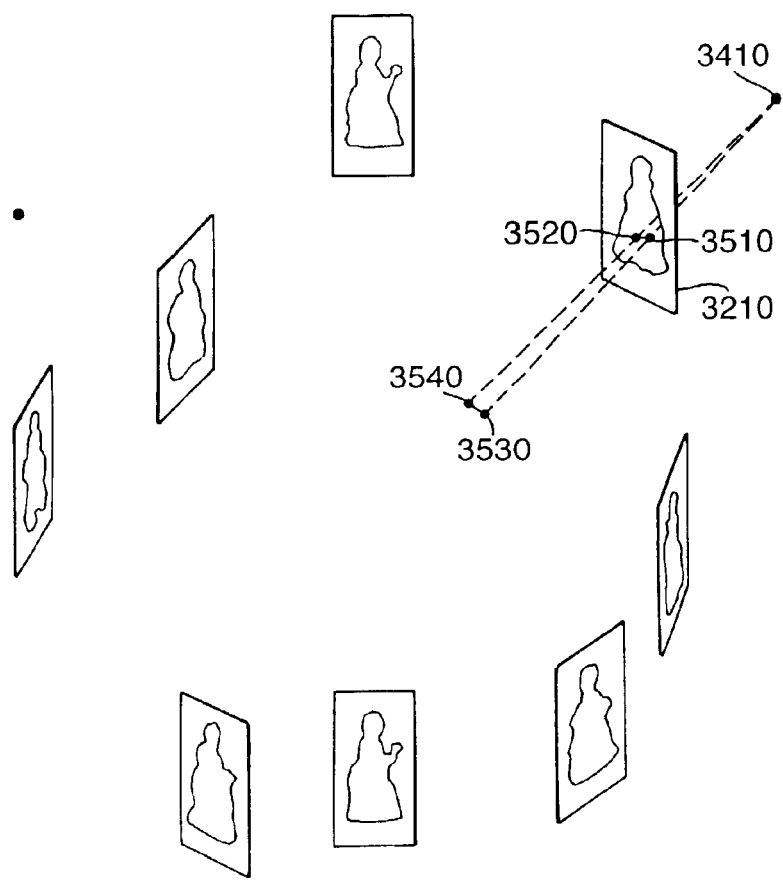
Figure 9B:
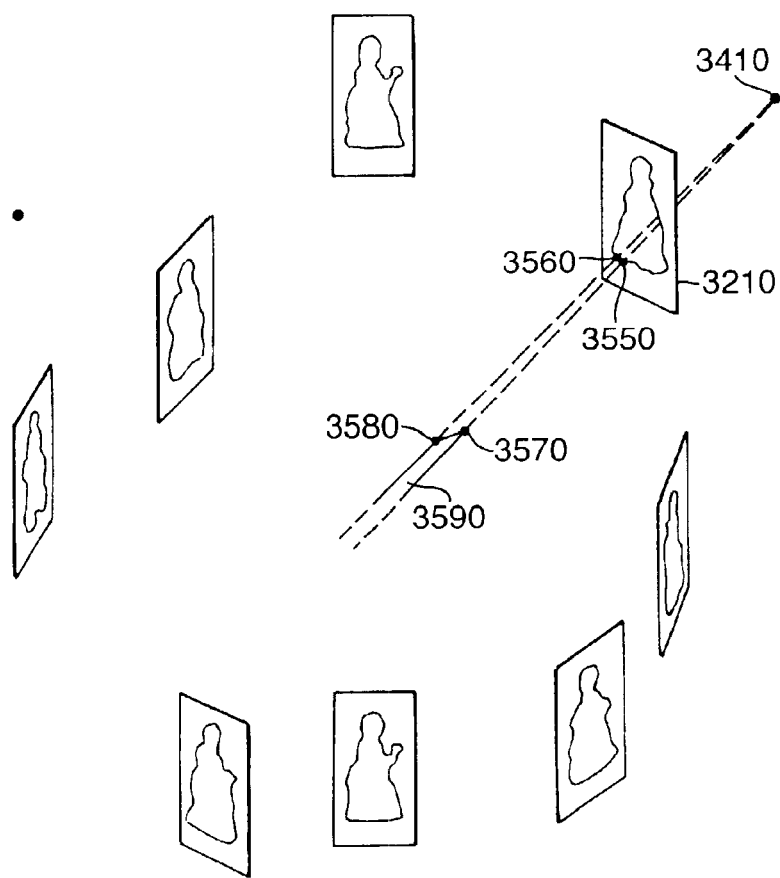
Figure 9C:
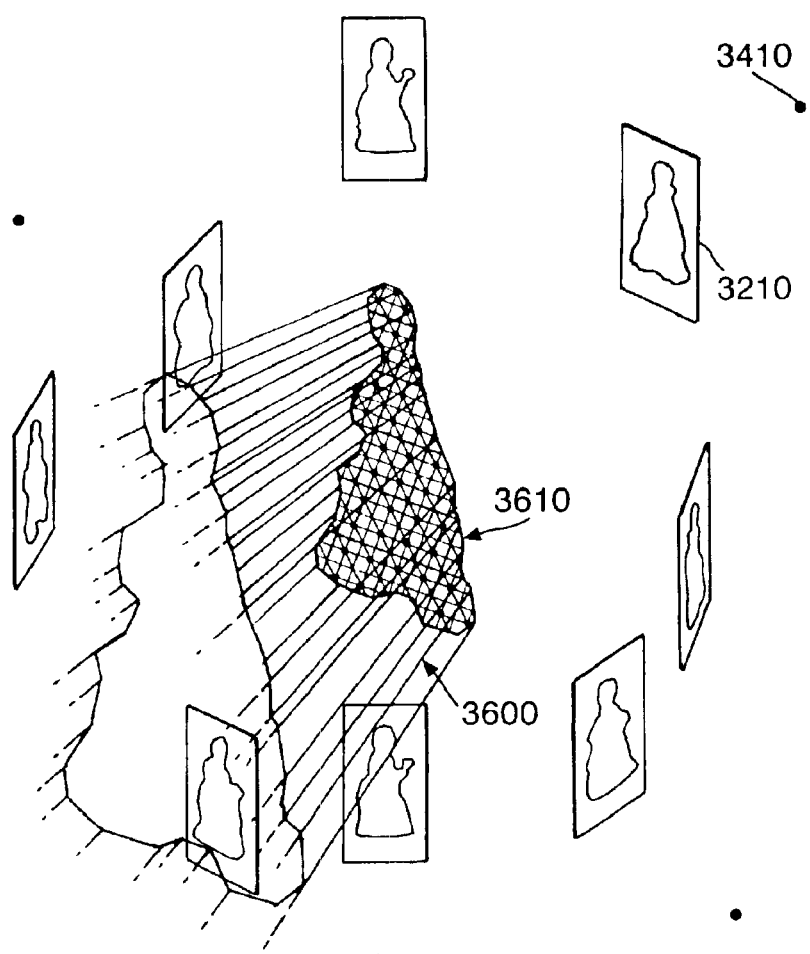
Figure 10:
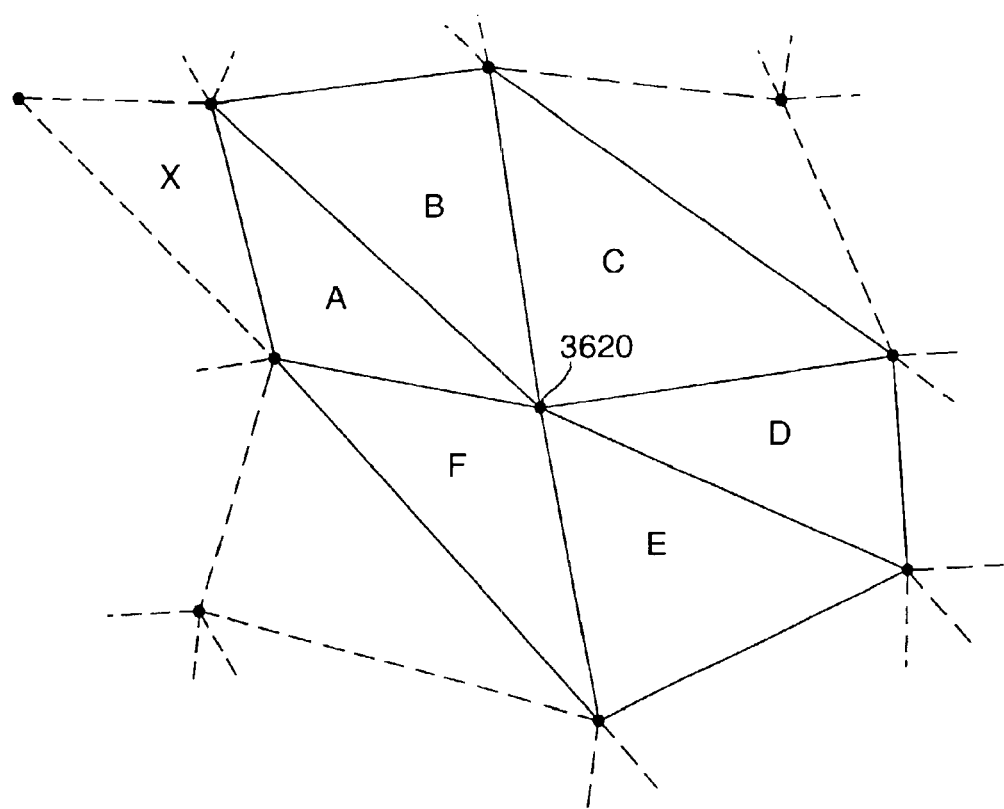
Figure 11:
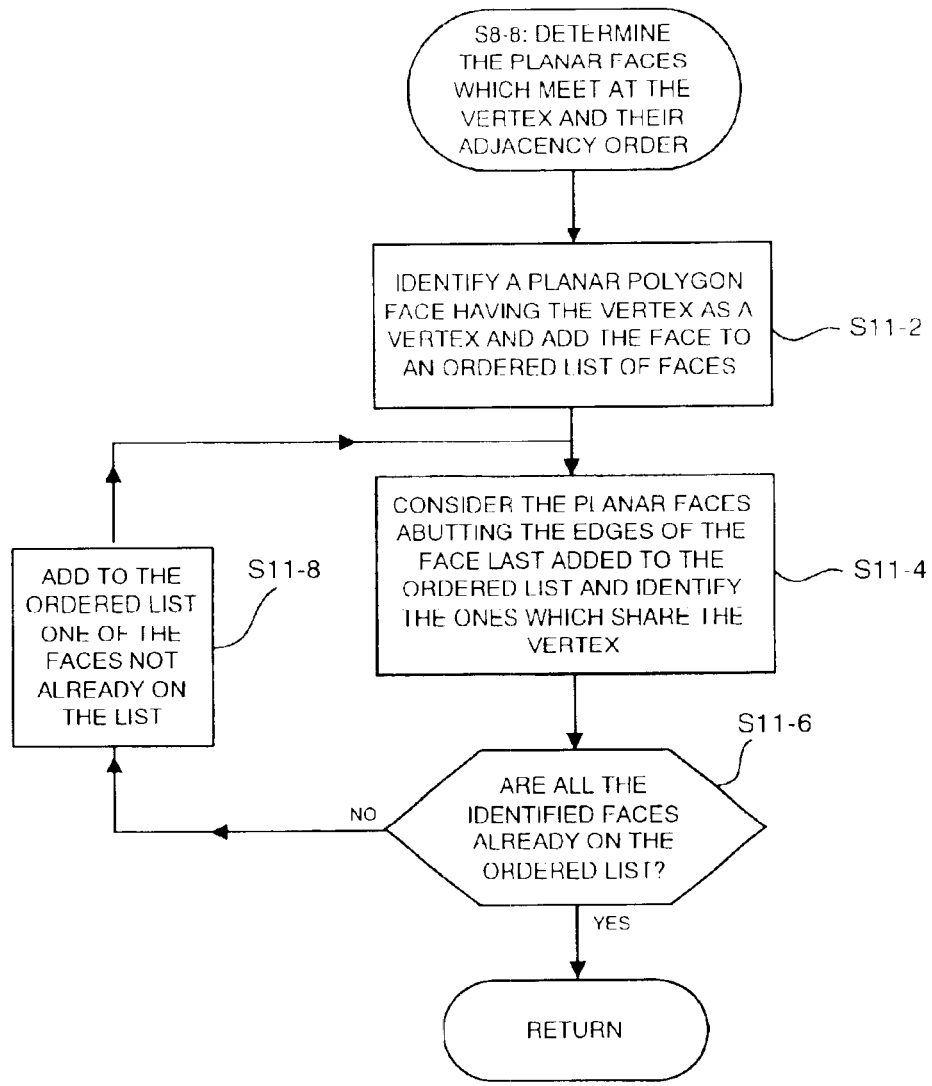
Figure 12:
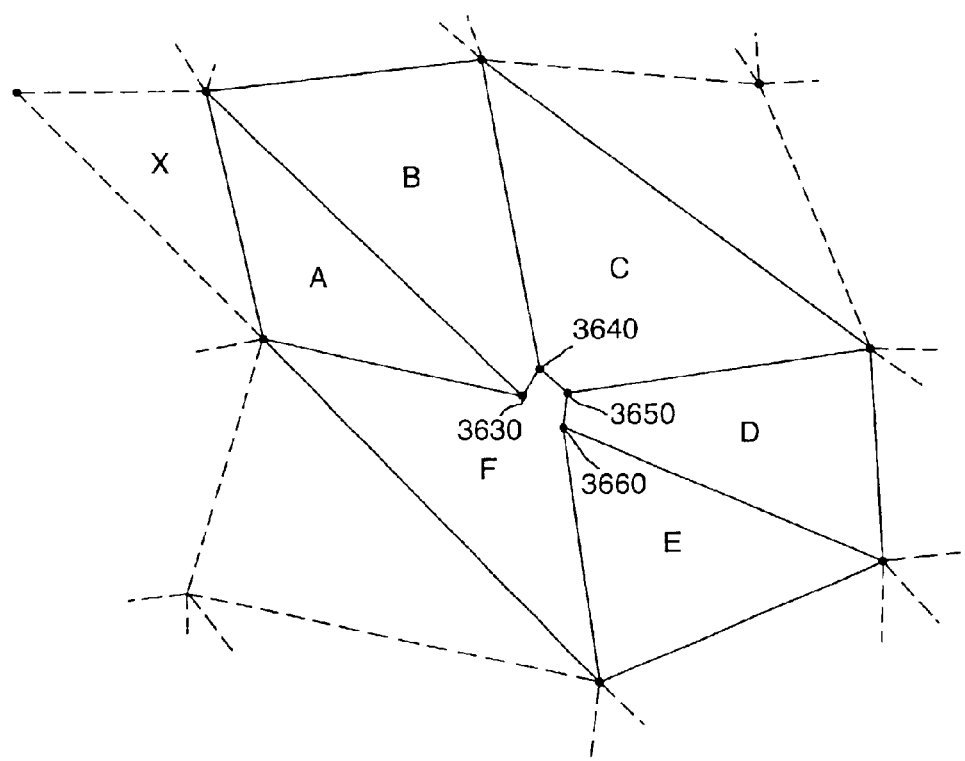
Figure 13:
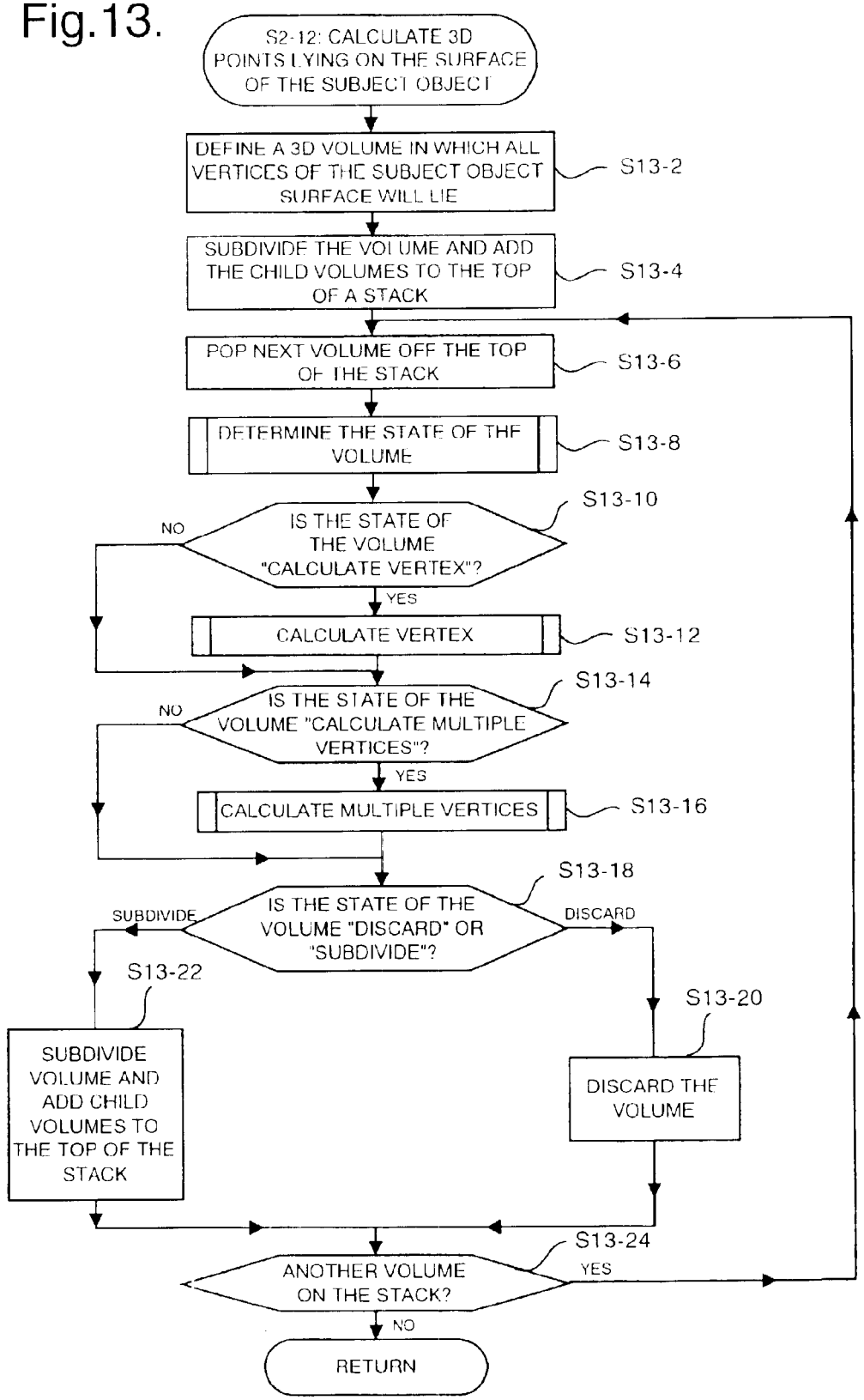
Figure 14A:
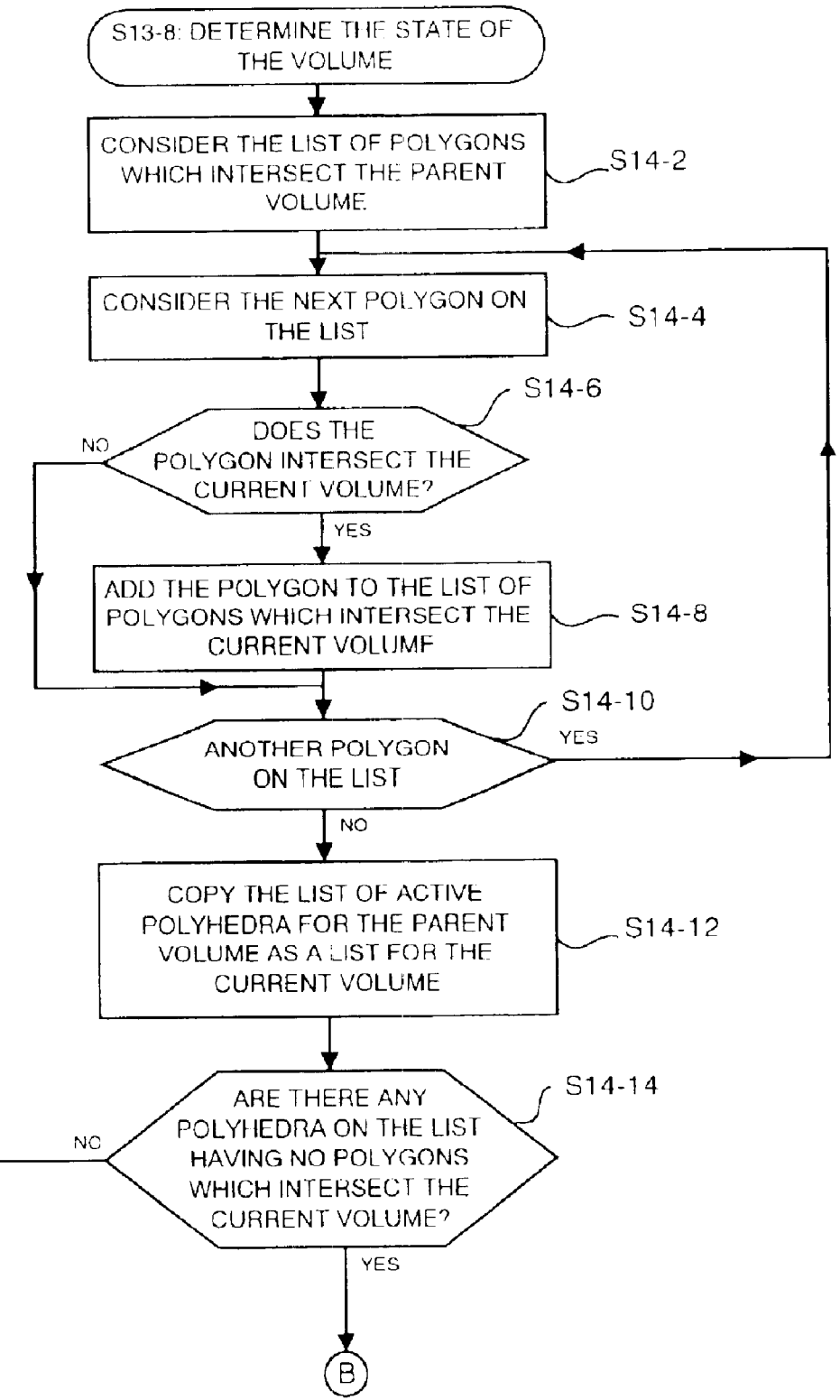
Figure 14B:
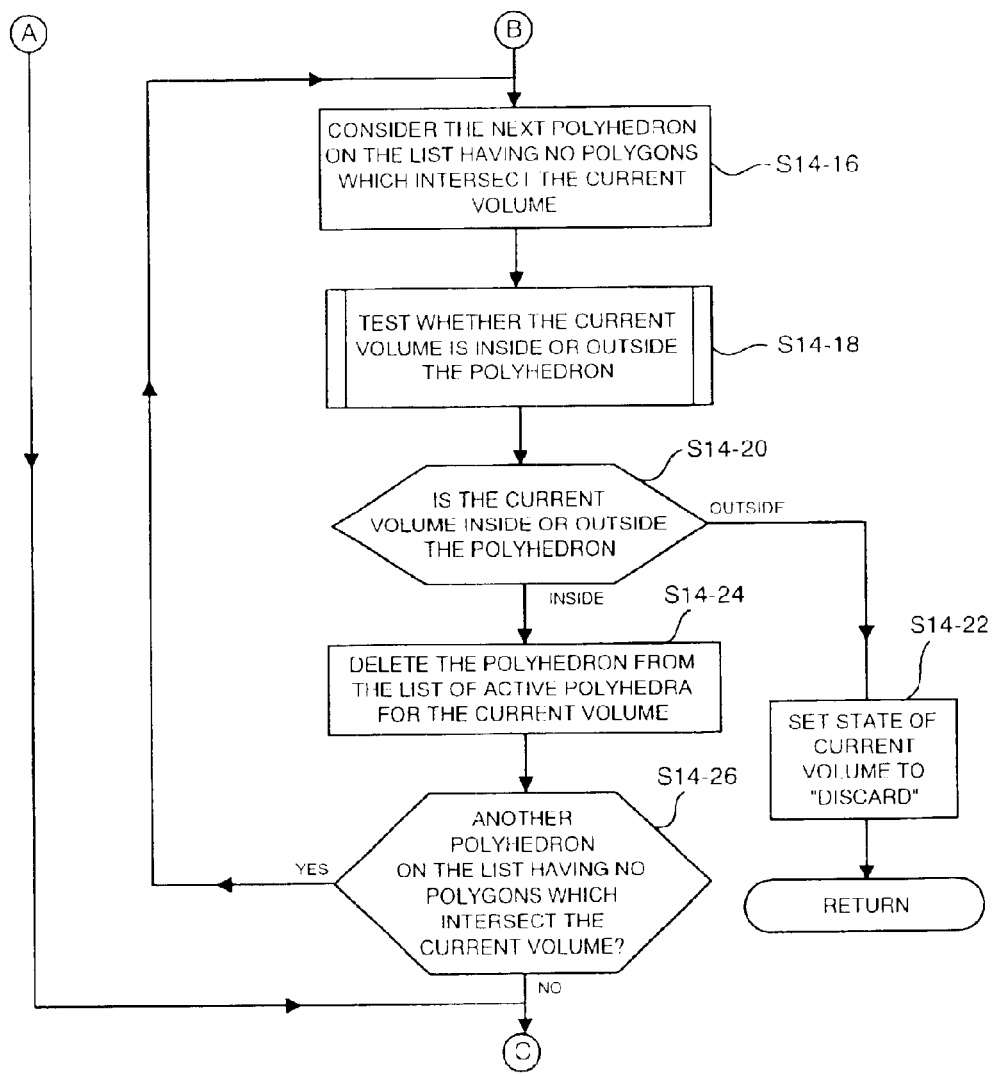
Figure 14C:
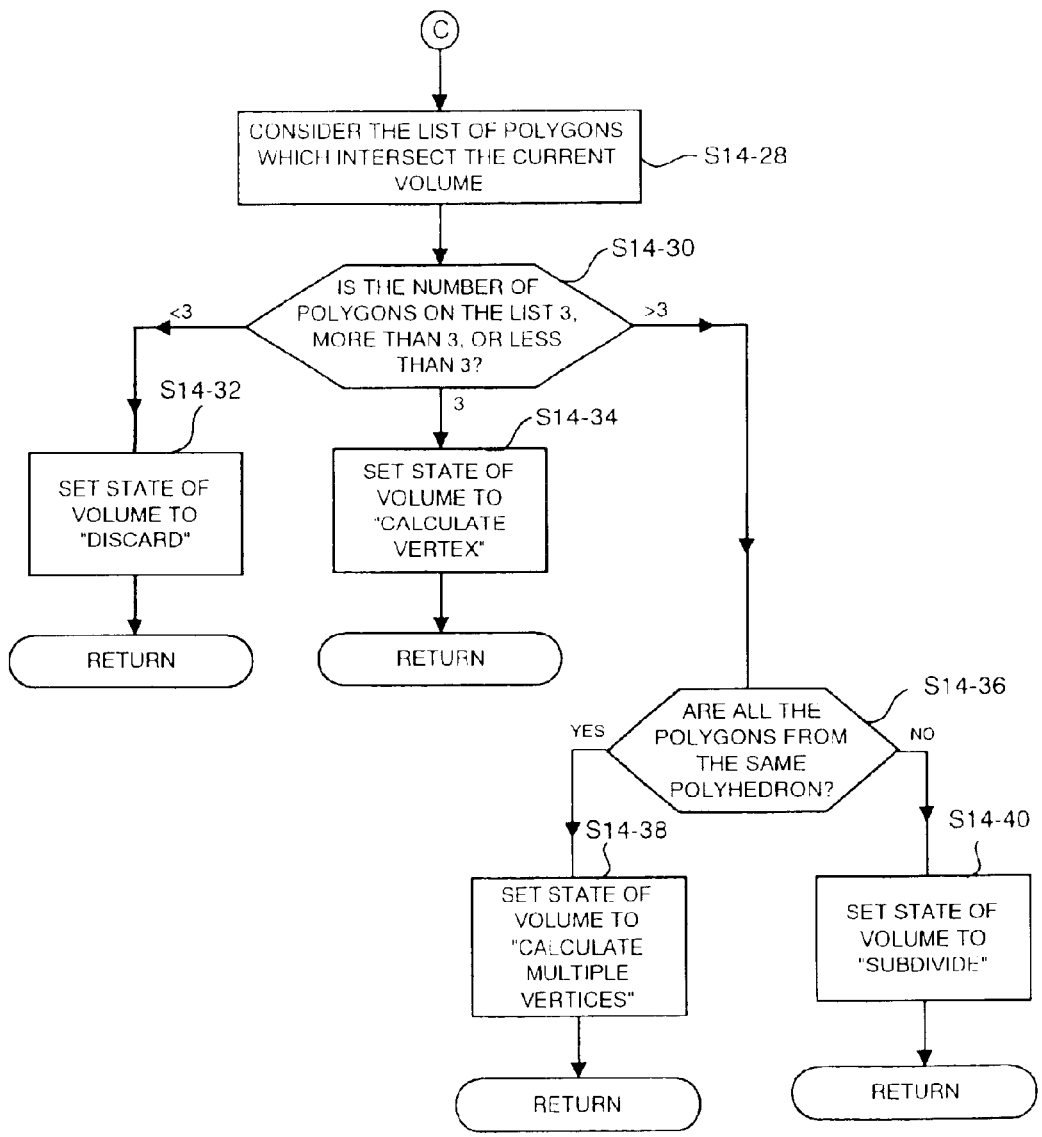
Figure 15:
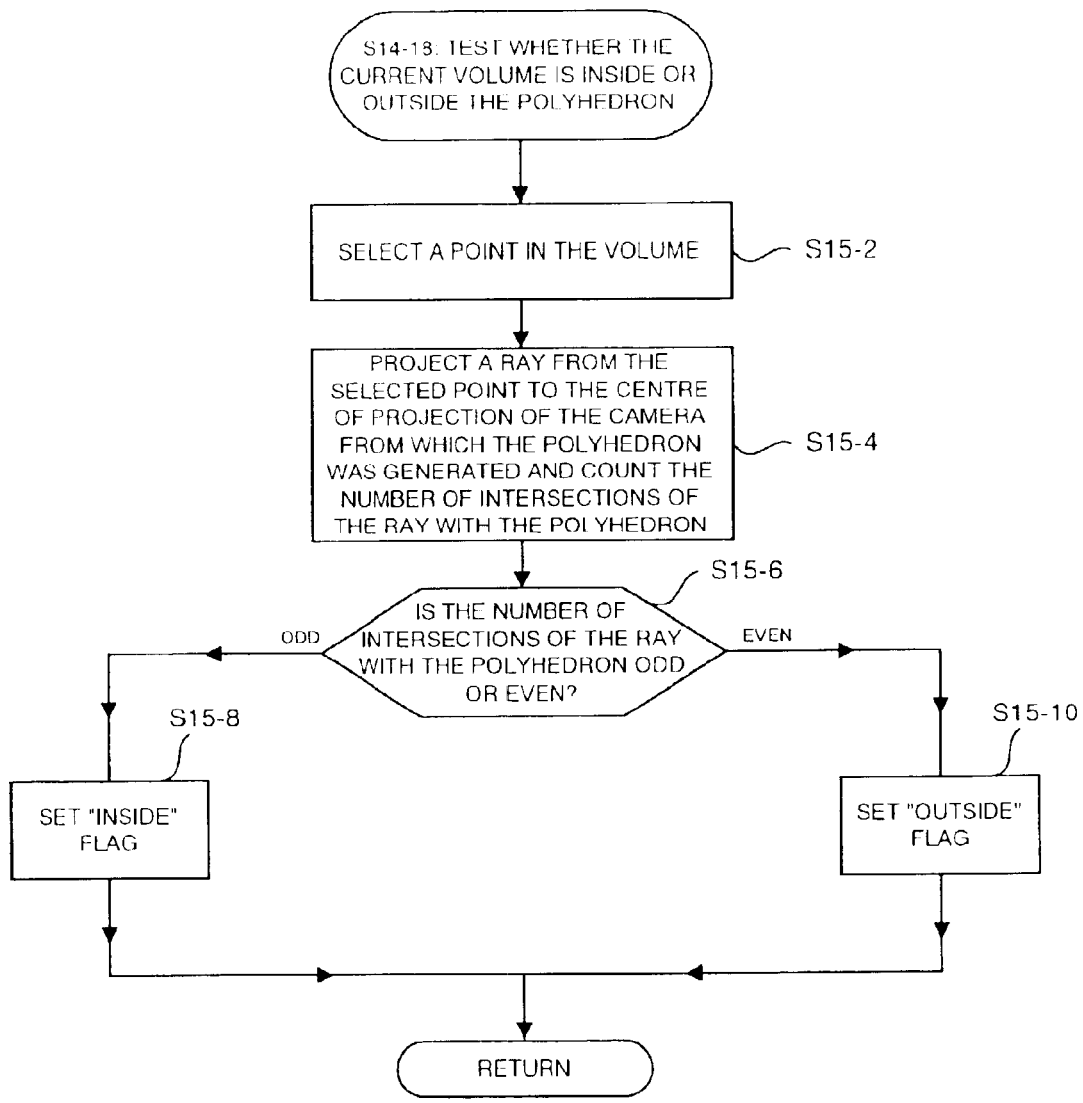
Figure 16A:
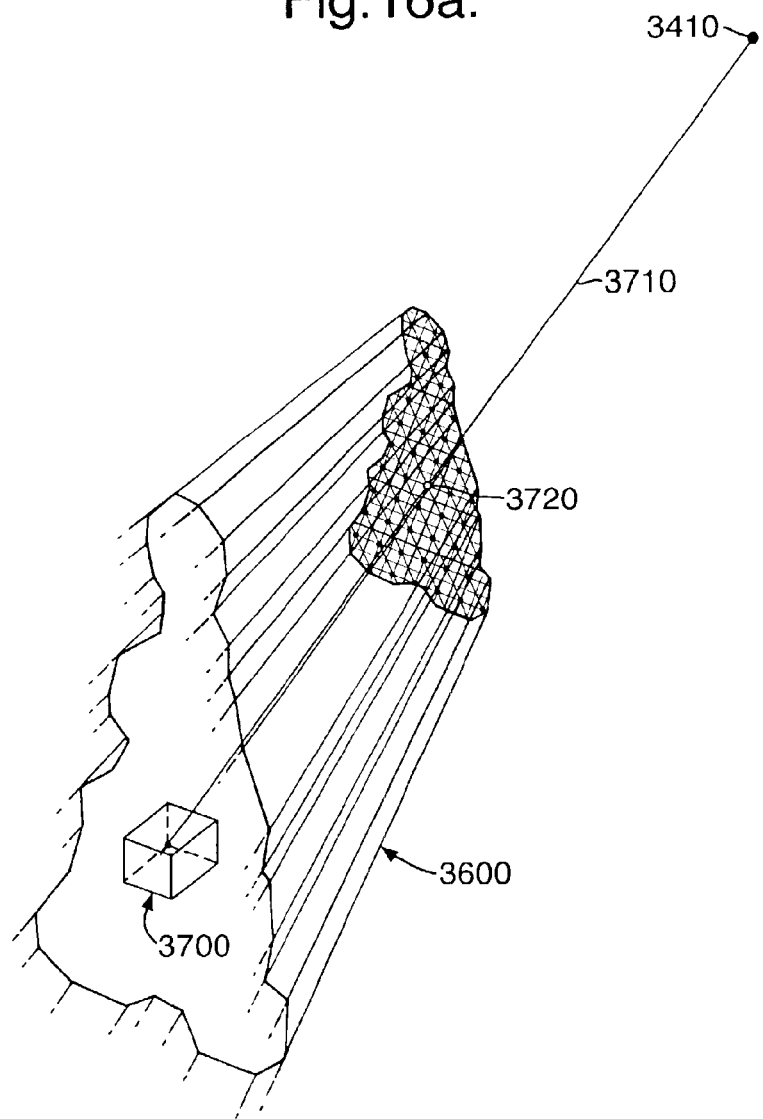
Figure 16B:
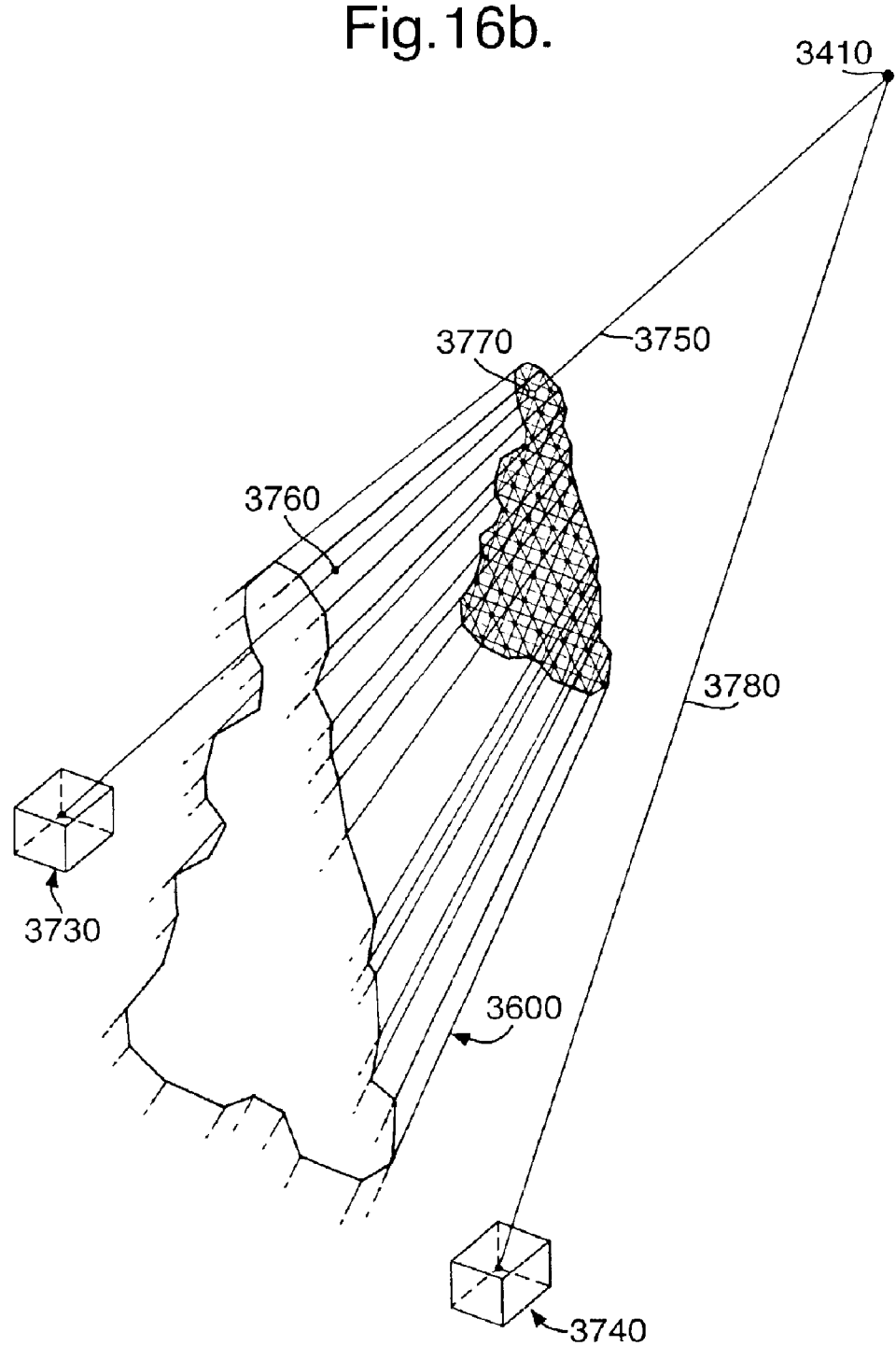
Figure 17:
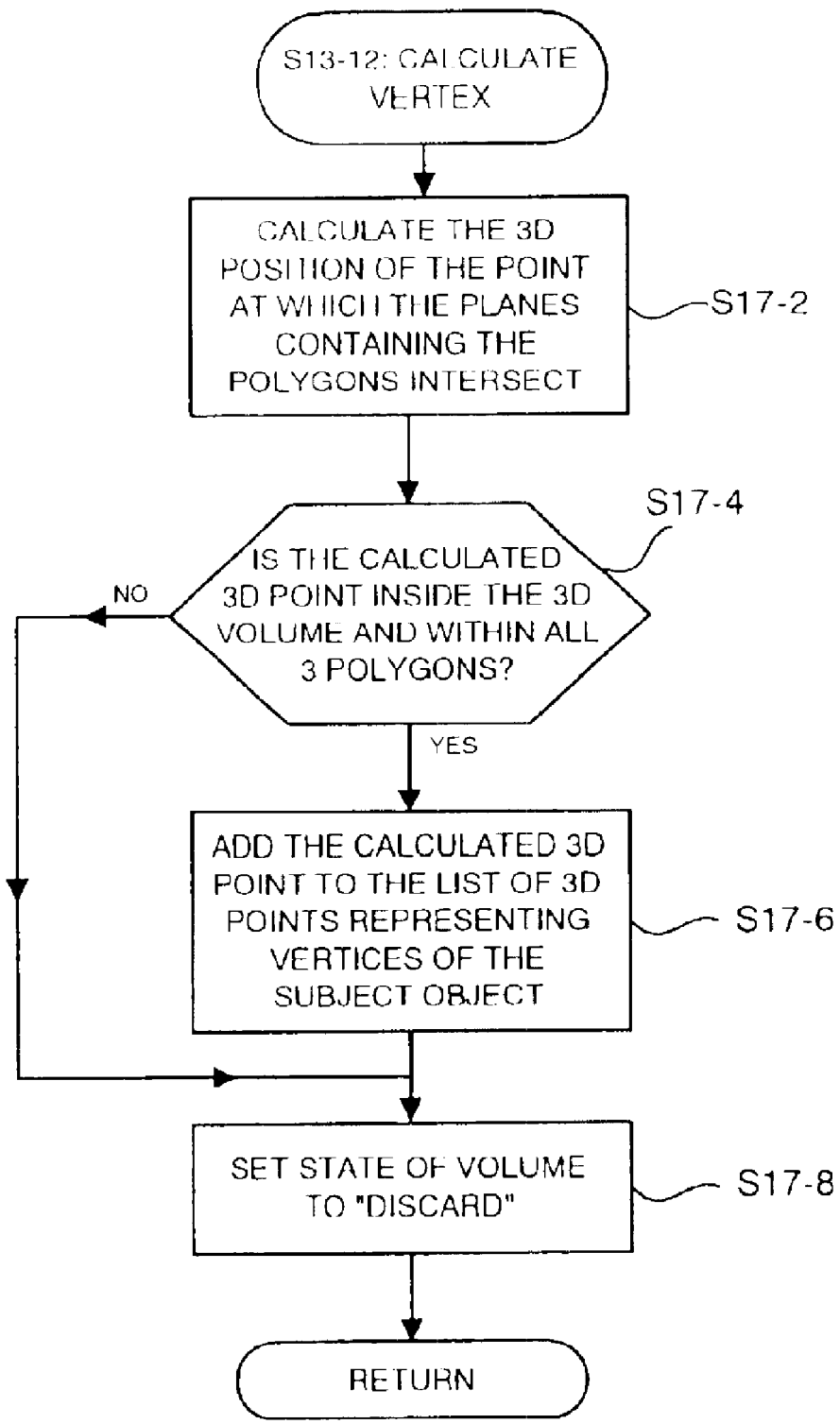
Figure 18:
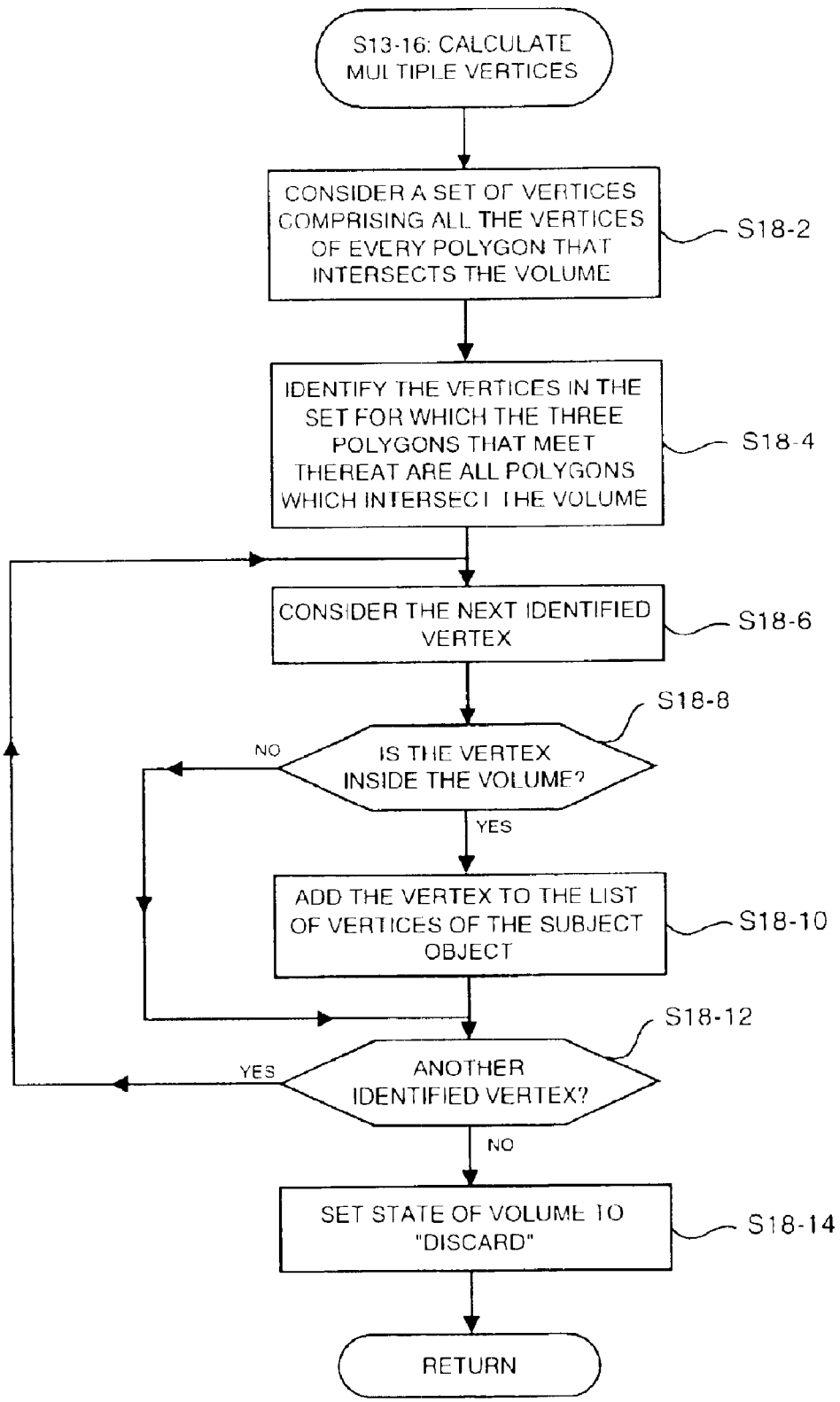
Figure 19:
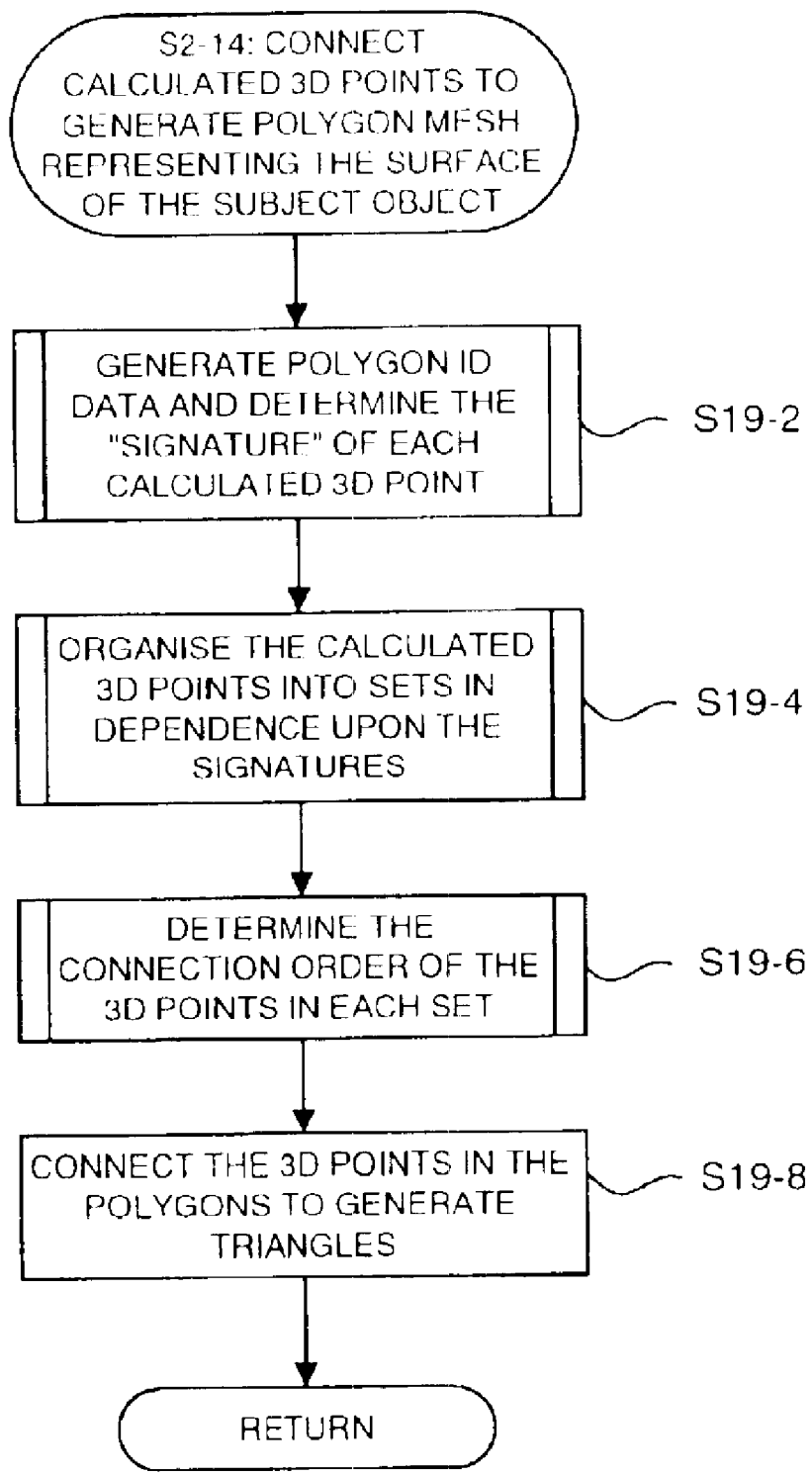
Figure 20:
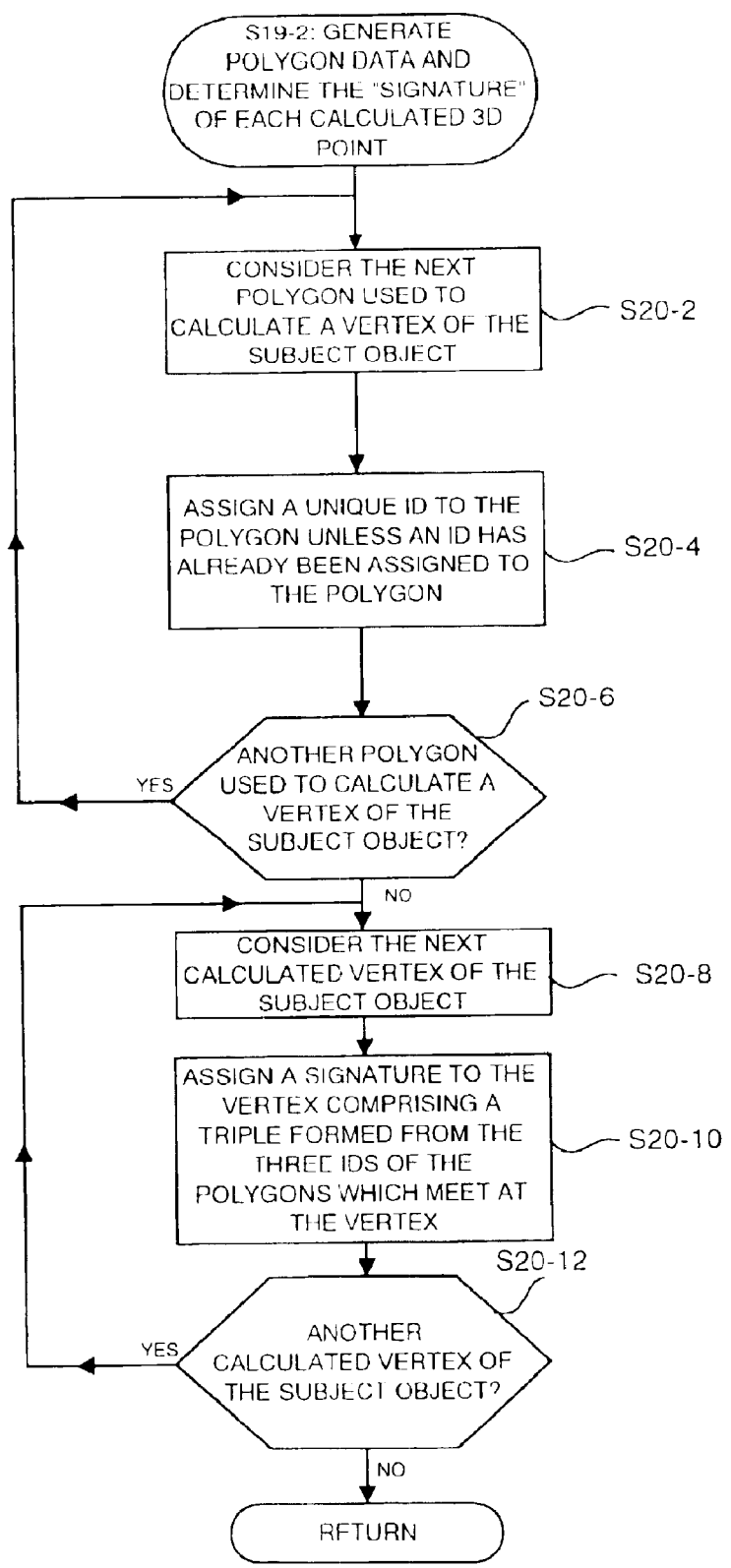
Figure 21:
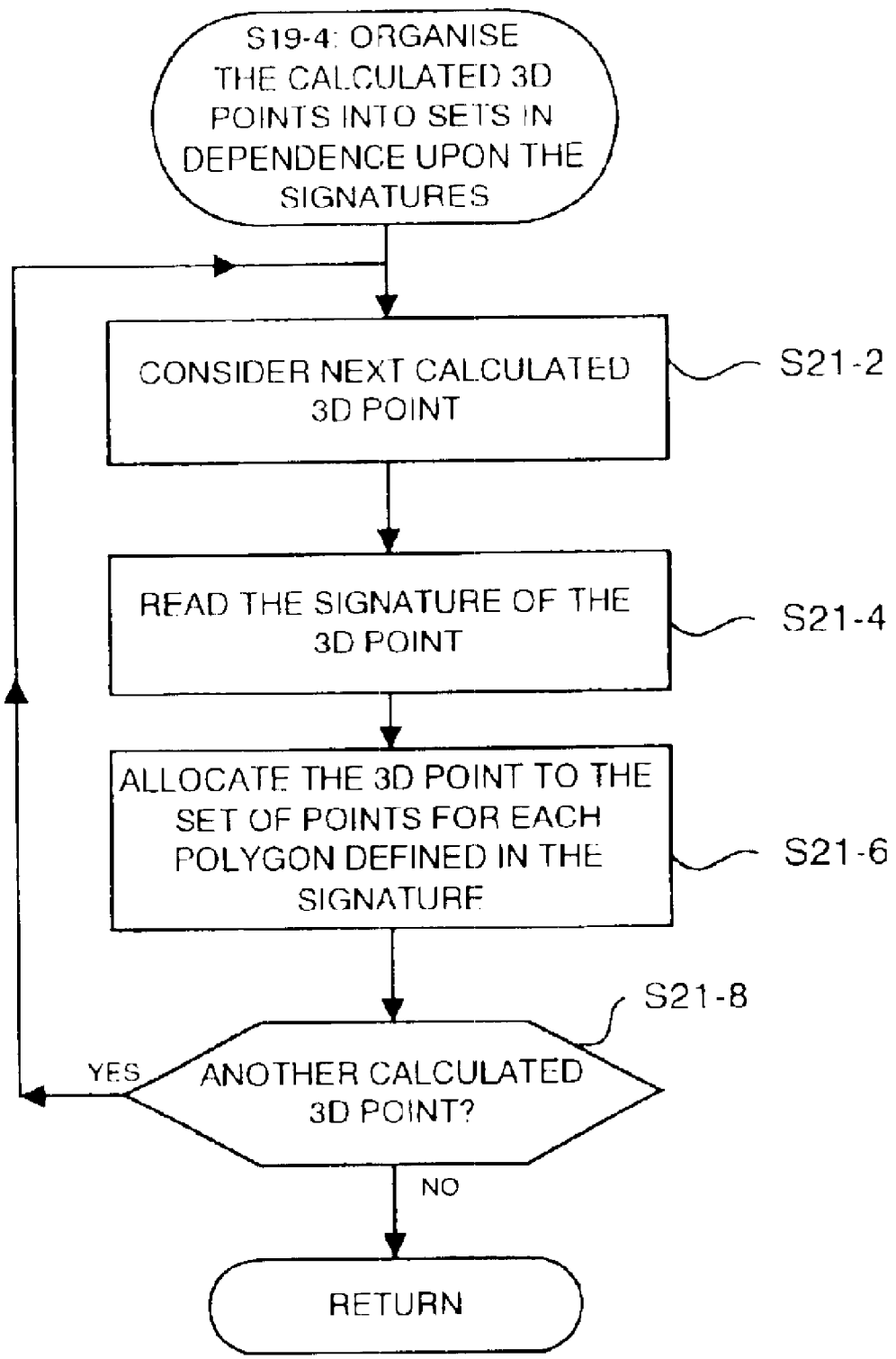
Figure 22:
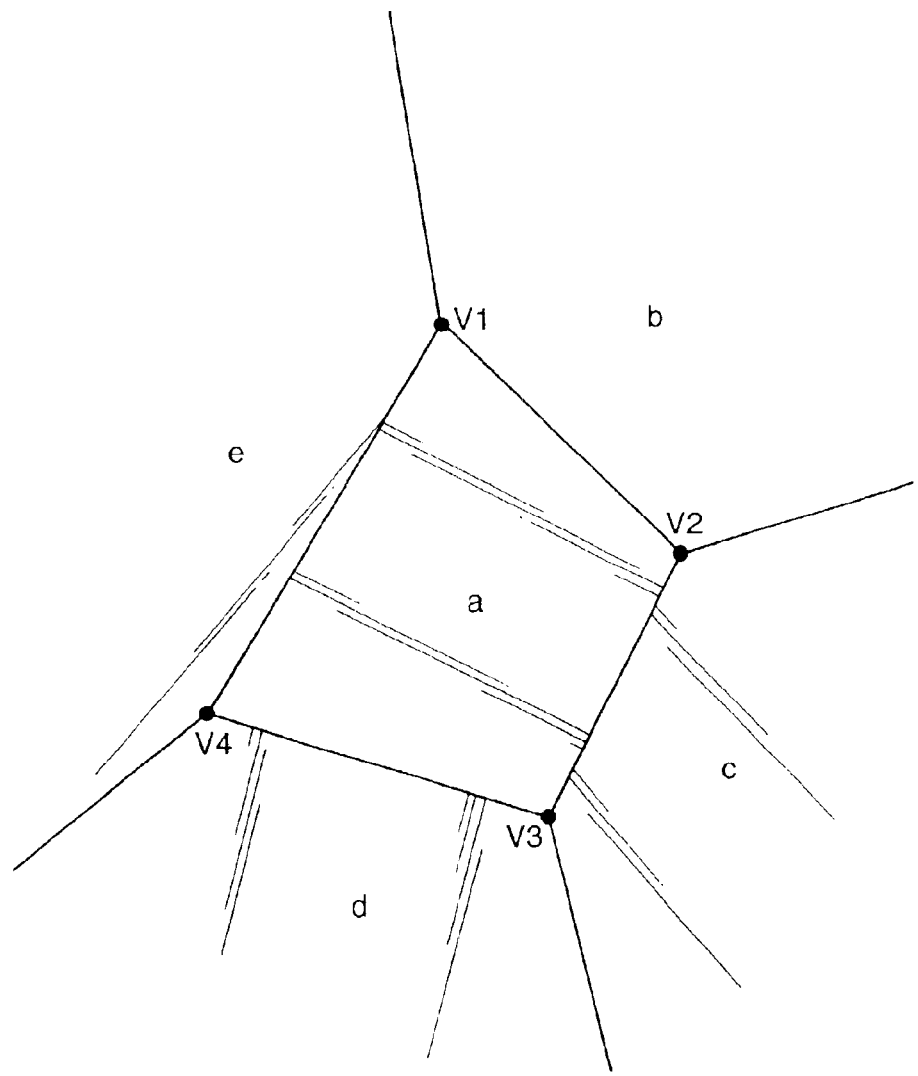
Figure 23:
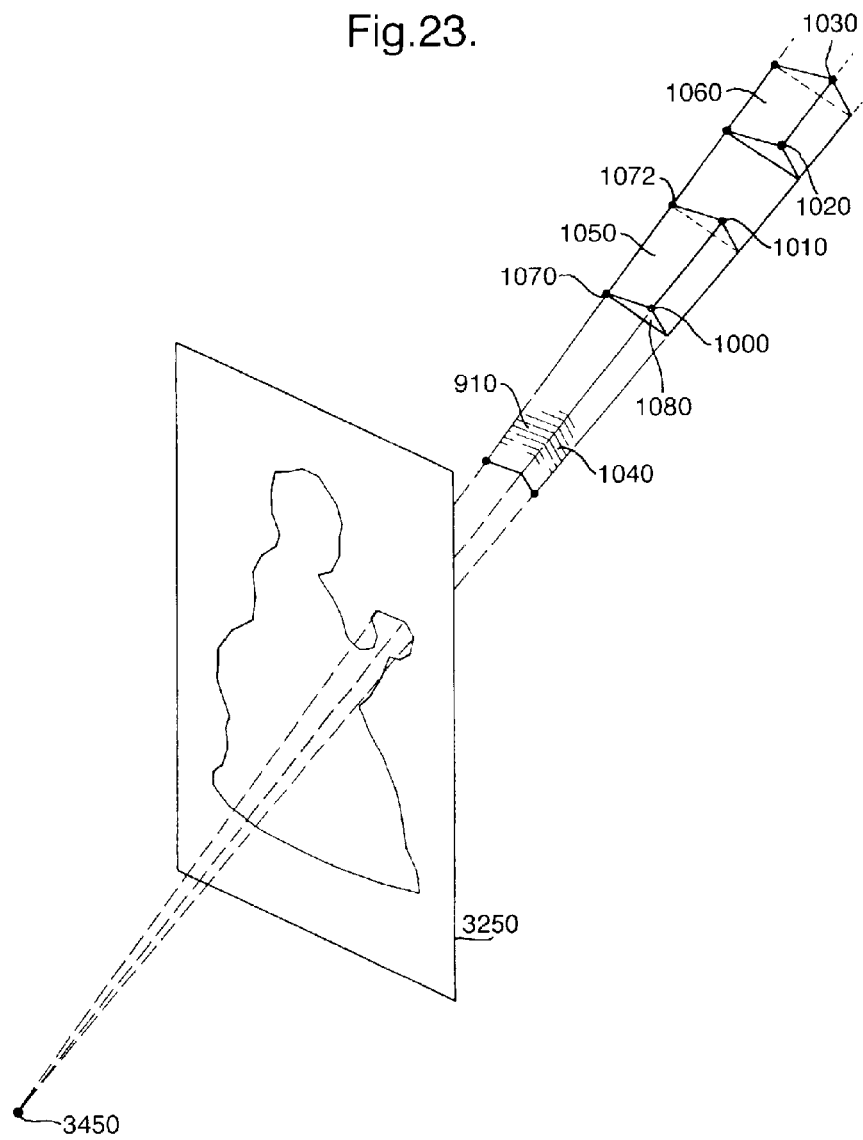
Figure 24:
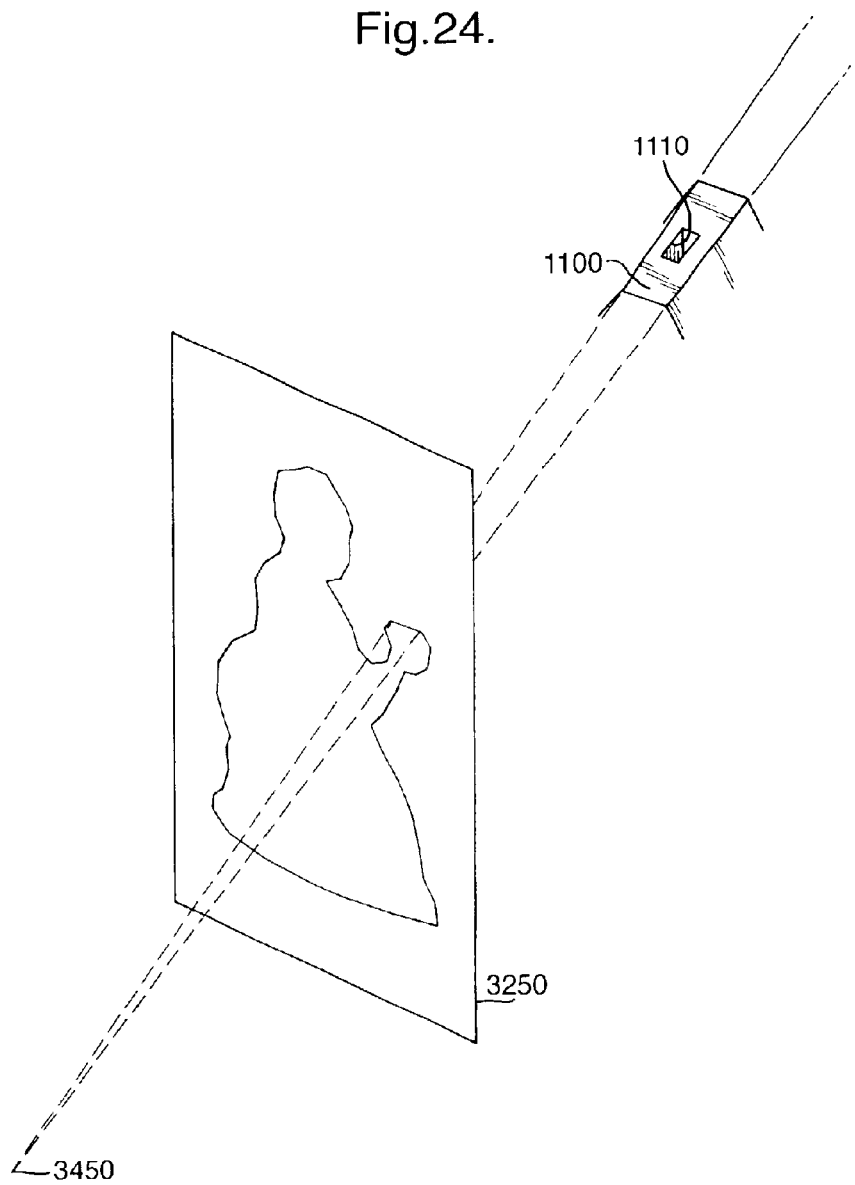
Figure 25A:
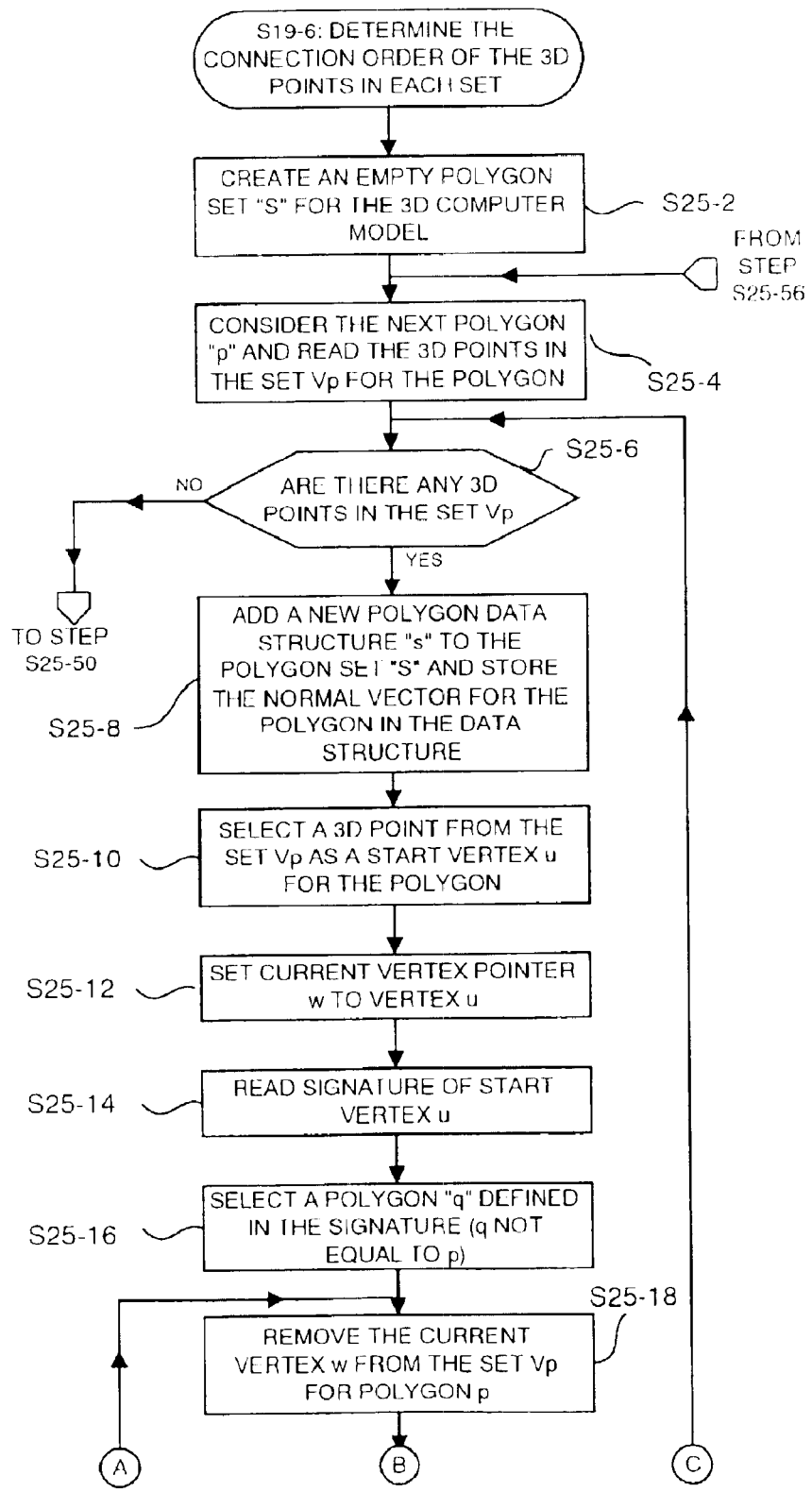
Figure 25B:
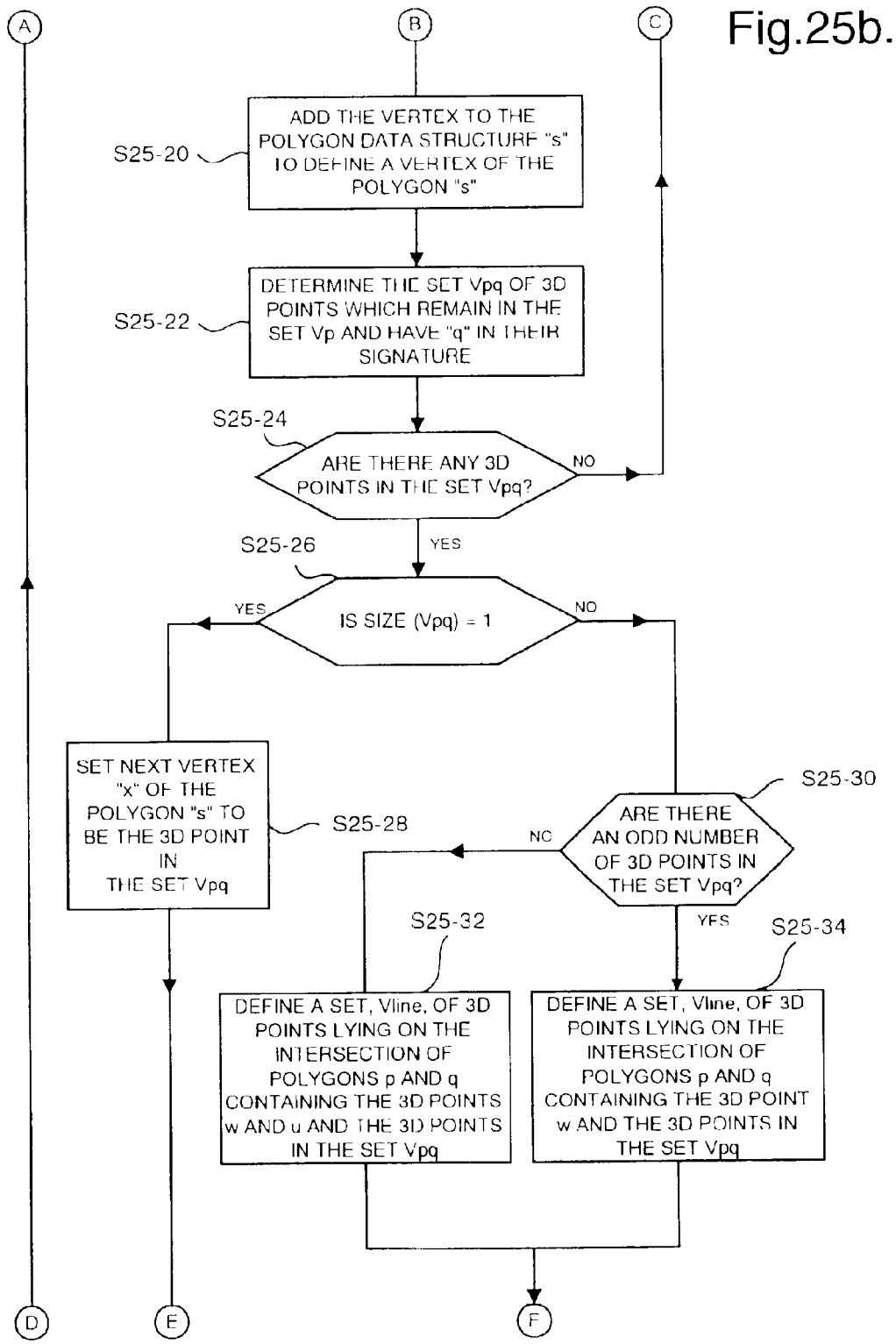
Figure 25C:
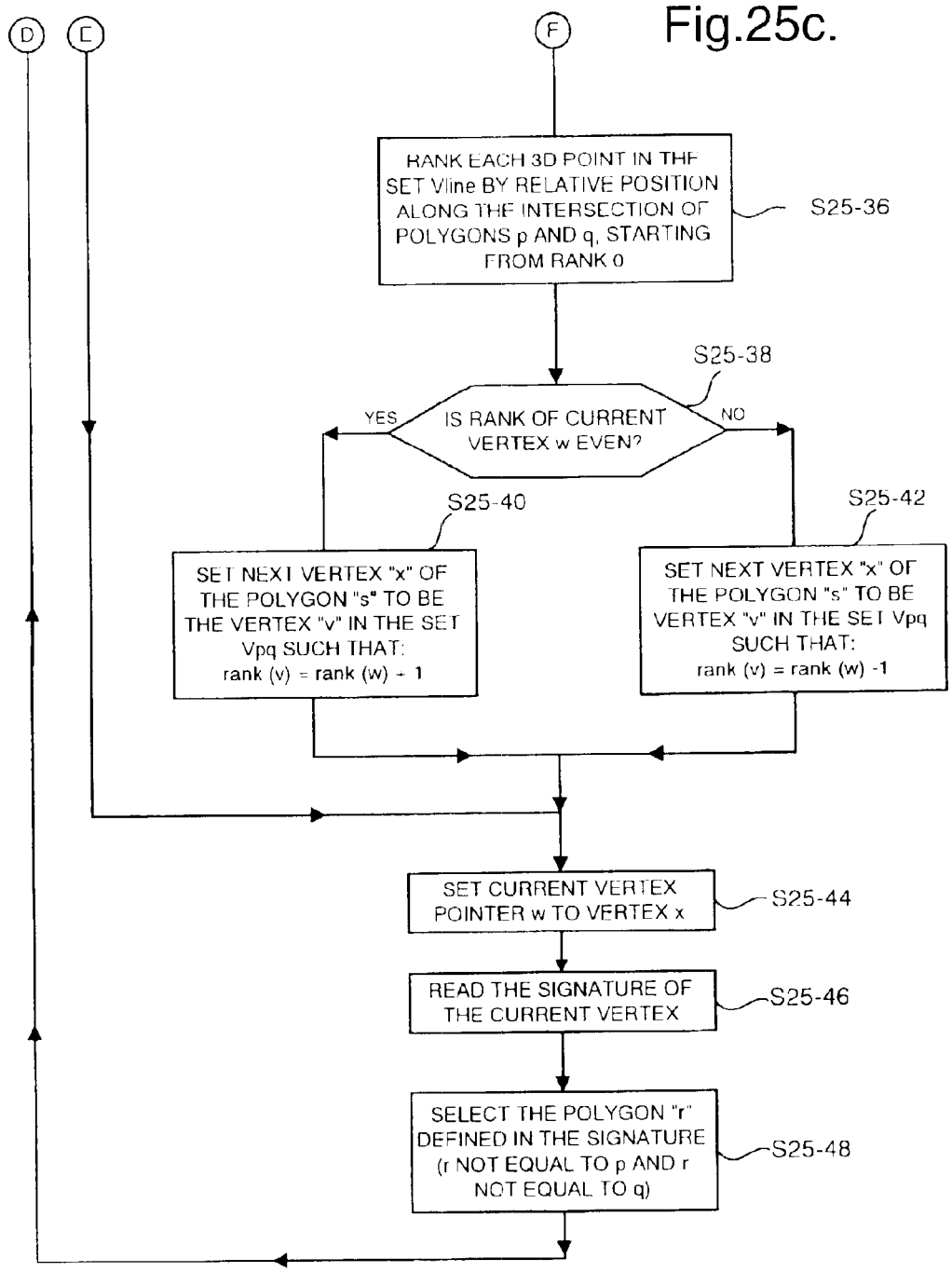
Figure 26:
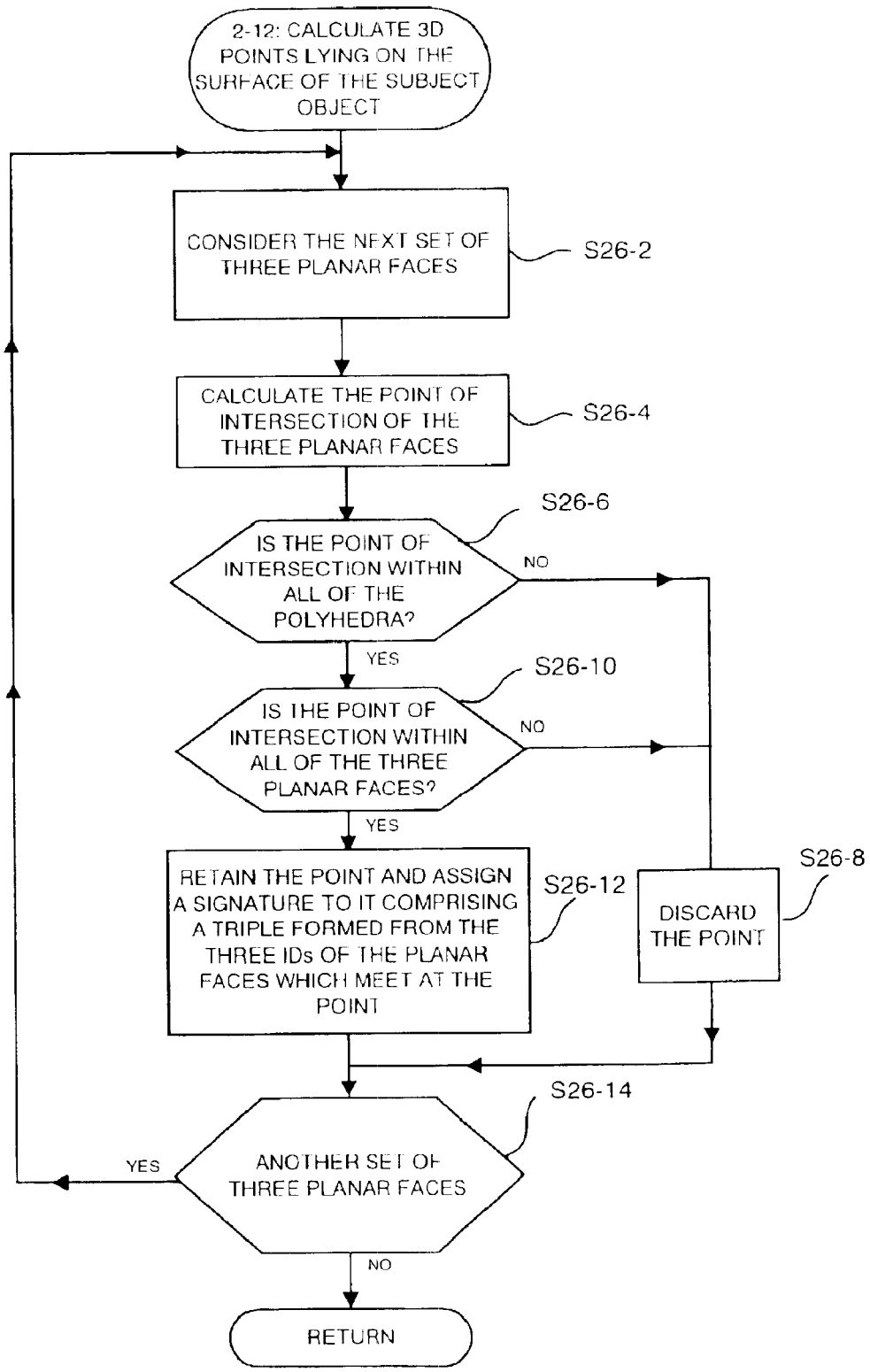

FIG. 8, comprising FIGS. 8a and 8b, shows the processing operations performed at step S2-10 in FIG. 2;

FIGS. 9a, 9b and 9c show examples to illustrate the effect of projecting vertices into 3D space at step S8-4 in FIG. 8;

FIG. 10 shows an example to illustrate the processing performed at step S8-8 in FIG. 8;

FIG. 11 shows the processing operations performed at step S8-8 in FIG. 8;

FIG. 12 shows an example to illustrate the processing performed at step S8-12 in FIG. 8;

FIG. 13 shows the processing operations performed at step S2-12 in FIG. 2;

FIG. 14, comprising FIGS. 14a, 14b and 14c, shows the processing operations performed at step S13-8 in FIG. 13;

FIG. 15 shows the processing operations performed at step S14-18 in FIG. 14;

FIGS. 16*a* and 16*b* show examples to illustrate the processing performed at step S14-18 in FIG. 14;

FIG. 17 shows the processing operations performed at step S13-12 in FIG. 13;

FIG. 18 shows the processing operations performed at step S13-16 in FIG. 13;

FIG. 19 shows the processing operations performed at step S2-14 in FIG. 2;

FIG. 20 shows the processing operations performed at step S19-2 in FIG. 19;

FIG. 21 shows the processing operations performed at step S19-4 in FIG. 19;

FIG. 22 shows an example to illustrate the processing performed at step S19-6 in FIG. 19;

FIG. 23 shows another example to illustrate the processing performed at step S19-6 in FIG. 19;

FIG. 24 shows a further example to illustrate the processing performed at step S19-6 in FIG. 19;

FIG. 25, comprising FIGS. 25*a*, 25*b*, 25*c* and 25*d*, shows the processing operations performed at step S19-6 in FIG. 19; and FIG. 26 shows the processing operation performed in the fourth embodiment at step S2-12 in FIG. 2.

FIRST EMBODIMENT

Figure 1:
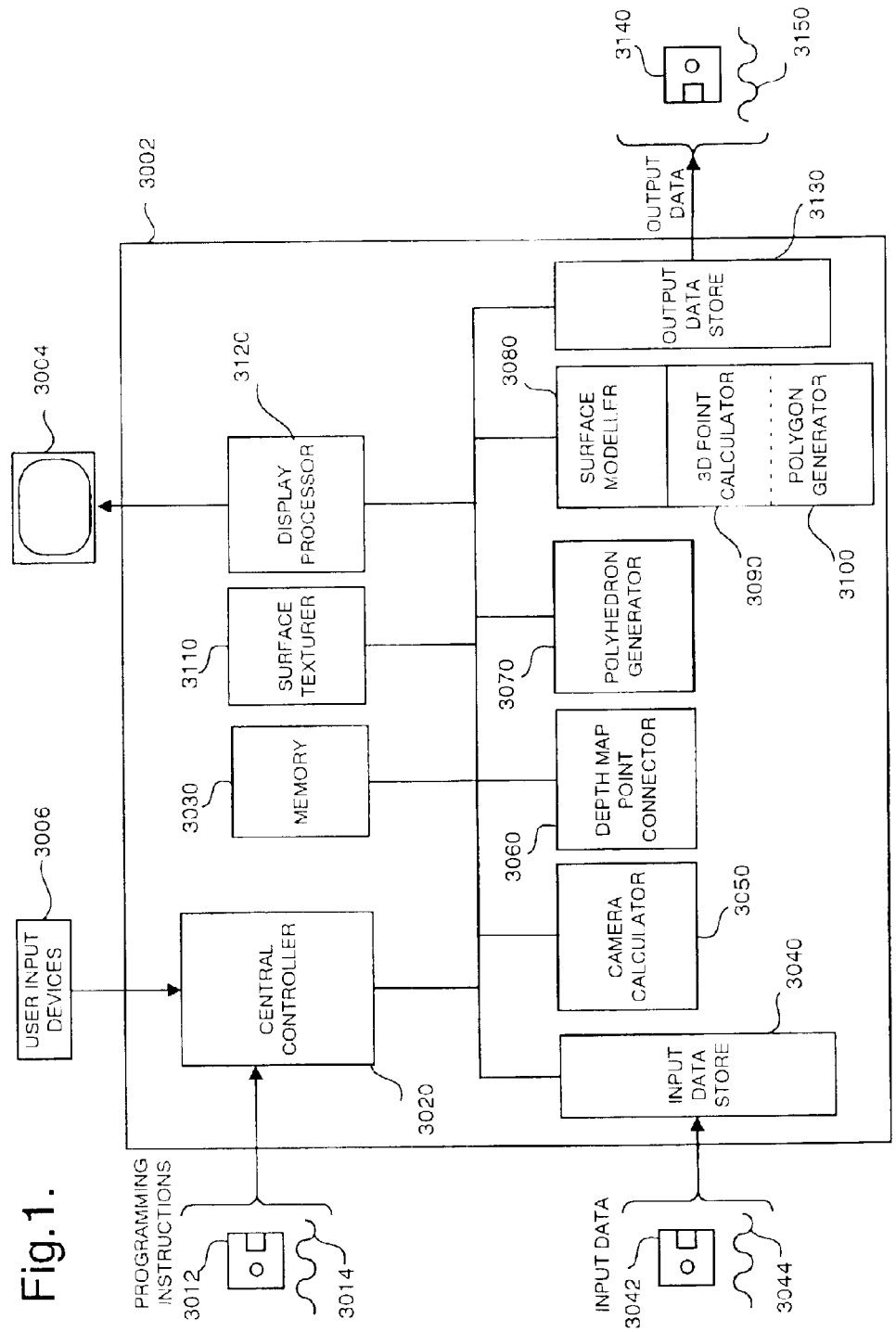

Referring to FIG. 1, a first embodiment of the invention comprises a processing apparatus 3002, such as a personal computer, containing, in a conventional manner, one or more processors, memories, graphics cards etc, together with a display device 3004, such a conventional personal computer monitor, and user input devices 3006, such as a keyboard, mouse etc.

The processing apparatus 3002 is programmed to operate in accordance with programming instructions input, for example, as data stored on a data storage medium, such as disk 3012, and/or as a signal 3014 input to the processing apparatus 3002, for example from a remote database, by transmission over a communication network (not shown) such as the Internet or by transmission through the atmosphere, and/or entered by a user via a user input device 3006 such as a keyboard.

As will be described in more detail below, the programming instructions comprise instructions to cause the processing apparatus 3002 to become configured to generate data defining a 3D computer model of a subject object by processing depth maps of the subject object and data defining the relative positions and orientations of the depth maps. The 3D computer model of the subject object is generated using a novel and inventive technique in which processing is performed to calculate 3D points representing vertices of the subject object by processing each depth map to generate a polyhedron comprising a plurality of polygons, and by determining the intersections of the polygons in the polyhedra for all depth maps. As will be described in detail below, in this embodiment, this processing is performed in a particularly efficient way, in particular because it avoids calculating polygon intersections which cannot result in 3D points on the surface of the subject object. When programmed by the programming instructions, processing apparatus 3002 can be thought of as being configured as a number of functional units for performing processing operations. Examples of such functional units and their interconnections are shown in FIG. 1. The units and interconnections illustrated in FIG. 1 are, however, notional and are shown for illustration purposes only to assist understanding; but they do not necessarily represent units and connections into which the processor, memory etc of the processing apparatus 3002 become configured.

Referring to the functional units shown in FIG. 1, a central controller 3020 processes input signals from the user input devices 3006, and provides control and processing for the other functional units.

Memory 3030 is provided for use by central controller 3020 and the other functional units.

Input data store 3040 stores input data input to the processing apparatus 3002, for example as data stored on a storage device, such as disk 3042, as a signal 3044 transmitted to the processing apparatus 3002, or using a user input device 3006. In this embodiment, the input data defines a plurality of depth maps of a subject object, each of which comprises, in a conventional manner, an image of the subject object made up of a plurality of pixels together with a depth value for each pixel defining the distance of the subject matter imaged in the pixel from the focal point of the camera. The input data defining the depth maps may have been generated using a conventional 3D imaging device such as a laser scanner, a structured light system or passive stereo camera pair, etc.

In this embodiment, each input depth map has been segmented prior to input to apparatus 3002, so that the input data defines a flag for each pixel indicating whether the pixel relates to either the subject object or "background" (that is, something other than the subject object). However, processing to perform this segmentation could, optionally, be performed in processing apparatus 3002, using conventional techniques.

The input data further comprises data defining the intrinsic parameters of the camera(s) which recorded the depth map images, that is, the aspect ratio, focal length, principal point (the point at which the optical axis intersects the imaging plane), first order radial distortion coefficient and skew angle (the angle between the axes of the pixel grid; because the axes may not be exactly orthogonal). The input data defining the intrinsic camera parameters may be input by a user using a user input device 6.

Optionally, the input data also defines the relative positions and orientations of the input depth maps (that is, the positions and orientations at which the images of the depth maps were recorded).

Camera calculator 3050 is arranged to process the input data if it does not already define the relative positions and orientations of the input depth maps, to calculate these relative positions and orientations. As will be described below, camera calculator 50 is arranged to perform this processing by matching features in the depth map images and calculating the positions and orientations based on the relative positions of the matching features in the different depth maps.

Depth map point connector 3060 is arranged to process the data defining each input depth map to connect pixels in the depth map so as to generate a 2D triangulated surface representing the subject object in the depth map.

Polyhedron generator 3070 is arranged to process each 2D triangulated surface generated by depth map point connector 3060 together with the data defining the positions and orientations of the depth maps and the data defining the depths of the pixels in the depth maps, to generate a respective 3D polyhedron for each depth map comprising a plurality of polygons defining a representation of the subject object.

Surface modeller 3080 comprises a 3D point calculator 3090 and a polygon generator 3100.

3D point calculator 3080 is arranged to process the polyhedra generated by polyhedron generator 3070 to calculate the intersections of the polygons thereof. These intersections define 3D points which are potentially on the surface of the subject object, and 3D point calculator 3080 is arranged to test the intersections to determine which ones represent actual 3D points on the subject object.

Polygon generator 3100 is arranged to connect the 3D points calculated and retained after testing by 3D point calculator 3090 to form a polygon mesh representing the surface of the subject object.

More particularly, the intersections of the polygons of the depth map polyhedra define 3D points on the overall surface representation of the subject object. Accordingly, these 3D points are connected by polygon generator 3100 so that they form the vertices of the polygons in the polygon mesh representing the surface of the subject object. For this reason, hereinafter, the 3D points calculated by 3D point calculator 3090 and connected by polygon generator 3100 will be referred to as 3D vertices.

Surface texturer 3110 is arranged to generate texture data from the image data of the input depth maps for rendering onto the surface model produced by surface modeller 3080.

Display processor 3120, under the control of central controller 3020, is arranged to display images and instructions to a user via display device 3004 during processing to generate the 3D computer model. In addition, under the control of central controller 3020, display processor 3120 is also arranged to display images of the 3D computer model of the subject object from a user-selected viewpoint by processing the surface model data generated by surface modeller 3080 and rendering texture data produced by surface texturer 3110 onto the surface model.

Output data store 3130 is arranged to store the data defining the surface model generated by surface modeller 3080, and optionally the texture data generated by surface texturer 3110 as well. Central controller 3020 is arranged to control the output data from output data store 3130, for example as data on a storage device, such as disk 3140, and/or as a signal 3150.

FIG. 2 shows the processing operations performed by processing apparatus 3002 in this embodiment.

Referring to FIG. 2, at step S2-1, central controller 3020 causes display processor 3120 to display a message on display device 3004 requesting the user to input data for processing.

At step S2-2, data input by the user in response to the request at step S2-1 is stored in the input data store 3040. More particularly, in this embodiment, the input data comprises data defining a plurality of depth maps of the subject object recorded at different positions and orientations (each depth map comprising an image of the subject object and a depth value for each pixel in the image defining the distance of the subject shown in the pixel from the focal point of the camera and, in this embodiment, data defining a flag for each pixel specifying whether it represents the subject object or background). The input data further comprises data defining the intrinsic parameters of the camera which recorded the images of the depth maps, that is, the aspect ratio, focal length, principal point, first order radial distortion coefficient, and the skew angle. Optionally, the input data also includes data defining the relative positions and orientations of the input depth maps (that is, the positions and orientations at which the depth maps were recorded relative to each other in 3D space).

At step S2-4, central controller 3020 determines whether the input data stored at step S2-2 defines the relative positions and orientations of the input depth maps.

If it is determined at step S2-4 that the input data does not define the depth map relative positions and orientations, then, at step S2-6, camera calculator 3050 performs processing to calculate these relative positions and orientations. In this embodiment, camera calculator 3050 calculates the relative positions and orientations of the depth maps by processing the images of the depth maps to match features therein and to calculate the relative positions and orientations of the camera when the images were recorded in a conventional manner, for example as described in EP-A-0898245.

On the other hand, if it is determined at step S2-4 that the input data stored at step S2-2 already defines the depth map positions and orientations, then step S2-6 is omitted.

Referring to FIG. 3, at this stage in the processing, processing apparatus 3002 has data stored therein defining a plurality of depth maps 3200–3270, and data defining the relative positions and orientations in 3D space of the depth maps (including focal point positions 3400–3470 of the depth maps).

Each depth map 3200–3270 comprises an image of the subject object 3300, together with data for each pixel in the image defining the distance of the subject matter shown in the pixel from the 3D position of the camera focal point 3400–3470, and, in this embodiment, data defining whether the subject matter of each pixel relates to the subject object 3300 or background.

Referring again to FIG. 2, at step S2-8, depth map point connector 3060 connects pixels representing the subject object 3300 in each depth map 3200–3270 to generate a respective 2D triangulated surface of the subject object in each depth map.

Figure 4:
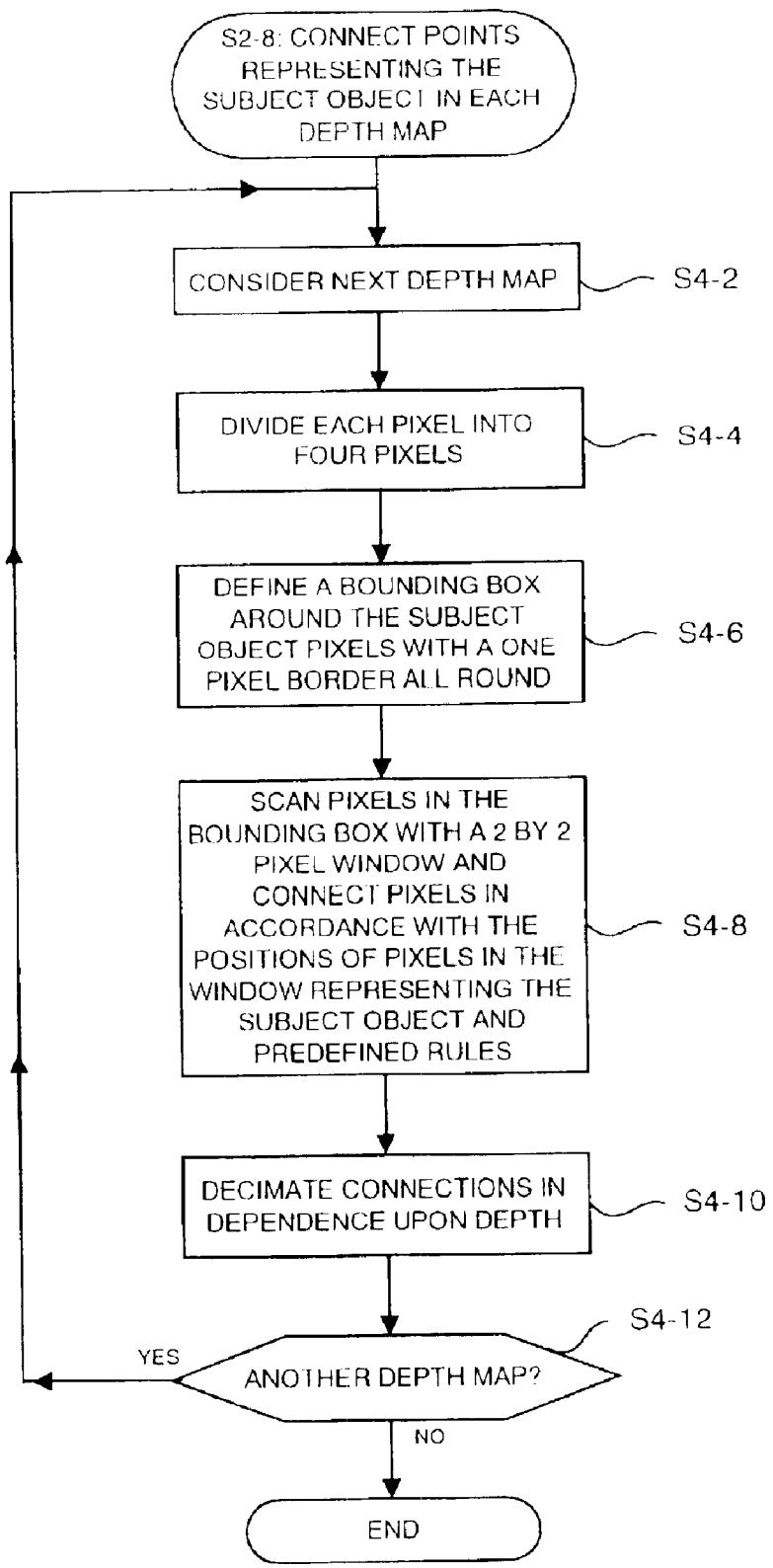
FIG. 4 shows the processing operations performed at step S2-8 in FIG. 2.

FIG. 4 shows the processing operations performed by depth map point connector 3060 at step S2-8.

Referring to FIG. 4, at step S4-2, depth map point connector 3060 considers the next depth map to be processed (this being the first depth map the first time step S4-2 is performed).

At step S4-4, depth map point connector 3060 divides each pixel into four pixels, each of which is assigned the same depth value as the parent pixel and also the same subject object/background flag as the parent pixel (indicating whether the pixel shows part of the subject object 3300 or something else, that is "background").

This processing will now be explained further with reference to FIG. 5, which shows, by way of example, part of a depth map image. More particularly, FIG. 5 shows the part 3480 of depth map image 3240 circled in FIG. 3.

Figure 5:
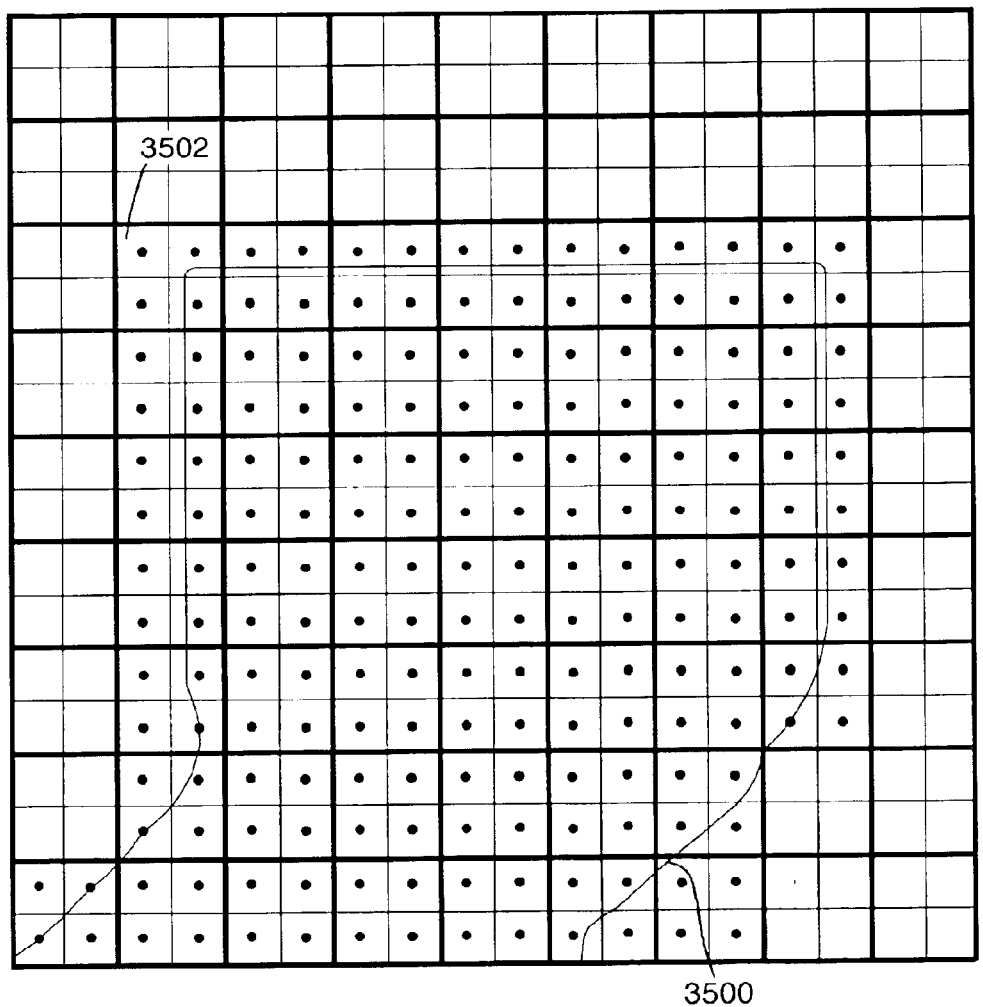
FIG. 5 shows an example to illustrate the processing performed at step S4-4 in FIG. 4.

Referring to FIG. 5, each parent pixel is defined by the thick bold grid lines, and each of the pixels generated at step S4-4 by dividing a parent pixel into four is represented by the thin non-bold grid lines.

The line 3500 in FIG. 5 represents the outline of the subject object 3300 in the image. Accordingly, each original parent pixel through which the line 3500 passes has previously been designated in the input data as a pixel showing the subject object 3300. At step S4-4, when each pixel showing the subject object 3300 is divided into four pixels, each of the four new pixels is also designated as a pixel showing the subject object 3300 (this being represented in FIG. 5 by a dot in each pixel which represents the subject object 3300). It will be noted, therefore, that some of the new pixels generated at step S4-4 are designated as showing the subject object 3300 even though they lie outside the line 3500 (for example pixel 3502). This situation arises because, as noted above, each of the four pixels created from the parent pixel at step S4-4 is assigned the same subject object/background flag as its parent pixel, irrespective of its position within the parent pixel.

For the rest of the description of this embodiment, where a "pixel" is referred to in a depth map, this refers to a smaller-size pixel generated at step S4-4, rather than one of the original pixels, unless otherwise indicated.

Referring again to FIG. 4, at step S4-6, depth map point connector 3060 defines a bounding box around the pixels in the depth map showing the subject object 3300. In this embodiment, the bounding box is defined to have sides parallel to the sides of the depth map image, and is defined so that it includes a border along each side of at least one background pixel.

At step S4-8, depth map point connector 3060 scans the pixels in the bounding box defined at step S4-6 with a two-by-two pixel window (in other words, a window having a size the same as one original pixel in the depth map before step S4-4 was performed).

For each position of the pixel window, depth map point connector 3060 connects the pixels in the depth map appearing in the pixel window in dependence upon the positions of pixels in the window representing the subject object 3300 and in dependence upon predetermined connection rules, as will now be described with reference to FIGS. 6a–6k.

More particularly, referring to FIGS. 6a–6d, if two, and only two, pixels representing the subject object 3300 appear in the pixel window (such pixels being indicated with a dot therein in FIG. 6 in the same way as FIG. 5), then depth map point connector 3060 connects the centres of the pixels representing the subject object 3300 if the two pixels lie adjacent to each other in the vertical or horizontal directions.

Figure 6A:
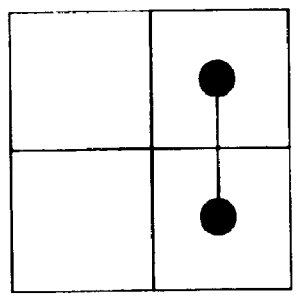
FIGS. 6a–6k show examples to illustrate the predefined rules used at step S4-8 in FIG. 4 to connect points within a depth map.
Figure 6B:
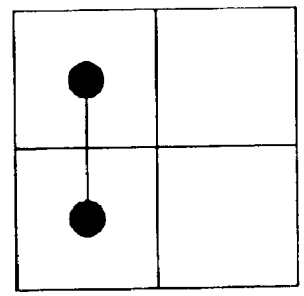
Figure 6C:
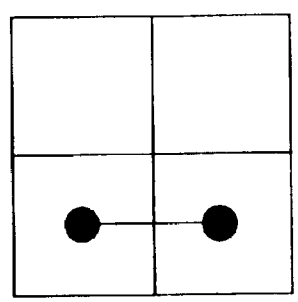
Figure 6D:
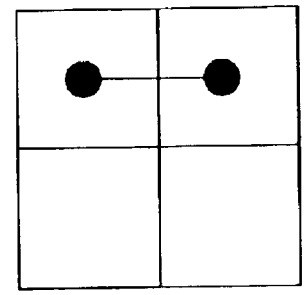
Figure 6E:
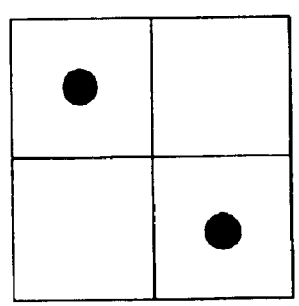
Figure 6F:
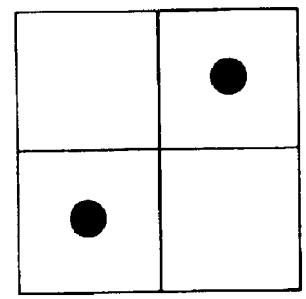
Figure 6G:
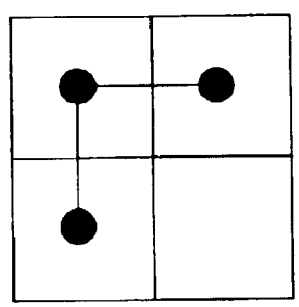
Figure 6H:
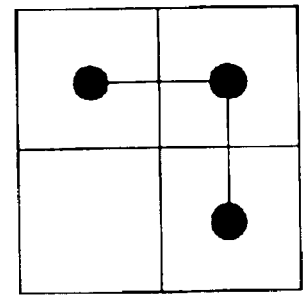
Figure 6I:
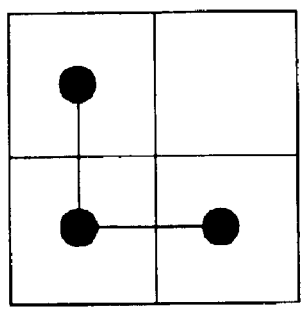
Figure 6J:
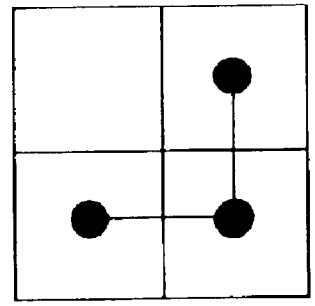

On the other hand, referring to FIGS. 6e and 6f, if two, and only two, pixels lie in the pixel window at opposite corners on a diagonal line, then the pixels are not connected by depth map point connector 3060 at step S4-8.

Referring now to FIGS. 6g–6j, if three, and only three, pixels representing the subject object 3300 lie in the pixel window, then depth map point connector 3060 connects the centres of the pixels representing the subject object 3300 by a connection in the vertical direction and a connection in the horizontal direction (but not the diagonal direction), as shown.

Figure 6K:
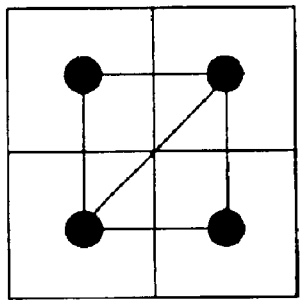

Referring to FIG. 6k, if all four of the pixels in the pixel window represent the subject object 3300, then depth map point connector 3060 connects the centres of the pixels using two vertical connections, two horizontal connections and one diagonal connection, as shown.

With reference to the case where one, and only one, pixel representing the subject object 3300 appears in the pixel window, it should be noted that no pixel connections are made by depth map point connector 3060.

Figure 7:
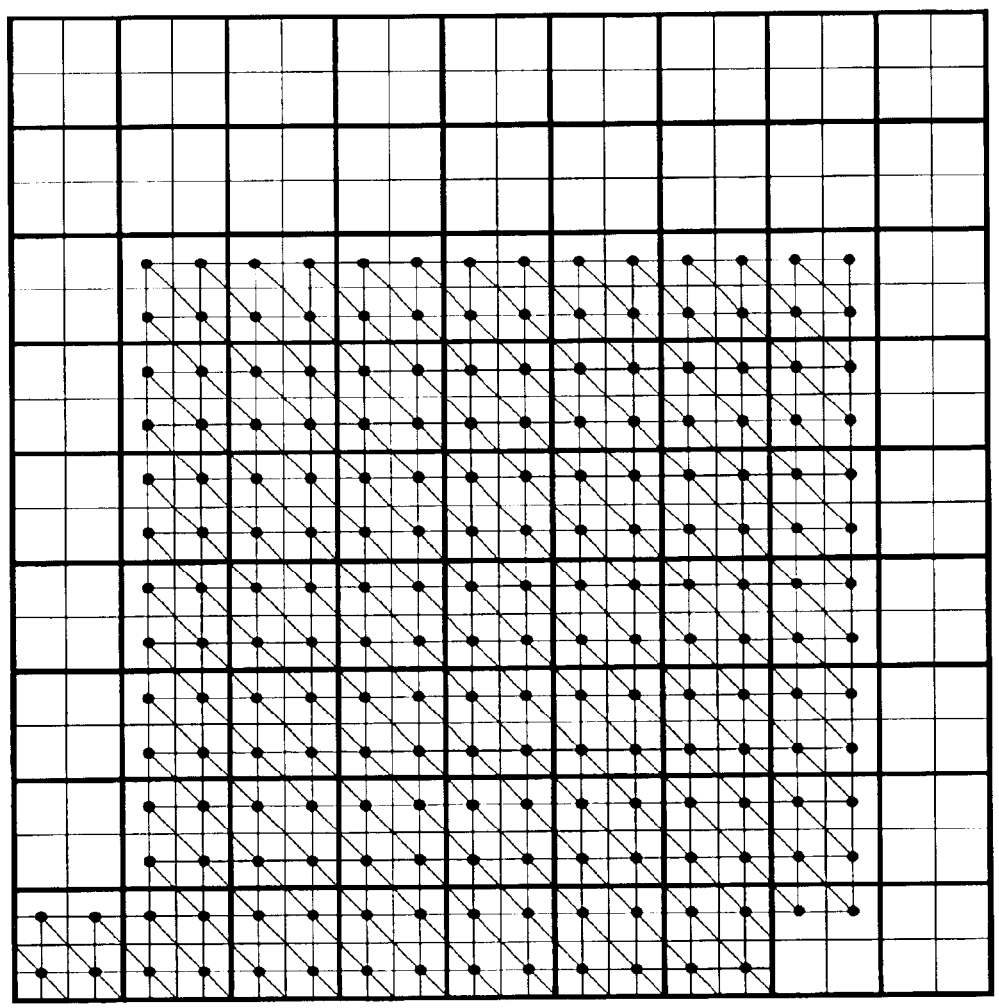
FIG. 7 shows the results of performing the processing at step S4-8 in FIG. 4 on the example shown in FIG. 5.

FIG. 7 shows the result of the processing performed at step S4-8 for the example previously shown in FIG. 5.

Referring to FIG. 7, it will be seen that a 2D triangulated surface is created in the depth map image representing the subject object 3300 (or part of the subject object 3300 in the example of FIGS. 5 and 7).

Referring again to FIG. 4, at step S4-10, depth map point connector 3060 performs processing to decimate the triangulated surface generated at step S4-8, that is to reduce the number of connections in the surface. In this embodiment, the decimation processing is carried out in dependence upon the depth values of the connected pixels, the processing being performed in a conventional manner, for example as described in "Mesh Optimization" by Hoppe et al in ACM SIGGRAPH 93, Addison-Wesley, ISBN 0-201-58889-7.

At step S4-12, depth map point connector 3060 determines whether there is another input depth map to be processed.

Steps S4-2 to S4-12 are repeated until each input depth map has been processed in the way described above.

Referring again to FIG. 2, at step S2-10, polyhedron generator 3070 generates a respective polyhedron for each input depth map defining a representation of the subject object 3300.

FIG. 8 shows the processing operations performed by polyhedron generator 3070 at step S2-10.

Referring to FIG. 8, at step S8-2, polyhedron generator 3070 considers the next 2D triangulated depth map previously generated at step S2-8 (this being the first triangulated depth map the first time step S8-2 is performed).

At step S8-4, polyhedron generator 3070 projects each vertex of the triangulation into 3D space in dependence upon the depth value of the pixel containing the vertex, the position and orientation of the depth map and the camera parameters defined in the input data. This generates a 3D vertex from each 2D vertex, and polyhedron generator 3070 assigns a unique ID to each generated 3D vertex and stores data defining the planar polygon faces defined by the 3D vertices. In this way, polyhedron generator 3070 generates a polyhedron comprising a plurality of planar polygons representing the subject object 3300.

The processing performed by polyhedron generator 3070 will now be explained further with reference to FIGS. 9a, 9b and 9c.

FIG. 9a illustrates the projection of vertices from the 2D triangulation into 3D space in the case where the 2D vertices represent points lying inside the image of the subject object within the depth map (that is, the 2D vertices do not lie on the boundary of the triangulation generated at step S2-8).

Referring to FIG. 9a, two 2D vertices 3510 and 3520 are shown for depth map 3210 by way of example.

Using the position and orientation of the depth map 3210 and the intrinsic camera parameters defined in the input data, 2D vertex 3510 is projected into 3D space to define a 3D point 3530 which lies at a distance from the focal position 3410 equal to the depth value defined for the pixel containing the 2D vertex 3510. Similarly, 2D vertex 3520 is projected into 3D space based on the position and orientation of the depth map 3210 and the intrinsic cameras parameters to give a 3D point 3540 at a distance from the focal point position 3410 equal to the depth value of the pixel containing the 2D vertex 3520.

Since the 2D vertices 3510 and 3520 are connected in the 2D triangulation, polyhedron generator 3070 stores data defining that the 3D points 3530 and 3540 generated therefrom are connected in the 3D polyhedron.

FIG. 9b illustrates the processing performed in this embodiment at step S8-4 to project into 3D space the 2D vertices which lie on the boundary of the 2D triangulated surface previously generated at step S2-8.

As noted previously, the purpose of the processing performed by polyhedron generator 3070 at step S2-10 is to generate a 3D polyhedron represention of the subject object 3300 from the depth map being processed. Consequently, each 2D vertex which lies on the boundary of the 2D triangulation defines a 3D vertex which is an end vertex for a side face of the 3D polyhedron. In addition, since no information is available for the depth map being processed to define the position of the back of the subject object 3300 (because this was not visible to the 3D imager when the depth map was generated), each side face of the 3D polyhedron generated by polyhedron generator 3070 in this embodiment is defined to be of "infinite" extent (in practice, extending for an arbitrarily large distance).

More particularly, referring to FIG. 9b, two 2D vertices 3550 and 3560 lying on the boundary of the 2D triangulation previously generated at step S2-8 are illustrated by way of example for the depth map 3210.

As in the example shown in FIG. 9a, each of the 2D vertices 3550 and 3560 is projected into three dimensions in dependence upon the position and orientation of the depth map 3210 and the parameters of the camera used to generate the depth map image. 2D vertex 3550 generates 3D vertex 3570 having a distance from the focal point position 3410 of the camera equal to the depth value defined in the pixel of the depth map 3210 containing the 2D vertex 3550. Similarly, 2D vertex 3560 generates 3D vertex 3580 having a distance from the focal point position 3410 equal to the depth map value defined in the pixel containing the 2D vertex 3560.

Since the 2D vertices 3550 and 3560 are connected in the 2D triangulation, polyhedron generator 3070 stores data defining that the 3D vertices 3570 and 3580 generated therefrom are connected in the 3D polyhedron. In addition, polyhedron generator 3070 defines a side face 3590 that projects to infinity (in practice, an arbitrarily large distance) in a direction away from the focal point position 3410, and which has the 3D vertices 3570 and 3580 as end vertices in the direction towards the focal point position 3410.

Thus, referring to FIG. 9c, the overall effect of performing the processing at step S8-4 for a given 2D triangulation is to generate a 3D polyhedron 3600 having a "front" end face 3610, side faces of infinite extent, and an implicit "back" face at infinity.

The front end face 3610 is made up of 3D vertices with connections therebetween corresponding to the 2D vertices and the connections therebetween in the 2D triangulation generated at step S2-8.

The polyhedron 3600 defines a surface representation of the subject object 3300 as seen from the depth map 3210. The polyhedron 3600 is made up of a plurality of planar polygons, namely the planar polygons defined by the 3D vertices of the end face 3610 (it being noted that these planar polygons do not all lie in the same plane because the 3D vertices do not all lie in the same plane) and the planar polygons defining the side faces of the polyhedron 3600.

If the side faces of the polyhedron 3600 were projected back towards the depth map 3210, they would converge at the focal point position 3410. Thus, the polyhedron 3600 can be thought of as a truncated version of a cone having its apex at the focal point position 3410.

As will be described below, processing apparatus 3002 generates a 3D polyhedron for each depth map, and performs processing to calculate the intersections of the polygons making up all the polyhedra to generate a polygon mesh representing the overall surface of the subject object 3300.

Referring again to FIG. 8, at steps S8-6 to S8-14, polyhedron generator 3070 performs processing to convert the "complex" polyhedron generated at step S8-4 into a "simple" polyhedron—that is, a polyhedron in which only three planar polygon faces meet at each vertex. As will be explained in more detail below, this processing involves adding additional "virtual" vertices to the polyhedron such that only three polygons meet at each virtual vertex.

More particularly, at step S8-6, polyhedron generator 3070 considers the next 3D vertex of the polyhedron generated at step S8-4 (this being the first 3D vertex the first time step S8-6 is performed).

At step S8-8, polyhedron generator 3070 determines which planar polygons of the polyhedron meet at the vertex and their adjacency order (these planar polygons being the planar faces of finite extent in the end front face 3610 and/or the infinite planar side faces).

More particularly, referring to the example shown in FIG. 10, if the 3D vertex 3620 is the vertex considered at step S52-6, then at step S8-8, polyhedron generator 3070 performs processing to determine which planar polygons meet at the vertex 3620 and the order in which those planar polygons are connected (the planar polygons A, B, C, D, E and F meeting at the vertex 3620 in the example of FIG. 10 and having an adjacency order A-B-C-D-E-F-A).

FIG. 11 shows the processing operations performed by polyhedron generator 3070 at step S8-8. These processing operations will be described with reference to the example shown in FIG. 10.

Referring to FIG. 11, at step S11-2, polyhedron generator 3070 identifies a planar polygon face having the vertex selected at step S8-6 as a vertex, and adds the face to an ordered list of faces. This processing is performed by reading the vertices making up the planar polygon faces and selecting the first face which is found to have a vertex corresponding to the vertex being considered.

For example, assume that polygon face A in the example of FIG. 10 is identified at step S11-2.

At step S11-4, polyhedron generator 3070 considers the planar polygon faces which abut the edges of the planar polygon face last added to the ordered list (this being the face added at step S11-2 the first time step S11-4 is performed), and identifies the planar polygon faces which share the vertex selected at step S8-6.

More particularly, referring to the example shown in FIG. 10, polygon faces B, F and X are the polygons which abut the edges of the polygon face A added to the ordered list a step S11-2. From these three polygons, polygons B and F share the vertex 3620 with polygon A, but polygon X does not contain the vertex 3620.

At step S11-6, polyhedron generator 3070 determines whether the faces identified at step S11-4 are already on the ordered list. When the ordered list contains only one face before step S11-4 is performed, then neither of the faces identified at step S11-4 will be present on the list. On the other hand, when more than one planar face is present on the ordered list when step S11-4 is performed, then one of the faces identified at step S11-4 will be present on the list, and the other face identified at step S11-4 will not be present on the list. In addition, when all of the planar faces having the vertex selected at step S8-6 are already present on the ordered list when step S11-4 is performed, then both of the faces identified at step S11-4 will themselves already be present on the ordered list and the adjacency order for all of the planar faces sharing the vertex will have been determined.

Accordingly, when it is determined at step S11-6 that at least one planar face identified at step S11-4 is not present on the ordered list, processing proceeds to step S11-8, at which the planar face not on the list is added to the list. More particularly, in the case that neither of the two planar faces identified at step S11-4 is present on the ordered list, then, in the processing at step S11-8, one of the two faces is arbitrarily selected and added to the list. In the case that only one of the two faces identified at step S11-4 is not present on the order list, then this face is added to the list at step S11-8.

When it is determined at step S11-6 that both of the planar faces identified at step S11-4 are already on the ordered list, the processing is complete.

Referring again to FIG. 8, at step S8-10, polyhedron generator 3070 considers the planar faces identified at step S8-8 which share the vertex selected at step S8-6, and determines whether more than three planar faces meet at the vertex.

If it is determined at step S8-10 that more than three planar faces meet at the vertex, then, at step S8-12, polyhedron generator 3070 replaces the vertex selected at step S8-6 with a plurality of new "virtual" vertices arranged such that no more than three of the planar faces identified at step S8-8 meet at each new vertex.

More particularly, in this embodiment, if "n" planar polygon faces $p_1, p_2 \ldots p_n$ meet at the vertex, then polyhedron generator 3070 replaces the vertex with "n-2" new virtual vertices $(p_1, p_2, p_n), (p_2, p_3, p_n) \ldots (p_{n-2}, p_{n-1}, p_n)$, where the vertex notation $(p_1, p_2, p_n)$ defines that the planar faces $p_1, p_2$ and $p_n$ meet at the vertex.

In this embodiment, each new virtual vertex generated at step S8-12 has the same 3D position as the original vertex selected at step S8-6 which it replaces.

The processing performed by polyhedron generator 3070 at step S8-12 will now be explained in further detail with reference to FIG. 12, which corresponds to the example shown in FIG. 10.

Referring to FIG. 10 first, six polygon faces A, B, C, D, E and F meet at the vertex 3620. Accordingly, in this example "n" is equal to 6 and polyhedron generator 3070 replaces vertex 3620 with four new virtual vertices at step S8-12 (n-2=4 in this example).

Referring now to FIG. 12, the four new virtual vertices added by polyhedron generator 3070 are the vertices 3630, 3640, 3650 and 3660. These new virtual vertices are shown at different positions in FIG. 12 so that they can be seen clearly. However, as noted above, each of the new virtual vertices is actually defined to have the same position as the original vertex 3620.

Virtual vertex 3630 is defined so that the three polygons $p_1, p_2$ and $p_n$ meet at the vertex. Thus, in the example of FIG. 12, polygons A, B and F meet at the vertex 3630. Virtual vertex 3640 is defined so that polygons $p_2, p_3$ and $p_n$ meet at the vertex. Thus, in the example of FIG. 12 polygons B, C and F meet at the vertex 3640.

Virtual vertex 3650 is defined so that polygons $p_3, p_4$ and $p_n$ meet at the vertex. Thus, in the example shown in FIG. 12, polygons C, D and F meet at vertex 3650.

Similarly, virtual vertex 3660 is defined so that polygons $p_4, p_5$ and $p_6$ meet at the vertex. Thus, in the example shown in FIG. 12, polygons D, E and F meet at vertex 3660.

Referring again to FIG. 8, after performing the processing at step S8-12 (or if it is determined at step S8-10 that the processing at step S8-12 is unnecessary because no more than three planar faces meet at the vertex), processing proceeds to step S8-14.

At step S8-14, polyhedron generator 3070 determines whether there is another vertex which has not yet been processed in the polyhedron currently being considered. Steps S8-6 to S8-14 are repeated until each vertex in the polyhedron has been processed in the way described above. As a result of performing this processing, polyhedron generator 3070 has converted the polyhedron generated at step S8-4 from a complex polyhedron to a simple polyhedron.

At step S8-16, polyhedron generator 3070 determines whether there is another triangulated depth map to be processed.

Steps S8-2 to S8-16 are repeated until each triangulated depth map previously generated at step S2-8 has been processed in the way described above.

In this way, polyhedron generator 3070 generates a respective polyhedron, such as the polyhedron 3600 shown in FIG. 9c for depth map 3210, for each depth map.

As will now be described, processing apparatus 3002 calculates the intersections of the planar polygons making up these polyhedra. Any 3D point at which three of the polygons meet (irrespective of whether the polygons are from the same depth map polyhedron, two polyhedra from different depth maps or three polyhedra from different depth maps) defines a 3D point which potentially represents a point on the surface of the subject object 3300. Each potential point is tested to determine whether it actually represents a point on the subject object. Processing is then carried out to connect the points representing actual surface points to generate a 3D computer model comprising a 3D polygon mesh representing the surface of the subject object 3300.

Referring again to FIG. 2, at step S2-12, 3D point calculator 3090 performs processing to calculate 3D points lying on the surface of the subject object 3300.

To ensure that the generated 3D computer model accurately represents the surface of the subject object 3300, each intersection of polygons which results in a vertex of the surface of the subject object needs to be computed. As will be described in the second embodiment, this could be achieved by testing each polygon against every other polygon to generate a complete set of 3D points. However, the number of computations necessary to calculate 3D points representing vertices of the subject object surface in this way is extremely large. More particularly, if the total number of polygons in all the polyhedra is "n", then $O(n^3)$ computations would be required. In addition, much of the computation will be unnecessary because many of the polygons tested will not intersect (and hence will not lead to the generation of a 3D point) and because 3D points which do not lie on the surface of subject object 210 may be generated (so that the 3D points will need to be processed further to determine which ones actually represent vertices for the model of the subject object 210).

Consequently, in this first embodiment, processing is performed in a way which reduces the number of computations necessary to calculate 3D points representing vertices of the subject object surface.

Before describing this processing in detail, the principles of the processing will be described.

More particularly, in this embodiment, processing is performed to consider a volume of the 3D space containing the polyhedra generated at step S2-10, and to test the volume to determine whether:

(1) the volume can be discarded, either because there are not enough polygons in the volume (that is, three in this embodiment) to intersect to generate a 3D point, or because the polygons in the volume cannot intersect at a 3D point which represents a vertex of the surface of the subject object 3300 (as will be explained in more detail below);

(2) the volume is to be subdivided to consider smaller volumes, because the volume contains enough polygons to intersect and generate more than a predetermined number of 3D points (in this embodiment one 3D point) which may represent a vertex of the surface of the subject object 3300; or (3) the volume contains the correct number of polygons (three in this embodiment) to intersect and generate a sufficiently small predetermined number (one in this embodiment) of 3D points which may represent vertices of the surface of the subject object 3300, in which case the 3D positions of these points are calculated and tested to determine whether they actually represent vertices of the subject object 3300.

In this way, the processing ensures that all vertices of the surface of the subject object 3300 defined by the intersection of the depth map polyhedra are calculated, while avoiding unnecessary processing which does not lead to the calculation of such a 3D point. In particular, large volumes of 3D space can be discarded without further calculation.

To determine whether a volume can be discarded because the polygons therein cannot intersect at a 3D point which represents a vertex of the surface of the subject object 3300, processing is performed to determine whether the 3D point will lie within all of the polyhedra not contributing a polygon which intersects at the 3D point. Thus, referring to the example shown in FIG. 3 and FIG. 9c, in the case of a 3D point defined by the intersection of polygons from the polyhedra of depth maps 3210, 3220 and 3230, processing is performed to determine whether the 3D point will lie within all of the polyhedra of depth maps 3200, 3240, 3250, 3260 and 3270 (because these polyhedra do not contain one of the three planes intersecting at the 3D point). As will be explained below, if it is found that a 3D point will lie outside at least one of the depth map polyhedra, the processing in this embodiment does not calculate and test the point, thereby reducing the amount of processing carried out.

In this embodiment, when a 3D point is calculated, it is subsequently tested to determine whether it represents a vertex of the subject object 3300. This is because a 3D point is calculated when a 3D volume is identified which contains three planar polygons. However, the polygons may not actually intersect at a 3D point within the volume. Accordingly, a test is carried out in this embodiment to determine whether the calculated 3D point is within the identified volume. In addition, the 3D point is calculated by calculating the intersection of the three respective planes in which the polygons lie, with the result that the calculated 3D point may not lie within one or more of the polygons. Accordingly, in this embodiment, a test is carried out to determine whether the calculated 3D point is within the identified volume and is within all three of the polygons.

The processing performed in this embodiment to calculate 3D points representing vertices of the subject object 3300 will now be described in detail.

FIG. 13 shows the processing operations performed by 3D point calculator 3090 at step S2-12.

Referring to FIG. 13, at step S13-2, 3D point calculator 3090 defines a volume in 3D space in which all 3D points representing vertices of the subject object surface will lie.

More particularly, in this embodiment, 3D point calculator 3090 defines the volume at step S13-2 to be a volume which is the axis-aligned bounding volume of the 3D points previously generated at step S8-4. In other words, 3D point calculator 3090 defines a bounding volume for the points making up each respective "front" end face (for example face 3610 in the example of FIG. 9c) of the polyhedra generated at step S8-4. The bounding volume is defined in a conventional manner with sides parallel to the x, y and z coordinate axes, and accordingly the processing will not be described here.

At step S13-4, 3D point calculator 3090 subdivides the 3D volume defined at step S13-2 into a plurality of smaller, child volumes, and adds the child volumes to the top of a memory storage stack. More particularly, in this embodiment, the subdivision of the volume at step S13-4 comprises the binary subdivision of the volume to generate eight new child volumes.

At step S13-6, 3D point calculator 3090 pops the next volume off the top of the stack created at step S13-4 (this being the first volume the first time step S13-6 is performed), and at step S13-8 determines the state of the volume popped off the stack.

In the processing at step S13-8, 3D point calculator 3090 determines whether the volume popped off the stack at step S13-6 cannot contain any 3D point representing a vertex of the subject object 3300 (and hence can be discarded), whether the volume needs to be subdivided because it contains a sufficient number of polygons to define more than one 3D point which may represent a vertex of the subject object, or whether the volume contains only enough polygons to define just a single 3D point which may represent a vertex of the subject object, in which case the position of the 3D point can be calculated and tested.

FIG. 14 shows the processing operations performed by 3D point calculator 3090 at step S13-8.

Referring to FIG. 14, at steps S14-2 to S14-10, 3D point calculator 3090 performs processing to determine which polygons defining the depth map polyhedra generated at step S2-10 intersect the volume popped off the stack at step S13-6. This processing is performed in a computationally efficient way by testing only the polygons which intersect the parent volume (that is, the volume divided to create the volume currently being processed) for intersections with the current volume, and storing a list of the polygons which do intersect the current volume for use when a child volume of the current volume is processed.

More particularly, at step S14-2, 3D point calculator 3090 considers the list of polygons which intersect the parent volume (this being all of the polygons defining the depth map polyhedra when the parent volume is the bounding volume defined at step S13-2).

At step S14-4, 3D point calculator 3090 considers the next polygon on the list read at step S14-2 (this being the first polygon the first time step S14-4 is performed), and at step S14-6 determines whether the polygon intersects the current volume. The processing performed in this embodiment to test whether a polygon intersects the current volume is carried out in a conventional way, for example as described in Graphics Gems V pages 375–379, edited by Alan W Paeth, published by Morgan Kaufmann, ISBN 0-12-543455-3.

If it is determined at step S14-6 that the polygon does intersect the current volume, then, at step S14-8, 3D point calculator 3090 adds the polygon to the list of polygons which intersect the current volume.

On the other hand, if it is determined at step S14-6 that the polygon does not intersect the current volume, then step S14-8 is omitted.

At step S14-10, 3D point calculator 3090 determines whether there is another polygon on the list read at step S14-2. Steps S14-4 to S14-10 are repeated until each polygon on the list read at step S14-2 has been processed in the way described above.

At steps S14-12 to S14-26, 3D point calculator 3090 performs processing to determine whether the volume popped off the stack at step S13-6 can be discarded because it is wholly outside one or more of the depth map polyhedra (and hence any 3D point lying in the volume cannot represent a vertex of the subject object 3300). In this embodiment, this processing comprises testing the volume to determine whether it is enclosed by all of the depth map polyhedra generated at step S2-10. In addition, the processing is performed in a particularly computationally efficient way. More particularly, if a volume is enclosed by a polyhedron, then all of its children volumes are also enclosed by the polyhedron. Accordingly, in this embodiment, 3D point calculator 3090 tests only the polyhedra that have not been verified as enclosing the parent volume (referred to hereinafter as "active polyhedra") to determine whether they enclose the current volume. When a polyhedron is verified as enclosing the current volume, this polyhedron is removed from the list of active polyhedra which is passed to each child volume of the current volume.

More particularly, at step S14-12, 3D point calculator 3090 copies the list of active polyhedra for the parent volume (that is, as described above, the list of polyhedra that have not been verified as enclosing the parent volume) as a list for the current volume. In the case where the parent volume is the bounding volume defined at step S13-2, the list of active polyhedra comprises all of the polyhedra generated at step S2-10.

At step S14-14, 3D point calculator 3090 determines whether there are any polyhedra on the list copied at step S14-12 which do not contain at least one polygon intersecting the current volume. More particularly, 3D point calculator 3090 reads the list of polygons which intersect the current volume generated at step S14-8 to identify any polyhedron on the list copied at step S14-12 which does not have at least one polygon which intersects the current volume.

If a polyhedron has a polygon which does intersect the current volume, then the current volume lies partly inside and partly outside the polyhedron. Further, if all of the polyhedra contain a polygon which intersects the current volume, then the current volume is partly inside and partly outside every polyhedron and accordingly the volume cannot be discarded because it does not lie wholly outside at least one polyhedron. Therefore, if it is determined at step S14-14 that all of the polyhedra contain at least one polygon which intersects the current volume, processing proceeds to step S14-28 which will be described later.

On the other hand, if it is determined at step S14-14 that a polyhedron contains no polygons which intersect the current volume, then the current volume either lies wholly inside the polyhedron (that is, the volume is enclosed by the polyhedron) or the volume lies wholly outside the polyhedron. In this case, 3D point calculator 3090 performs processing at steps S14-16 to S14-26 to determine whether the current volume is inside or outside each polyhedron having no polygons which intersect the current volume.

More particularly, at step S14-16, 3D point calculator 3090 considers the next polyhedron on the list having no polygons which intersect the current volume (this being the first such polyhedron the first time step S14-16 is performed).

At step S4-18, 3D point calculator 3090 tests whether the volume popped off the stack at step S13-6 is inside or outside the polyhedron.

FIG. 15 shows the processing operations performed by the 3D point calculator 3090 at step S14-18.

Referring to FIG. 15, at step S15-2, 3D point calculator 3090 selects a point in the volume popped off the stack at step S13-6. Any point in the volume will do and, in this embodiment, 3D point calculator 3090 selects the first vertex of the first face of the volume.

At step S15-4, 3D point calculator 3090 projects a ray from the point selected at step S15-2 to meet the position of the centre of projection of the camera for the depth map image from which the polyhedron being tested was generated. In other words, if the polyhedron 3600 shown in the example of FIG. 9c was being tested, then the ray would be projected to the point 3410 because the polyhedron 3600 was generated from the depth map 3210.

In addition to projecting the ray, 3D point calculator 3090 also calculates the number of intersections of the ray with the polyhedron, and at step S15-6, determines whether the number of intersections of the ray with the polyhedron is odd or even.

The reason for this test will be described with reference to FIGS. 16a and 16b.

Referring to FIG. 16a, in the case where a volume 3700 popped off the stack at step S13-6 is inside a polyhedron (for example polyhedron 3600 from the example of FIG. 9c), then the ray 3710 projected at step S15-4 will intersect the polyhedron 3600 an odd number of times. In the example shown in FIG. 16a, the ray 3710 intersects the polyhedron 3600 once at point 3720. However, the ray 3710 may intersect the polyhedron 3600 at 3, 5 or a higher odd number of points depending on the shape of the polyhedron 3600. However, in all cases where the volume 3700 is inside the polyhedron 3600, the number of intersections of the ray 3710 with the polyhedron 3600 will be odd. This is because the camera centre of projection 3410 to which ray 3710 is projected is, by definition, outside the polyhedron 3600 which was generated for the camera.

On the other hand, referring to FIG. 16b, in the case of a volume 3730 or 3740 popped off the stack at step S13-6 lies outside the polyhedron 3600, the ray projected at step S15-4 will intersect the polyhedron 3600 at an even number of places. More particularly, the ray 3750 projected from volume 3730 to the camera centre of projection 3410 intersects the polyhedron 3600 at two places, namely point 3760 (where the ray enters the polyhedron) and point 3770 (where the ray exits the polyhedron). Of course, the ray 3750 may intersect the polyhedron 3600 at a higher even number of places depending upon the shape of the polyhedron 3600. In the case of ray 3780 projected from volume 3740 to the camera centre of projection 3410, this ray does not intersect the polyhedron 3600 at all (zero intersections being considered to be an even number of intersections in this embodiment).

Referring again to FIG. 15, if it is determined at step S15-6 that the number of intersections of the ray projected at step S15-4 with the polyhedron is odd, then at step S15-8, 3D point calculator 3090 sets a flag to indicate the volume popped off the stack at step S13-6 is inside the polyhedron.

On the other hand, if it is determined at step S15-6 that the number of intersections of the ray projected at step S15-4 with the polyhedron is even, then at step S15-10, 3D point calculator 3090 sets a flag to indicate that the volume popped off the stack at step S13-6 is outside the polyhedron.

Referring again to FIG. 14, at step S14-20, 3D point calculator 3090 reads the flag set at step S15-8 or step S15-10 to determine whether the current volume is inside or outside the polyhedron.

If the volume is outside the polyhedron, then at step S14-22, 3D point calculator 3090 sets a flag to indicate that the state of the volume popped off the stack at step S13-6 has been determined to be "discard" because the volume lies completely outside one of the depth map polyhedra and hence cannot contain a 3D point representing a vertex of the subject object 3300.

After step S14-22 has been performed, processing returns to step S13-10 in FIG. 13. This is because it is not necessary to determine the relationship between the current volume and any further polyhedra because only one polyhedron needs to be identified which the current volume is outside for 3D point calculator 3090 to determine that the current volume cannot contain a 3D point representing a vertex of the subject object 3300.

On the other hand, if it is determined at step S14-20 that the volume popped off the stack at step S13-6 is inside by the polyhedron, then at step S14-24, 3D point calculator 3090 deletes the polyhedron from the list of active polyhedra for the current volume, so that the polyhedron is not tested to determine whether it encloses any child volumes of the current volume.

Processing then proceeds to step S14-26, at which 3D point calculator 3090 determines whether there is another polyhedron on the list copied at step S14-12 containing no polygons which intersect the current volume. Steps S14-16 to S14-26 are repeated until each such polyhedron has been processed in the way described above, or until it is determined at step S14-20 that the current volume is outside one of the polyhedra (in which case the state of the volume is determined to be "discard" at step S14-22 and processing returns to step S13-10).

When it is determined at step S14-14 that there are no polyhedra on the list copied at step S14-12 having no polygons which intersect the current volume, or when it is determined at step S14-26 that all such polygons have been processed and found to enclose the current volume, processing proceeds to step S14-28.

At step S14-28, 3D point calculator 3090 reads the list generated at step S14-8 defining the polygons which intersect the current volume.

At step S14-30, 3D point calculator 3090 determines whether the number of polygons on the list read at step S14-28 is 3, more than 3 or less than 3.

If it is determined at step S14-30 that the number of polygons which intersect the current volume is less than 3, then, at step S14-32, 3D point calculator 3090 sets a flag to indicate that the state of the volume popped off the stack at step S13-6 has been determined to be "discard" because the volume does not contain a sufficient number of polygons to intersect and generate a 3D point representing a vertex of the subject object 3300. Processing then returns to step S13-10 in FIG. 13.

If it is determined at step S14-30 that the number of polygons which intersect the current volume is 3, then, at step S14-34, 3D point calculator 3090 sets a flag to indicate that the state of the volume popped off the stack at step S13-6 has been determined to be "calculate vertex" because the volume contains the correct number of polygons to intersect and define a single 3D point which may represent a vertex of the subject object 3300. Processing then returns to step S13-10 in FIG. 13.

If it is determined at step S14-30 that the number of polygons which intersect the current volume is greater than 3, then processing proceeds to step S14-36, at which 3D point calculator 3090 determines whether all of the polygons which intersect the current volume are from the same depth map polyhedron. This may occur, for example, in the case of the polygons intersecting at virtual vertices generated at step S8-12 because all of the virtual vertices which replace a given original vertex have the same 3D position in this embodiment.

If it is determined at step S14-36 that all of the polygons which intersect the current volume are from the same polyhedron, then at step S14-38, 3D point calculator 3090 sets a flag to indicate that the state of the volume popped off the stack at step S13-6 has been determined to be "calculate multiple vertices". Processing then returns to step S13-10 in FIG. 13.

On the other hand, if it is determined at step S14-36 that all of the polygons are not from the same polyhedron, then, at step S14-40, 3D point calculator 3090 sets a flag to indicate that the state of the volume popped off the stack at step S13-6 has been determined to be "subdivide" because it contains more than the required number of polygons (that is 3) from different polyhedra to intersect and generate a single 3D point which may represent a vertex of the subject object 3300. Processing then returns to step S13-10 in FIG. 13.

As a result of the processing described above with reference to FIG. 14, 3D point calculator 3090 has determined the state of the volume popped off the stack at step S13-6 and has set a flag in dependence upon the determined state indicating what subsequent processing is to be performed on the volume.

Referring again to FIG. 13, after performing processing as described above to determine the state of the volume, at step S13-10, 3D point calculator 3090 determines whether the state of the volume is "calculate vertex".

If it is determined at step S13-10 that a vertex is to be calculated, processing proceeds to step S13-12 to calculate the vertex, otherwise step S13-12 is omitted.

FIG. 17 shows the processing operations performed by 3D point calculator 3090 at step S13-12 to calculate a vertex.

Referring to FIG. 17, at step S17-2, 3D point calculator 3090 calculates the 3D position of the point at which the three planes containing the three respective polygons intersect (that is, the three polygons previously found to intersect the volume popped off the stack at step S13-6). This processing being performed using a conventional plane intersection technique.

At step S17-4, 3D point calculator 3090 determines whether the 3D point calculated at step S17-2 is both within the 3D volume popped off the stack at step S13-6 and also within all three of the 2D polygons. This test is necessary because the 3D point is calculated as the intersection of the planes containing the polygons, and accordingly the planes will not necessarily intersect each other at a point in the volume or at a point which is actually part of (that is, within) the polygons. Because the volume popped off the stack at step S13-6 is an axis-aligned cuboid, the test to determine whether the 3D point is inside the volume is performed using conventional inequality tests between the coordinates of the 3D point and the minimum and maximum x, y and z coordinates of the volume. The processing to determine whether the 3D point is within each 2D polygon is also carried out in a conventional manner, for example as described in Graphics Gems IV pages 16–46, edited by P. Heckbert, published by Morgan Kaufmann, ISBN 0-12-336155-9.

If it is determined at step S17-4 that the calculated 3D point is inside the volume and is also within all three of the polygons, then processing proceeds to step S17-6, at which 3D point calculator 3090 adds the calculated 3D point to the list of 3D points representing vertices of the subject object 3300.

On the other hand, if it is determined at step S17-4 that the calculated 3D point is outside the volume or is outside at least one of the three polygons, then step S17-6 is omitted.

At step S17-8, 3D point calculator 3090 sets a flag to indicate that the volume popped off the stack at step S13-6 is now to be discarded because processing of it is complete.

Referring again to FIG. 13, at step S13-14, 3D point calculator 3090 determines whether the state of the volume popped off the stack at step S13-6 is set to "calculate multiple vertices" and, if it is, at step S13-16, performs processing to calculate and test the multiple vertices.

FIG. 18 shows the processing operations performed by 3D point calculator 3090 at step S13-16.

Referring to FIG. 18, at step S18-2, 3D point calculator 3090 considers as a start set of vertices the set of vertices comprising all the vertices of every polygon where it intersects the volume.

At step S18-4, 3D point calculator 3090 identifies the vertices in the set for which the three polygons that meet thereat are all polygons which intersect the volume.

At step S18-6, 3D point calculator 3090 considers the next vertex identified at step S18-4 (this being the first vertex the first time step S18-6 is performed).

At step S18-8, 3D point calculator 3090 tests whether the vertex selected at step S18-6 is inside the volume popped off the stack at step S18-6 and, if it is, at step S18-10 adds the vertex to the list of vertices of the subject object. On the other hand, if it is found at step S18-8 that the vertex is outside the volume, then step S18-10 is omitted. As a result of this processing, virtual vertices generated at step S8-12 will be added to the list of vertices of the subject object, and consequently the list will contain vertices having the same position.

At step S18-12, 3D point calculator 3090 determines whether there is another vertex identified at step S18-4 to be processed. Steps S18-6 to S18-12 are repeated until each such vertex has been processed in the way described above.

When all of the vertices identified at step S18-4 have been processed in this way, at step S18-14, 3D point calculator 3090 sets a flag to indicate that the state of the volume popped off the stack at step S13-6 is now "discard" because processing of it is complete.

Referring again to FIG. 13, at step S13-18, 3D point calculator 3090 determines whether the state of the volume popped off the stack at step S13-6 is set to "discard" or "subdivide".

If the state is set to "discard" (which can result from processing at step S13-8 or as a result of step S17-8 or step S18-24), then, at step S13-20, 3D point calculator 3090 discards the volume.

On the other hand, if the state of the volume is set to "subdivide", then, at step S13-22, 3D point calculator 3090 subdivides the volume and adds the child volumes to the top of the stack created at step S13-4. In this embodiment, the subdivision of the volume at step S13-22 is performed in the same way as the subdivision at step S13-4—that is, it comprises binary subdivision of the volume to generate eight new child volumes.

Following step S13-20 or step S13-22, processing proceeds to step S13-24, at which 3D point calculator 2080 determines whether there is another volume on the stack (including any child volumes added at step S13-22).

Steps S13-6 to S13-24 are repeated until each volume on the stack has been processed in the way described above.

As a result of performing processing in this way, 3D point calculator 3090 has generated a set of points in 3D space representing vertices of the subject object 3300. Each vertex represents the position at which three polygons from one or more depth map polyhedra meet.

Referring again to FIG. 2, after the processing at step S2-12 to calculate 3D points representing vertices of the subject object 3300, at step S2-14, polygon generator 3100 performs processing to connect the calculated 3D points to generate a polygon mesh representing the surface of the subject object.

FIG. 19 shows the processing operations performed by polygon generator 3100 at step S2-14.

Referring to FIG. 19, at step S19-2, a polygon generator 3100 generates identification data for the polygons in the polygon mesh to be generated, and determines a so-called "signature" for each 3D point generated by 3D point calculator 3090.

FIG. 20 shows the processing operations performed by polygon generator 3100 at step S19-2 to generate polygon ID data and define a "signature" for each calculated 3D point representing a vertex of the subject object 3300.

Referring to FIG. 20, at step S20-2, polygon generator 3100 considers the next polygon from which a 3D point was calculated by 3D point calculator 3090 as a vertex of the subject object 3300 (this being the first such polygon the first time this step is performed).

At step S20-4, polygon generator 3100 assigns a unique ID to the polygon selected at step S20-2 unless an ID has been assigned on a previous iteration of this step.

At step S20-6, polygon generator 3100 determines whether there is another polygon used to calculate a vertex of the subject object 3300, and steps S20-2 to S20-6 are repeated until each such polygon has been processed in the way described above.

At step S20-8, polygon generator 3100 considers the next calculated vertex of the subject object 3300 from the list generated by polygon generator 3100 at steps S17-6 and S18-10, and at step S20-10 defines a signature for the vertex comprising the IDs of the polygons which meet at the 3D point (these being the IDs assigned to the polygons at step S20-4).

At step S20-12, polygon generator 3100 determines whether there is another calculated vertex of the subject object 3300 on the list generated at steps S17-6 and S18-10, and steps S20-8 to S20-12 are repeated until each vertex has been processed in the way described above.

Referring again to FIG. 19, at step S19-4, polygon generator 3100 organises the 3D points previously calculated by 3D point calculator 3090 into sets in dependence upon the signatures defined at step S19-2.

FIG. 21 shows the processing operations performed by polygon generator 3100 at step S19-4.

Referring to FIG. 21, at step S21-2, polygon generator 3100 considers the next 3D point previously calculated by 3D point calculator 3090 at step S2-12 (this being the first 3D point the first time step S19-2 is performed).

At step S21-4, polygon generator 3100 reads the signature of the point selected at step S21-2 (this being the signature previously allocated at step S19-2), and at step S21-6 allocates the 3D point to the set of points for each polygon defined in the signature. That is, the 3D point is allocated to three different sets, one set for each polygon defined in the signature of the 3D point.

At step S21-8, polygon generator 3100 determines whether there is another 3D point calculated by 3D point calculator 3090 to be processed, and steps S21-2 to S21-8 are repeated until each such 3D point has been processed in the way described above.

As a result of the processing described above with reference to FIG. 21, a set of points is generated for each polygon in the surface model of the subject object 3300. The points in each set define one or more polygons that lie on a given plane of the surface of the subject object 3300.

Referring again to FIG. 19, at step S19-6, polygon generator 3100 determines the order in which the 3D points in each set are to be connected to generate a polygon representing part of the surface of the subject object 3300.

Before describing the detailed processing steps performed by polygon generator 3100 at step S19-6, the principles of the processing will be described.

Referring to FIG. 22, four 3D points and five polygons are shown by way of example. The four 3D points calculated by 3D point calculator 3090 at step S2-12 are labelled V1, V2, V3 and V4, and the five polygons are labelled a, b, c, d, e.

Each edge (connection) to be calculated by polygon generator 3100 at step S19-6 connects two 3D points. To determine which 3D points are to be connected, in this embodiment, polygon generator 3100 makes use of the signatures of the 3D points. More particularly, two 3D points which are to be connected have in their signatures assigned at step S19-2 two polygon IDs which are common to both signatures. For example, the signature of 3D point V1 in FIG. 22 is {a, b, e} and the signature of 3D point V2 is {a, b, c}. The polygon IDs a and b are therefore common to the signatures and identify a connection between the 3D points V1 and V2 because they define polygons which meet at an edge between the 3D points V1 and V2 as shown in FIG. 22.

As will be explained below, in the processing at step S19-6, polygon generator 3100 determines connections between the 3D points in each individual polygon by following edges around the polygon determined using the signatures of the 3D points in the way described above until the connections return to the start 3D point.

In the case of a convex subject object, this is the only processing which needs to be performed to connect the 3D points because in each set of 3D points generated at step S19-4 (comprising 3D points lying on the same polygon plane), there will be only two 3D points having in their signatures two polygon IDs which are the same. By way of example, referring to FIG. 22, the set of 3D points for polygon a comprises the points V1, V2, V3 and V4 but only the points V1 and V2 have the polygon IDs a and b in their signatures.

However, for parts of a subject object surface which are not convex, there may be more than two 3D points which have the same two polygon IDs in their signatures, and hence the connections between the 3D points cannot be determined based on the signatures alone.

By way of example, FIG. 23 shows an example in which four 3D points 1000, 1010, 1020, 1030 lie on the intersection of two polygons 910, 1040. Accordingly, in this example, the signature of each of the four 3D points 1000, 1010, 1020, 1030 contains the polygon IDs of the polygons 910 and 1040.

To address this problem, in this embodiment, polygon generator 3100 performs processing to determine the connections between the 3D points by connecting the points in pairs based in the order that they occur along the edge defined by the intersection of the polygons 910 and 1040. This processing will be described in detail below.

As will also be explained below, in this embodiment, polygon generator 3100 also performs processing to address a further problem that can occur with parts of a subject object surface which are not convex, namely the problem that more than one polygon representing the object surface may lie in the same plane of one polygon.

A first way in which this can occur is shown in the example of FIG. 28, in which the polygons 1050 and 1060 representing separate parts of the subject object surface both lie in the plane of polygon 910.

A second way in which more than one polygon may lie in the same plane is illustrated in FIG. 24. In this example, polygon 1100 represents part of the object surface and polygon 1110 represents a hole in the subject object surface.

The processing performed by polygon generator 3100 at step S19-6 will now be described in detail.

FIG. 25 shows the processing operations performed by polygon generator 3100 at step S19-6.

Referring to FIG. 25, at step S25-2, polygon generator 3100 creates an empty polygon set "S" for the 3D computer model of the subject object 3300, to which polygons representing parts of the surface of the subject object 3300 will be added as they are calculated.

At step S25-4, polygon generator 3100 considers the next polygon "p" and reads the 3D points in the set Vp generated at step S19-4 for the polygon.

At step S25-6, polygon generator 3100 determines whether there are any 3D points in the set Vp read at step S25-4. On the first iteration of the processing, 3D points will exist in the set Vp, and processing proceeds to step S25-8. However, in subsequent processing, 3D points are deleted from the set Vp after connections for the point have been calculated. Accordingly, on subsequent iterations, it may be determined at step S25-6 that no more 3D points remain in the set Vp, and in this case, processing proceeds to step S25-50, which will be described later.

At step S25-8, polygon generator 3100 adds a new polygon data structure "s" to the polygon set "S" created at step S25-2, into which data defining a polygon will be input as it is generated. Also at step S25-8, polygon generator 3100 stores data defining the normal vector for the polygon currently being considered in the polygon data structure "s" to define a normal for the polygon.

At step S25-10, polygon generator 3100 selects a 3D point from the set Vp as a start vertex "u" for the polygon (any of the 3D points may be selected as the start vertex "u").

At step S25-12, polygon generator 3100 sets a current vertex pointer "w" to the vertex "u" to indicate that this is the vertex currently being processed, and at step S25-14, reads the signature of the start vertex "u".

At step S25-16, polygon generator 3100 selects a polygon "q" defined in the signature read at step S30-14 which is not the same as the polygon "p" currently being considered (selected at step S25-4).

To assist understanding of the processing performed by polygon generator 3100, reference will be made to the example shown in FIG. 22. Referring to FIG. 22 by way of example, assume that the polygon "p" selected at step S30-4 is polygon "a". Accordingly, the 3D points in the set Vp are the 3D points V1, V2, V3 and V4.

Assume also that the 3D point V2 was selected as the start vertex (u) at step S25-10. Accordingly, at step S25-16, polygon generator 3100 selects either polygon b or polygon c since both of these polygons are defined in the signature of the 3D point V2 together with the polygon a. Assume that polygon c is selected at step S25-16.

Referring again to FIG. 25, at step S25-18, polygon generator 3100 removes the current vertex "w" (that is, 3D point V2 in the example being considered) from the set Vp, and at step S25-20 adds the vertex to the polygon data structure "s" generated at step S25-8 to define a vertex of the polygon "s".

At step S25-22, polygon generator 3100 determines the set "Vpq" of 3D points which remain in the set Vp and have the ID of polygon "q" selected at step S25-16 in their signature.

Referring again to the example in FIG. 22, 3D point V3 has the signature {a, c, d} and is the only point in the set Vp having polygon c (selected at step S25-16) in its signature.

At step S25-24, polygon generator 3100 determines whether there are any 3D points in the set Vpq determined at step S25-22.

On the first iteration of processing, 3D points will exist in the set Vpq. However, as described above, at step S25-18, each 3D point is removed from the set Vp after processing. Accordingly, when all the vertices of a polygon have been processed, no 3D points will exist in the set Vpq. In this case, processing returns to step S25-6, at which polygon generator 3100 determines whether there are any 3D points remaining in the set Vp.

Points may remain in the set Vp if there are more than two polygons of the subject object 3300 lying in the polygon "p" (this being a polygon of a depth map polyhedron), for example as shown in FIGS. 23 and 24 described above. In a situation where more than one polygon lies in the polygon "p", the test at step S25-24 will determine that there are no points in the set Vpq when one polygon has been processed and the processing performed at step S25-6 will determine that there are 3D points remaining in the set Vp when the connections for a further polygon lying in the polygon "p" remain to be calculated. In this case, when processing proceeds from step S25-6 to S25-8, a new polygon data structure is generated for the further polygon lying in the polygon "p".

When it is determined at step S25-24, that points exist in the set Vpq, processing proceeds to step S25-26, at which polygon generator 3100 determines whether the number of points in the set Vpq is equal to 1. Each 3D point in the set Vpq represents a 3D point which may be connected to the current vertex "w". Thus, if there is one, and only one, point in the set Vpq, then a case exists such as the example shown in FIG. 22. However, if there is more than one point in the set Vpq, then a case exists such as the example in FIG. 23 for the 3D points 1000, 1010, 1020 and 1030 described above.

When it is determined at step S25-26 that there is one, and only one, 3D point in the set Vpq, processing proceeds to step S25-28, at which polygon generator 3100 sets the next vertex "x" of the polygon "s" (that is, the vertex connected to the current vertex) to be the 3D point in the set Vpq.

Thus, in the example of FIG. 22, assuming polygon c to be the polygon selected at step S25-16, the next vertex "x" set at step S25-28 is the 3D point V3.

Processing then proceeds to step S25-44, at which polygon generator 3100 sets the current vertex pointer "w" to vertex "x".

At step S25-46, polygon generator 3100 reads the signature of the current vertex, and at step S25-48, selects the polygon "r" defined in the signature which is not polygon "p" selected at step S25-4 and is not polygon "q" selected at step S25-16. Thus, in the example of FIG. 22, the signature of 3D point V3 is {a, c, d} and therefore polygon d is selected at step S25-48.

Processing then returns to step S25-18, at which the current vertex is removed from the set Vp.

In this way, polygon generator 3100 traverses the 3D points in the polygon, determining for each vertex the connected vertex and deleting a vertex when it has been processed. Processing for a polygon is complete when it is determined at step S25-24 that there are no points in the set Vpq and that accordingly all of the vertices of the polygon have been connected.

Returning to step S25-26, if it is determined that there is more than one 3D point in the set Vpq, a situation has arisen such as that shown in the example of FIG. 23 in which a number of 3D points 1000, 1010, 1020, 1030 lie in a line defined by the intersection of two polygons. In this case, polygon generator 3100 performs processing to determine which 3D point in the set Vpq is to be connected to the 3D point currently being considered based on the relative positions of the 3D point currently being considered and the 3D points in the set Vpq along the straight line on which they all lie.

More particularly, at step S25-30, polygon generator 3100 determines whether there are an odd number or even number of 3D points in the set Vpq.

The number of 3D points lying on an edge defined by the intersection of two polygons must be even, by definition. This is because the 3D points must be connected in pairs—first to second, third to fourth, etc. Thus, referring to the example in FIG. 23, 3D point 1000 is connected to 3D point 1010 and 3D point 1020 is connected to 3D point 1030.

However, the number of 3D points in the set Vpq tested at step S25-30 may be odd because a case can occur in which one of the 3D points lying on the edge defined by the intersection of the two polygons was removed from the set Vp at step S25-18 because it was the current vertex "w" being processed.

On the other hand, if the start vertex "u" selected at step S25-10 comprises one of the vertices lying on the edge on which there are more than two vertices, and the next vertex processed is not a vertex lying on the edge having more than two vertices (that is, the start vertex was one of the end vertices on the edge having more than two vertices and the polygon is traversed in a direction which has not yet passed along the edge having more than two vertices), then the number of 3D points in the set Vpq tested at step S25-30 will be even because the start vertex will have been removed from the set Vp at step S25-18 and the current vertex w which is also a vertex lying on the edge having more than two vertices will also have been removed from the set Vp at step S25-18.

Thus, referring to FIG. 23 by way of example, assume that polygon 910 is the polygon selected at step S25-4, and that the 3D point 1000 is selected as the start vertex "u" at step S25-10. If polygon 1040 is selected at step S25-16, then at step S25-18, the 3D point 1000 is removed from the set Vp and at steps S25-22 and S25-24 the set Vpq is determined to contain three 3D points being the points 1010, 1020 and 1030. On the other hand, if polygon 1080 was selected at step S25-16 instead of polygon 1040, then the 3D point 1000 would be removed from the set Vp at step S25-18 and the 3D point 1070 would be processed at steps S25-28 and subsequent steps. In subsequent processing, one of the 3D points 1010, 1020 or 1030 will become the current vertex "w". When the first of these points becomes the current vertex "w" it will be removed from the set Vp at step S25-18, resulting in two points lying on the intersection of polygons 910 and 1040 remaining in the set Vpq tested at steps S25-24 and S25-26 (that is, an even number of points).

Consequently, if it is determined at step S25-30 that the number of points in the set Vpq is odd, polygon generator 3100 defines a set "Vline" of the 3D points lying on the intersection of polygons "p" and "q" such that the set comprises the current vertex "w" and the 3D points in the set Vpq.

On the other hand, if it is determined at step S25-30 that the number of points in the set Vpq is even, then at step S25-32, polygon generator 3100 defines a set "Vline" of 3D points lying on the intersection of polygons p and q such that the set comprises the current vertex "w", the start vertex "u" and the 3D points in the set Vpq.

Following step S25-32 or step S25-34, processing proceeds to step S25-36, at which polygon generator 3100 assigns a rank to each 3D point in the set Vline from rank 0 to rank n-1 (where n is the number of points in the set Vline) in dependence upon their relative positions along the line defined by the intersection of polygons "p" and "q". More particularly, one of the end points on the intersection (it does not matter which) is assigned rank 0 and the remaining points in the set Vline are assigned rank 1, 2, etc as their distance from the point of rank 0 increases. Thus, referring to the example shown in FIG. 23, if 3D point 1000 is assigned rank 0, then 3D point 1010 is assigned rank 1, 3D point 1020 is assigned rank 2 and 3D point 1030 is assigned rank 3.

At step S25-38, polygon generator 3100 determines whether the rank of the current vertex "w" is even or odd.

If it is determined at step S25-38 that the rank of the current vertex "w" is even, then at step S25-40, polygon generator 3100 sets the next vertex "x" of the polygon "s" (that is the vertex connected to the current vertex) to be the vertex "v" in the set Vpq such that:

$$\text{rank}(v) = \text{rank}(w) + 1 \quad (1)$$

On the other hand, if it is determined at step S25-38 that the rank of the current vertex "w" is odd, then at step S25-42, polygon generator 3100 sets the next vertex "x" and the polygon "s" to be vertex "v" in the set Vpq such that:

$$\text{rank}(v) = \text{rank}(w) - 1 \quad (2)$$

Processing then proceeds to step S25-44.

As described above, at step S25-44, polygon generator 3100 sets the current vertex pointer "w" to vertex "x" and at step S25-46 reads the signature of the new current vertex.

At step S25-48, polygon generator 3100 selects the polygon "r" defined in the signature read at step S25-46 which is not polygon "p" selected at step S25-4 and is not polygon "q" selected at step S25-16.

After step S25-48, processing returns to step S25-18.

Returning again to step S25-6, when it is determined that there are no more 3D points in the set Vp (because all of the 3D points have been removed on previous iterations of processing at step S25-18), then connections have been determined for all of the 3D points lying on the polygon "p" selected at step S25-4 and processing proceeds to step S25-50.

At step S25-50, polygon generator 3100 determines whether there is more than one subject object polygon lying in the depth map polyhedron polygon "p". More particularly, in this embodiment, polygon generator 3100 determines whether more than one polygon data structure "s" has been generated for the polygon "p" (a new polygon data structure "s" being generated for each polygon lying in the polygon "p" at step S25-8).

If it is determined at step S25-50 that there is more than one polygon lying in the polygon "p" processing proceeds to step S25-52, at which polygon generator 3100 tests each polygon lying in the polygon "p" to determine whether it contains any of the other polygons lying in the polygon "p".

At step S25-54, polygon generator 3100 determines whether each polygon lying in the polygon "p" represents part of the surface of the subject object 3300 or a hole therein. More particularly, if a polygon is not contained with any other polygons, then it represents a surface of the subject object 3300. For a case in which one, and only one, polygon lies inside another polygon, then the larger polygon represents the surface of the subject object 3300 and the smaller polygon which is contained in the larger polygon represents a hole in the surface. For cases in which there is more than one polygon contained in a polygon, polygon generator 3100 creates a hierarchy such that each parent polygon contains its children polygons. Polygon generator 3100 then identifies as surface of the subject object 3300 each polygon in the odd generations in the hierarchy and identifies as holes those polygons in the even generations.

On the other hand, if it is determined at step S25-50 that there is only one polygon in polygon "p", steps S25-52 and S25-54 are omitted.

At step S25-56, polygon generator 3100 determines whether there is another polygon identified at step S25-2 to be processed.

If it is determined at step S25-56 that another polygon remains to be processed, then processing returns to step S25-4.

Steps S25-4 to S25-56 are repeated until each polygon has been processed in the way described above.

As a result of this processing, polygon generator 3100 calculates a polygon mesh representing the surface of subject object 3300.

Referring again to FIG. 19, at step S19-8, polygon generator 3100 connects the 3D points in the polygons generated at step S19-6 to generate a mesh of connected planar triangles. In this embodiment, polygon generator 3100 performs processing at step S19-8 using a conventional method, for example from the Open GL Utility library "glutess", as described in Chapter 11 of the Open GL Programming Guide 2nd edition, ISBN 0-201-46138-2.

In this embodiment, when connecting the 3D points at step S19-8, polygon generator 3100 may connect points having the same position in 3D space (that is, virtual vertices generated at step S8-12).

Accordingly, referring again to FIG. 2, at step S2-16, polygon generator 3100 performs processing to collapse zero-length edges in the polygon mesh. This processing is performed in a conventional manner, for example as described in "Mesh Optimization" by Hoppe et al in ACM SIGGRAPH 93 Addison-Wesley, ISBN 0-201-58889-7".

At step S2-18, surface texturer 3110 processes the image data of the input depth maps to generate texture data for each surface triangle in the surface model generated by polygon generator 3100 at step S19-8.

More particularly, in this embodiment, surface texturer 3110 performs processing in a conventional manner to select each triangle in the surface mesh generated at step S19-8 and to find the input depth map "i" which is most front-facing to the selected triangle. That is, the input depth map is found for which the value $\hat{n}_t \cdot \hat{v}_i$ is largest where $\hat{n}_t$ is the triangle normal and $\hat{v}_i$ is the viewing direction for the "i"th depth map. This identifies the input depth map in which the selected surface triangle has the largest projected area.

The selected surface triangle is then projected into the identified input depth map, and the vertices of the projected triangle are used as texture coordinates in the image data of the depth map to define an image texture map.

Other techniques that may be used by surface texturer 3110 to generate texture data at step S2-18 are described in co-pending U.S. patent application Ser. No. 09/981,844, the full contents of which are incorporated herein by cross-reference.

The result of performing the processing described above is a VRML (or similar format) model of the surface of the subject object 3300, complete with texture coordinates defining image data to be rendered onto the model.

At step S2-20, central controller 3020 outputs the data defining the surface model of the subject object 3300 generated by polygon generator 3100 (and optionally the texture data therefor generated by surface texturer 3110) from output data store 3130. The data is output for example as data stored on a storage device such as disk 3140 or as a signal 3150. In addition, or instead, central controller 3020 causes display processor 3120 to display on display device 3004 an image of the 3D computer model of the subject object 3300 rendered with texture data in accordance with a viewpoint input by a user, for example, using a user input device 3006.

Second Embodiment

A second embodiment of the present invention will now be described.

The components of the second embodiment and the processing operations performed thereby are the same as those in the first embodiment, with the exception of the processing operations performed by 3D point calculator 3090 at step S2-12 and polygon generator 3100 at step S2-14 in FIG. 2 to calculate and connect 3D points representing vertices of the subject object 3300.

More particularly, in the second embodiment, instead of performing the processing described above with reference to FIGS. 13 to 18, 3D point calculator 3090 calculates the intersections of the polygons making up a first two of the depth map polyhedra (generated by polyhedron generator 3070 at step S2-10) and polygon generator 3100 connects the resulting points using a conventional method, for example such as that described in "An Algorithm for Determining the Intersection of Two Simple Polyhedra" by M. Szilvasi-Nagy in Computer Graphics Forum 3 (1984) pages 219–225, or as described in "A Volumetric Intersection Algorithm for 3D-Reconstruction Using a Boundary-Representation" by Martin Löhlein at http://i31www.ira.uka.de/diplomarbeiten/da_martin_loehlein/Reconstruction.html. This generates a first representation of the subject object comprising a polygon mesh. The intersections of the polygons making up the first representation and the next depth map polyhedron are then calculated by 3D point calculator 3090 and are connected together by polygon generator 3100 to generate a second polygon mesh representation of the subject object. This processing is again performed using a conventional method such as that described in the Szilvasi-Nagy or Löhlein reference above. The processing to intersect a polygon mesh representation with a further depth map polyhedron is repeated until all of the depth map polyhedra have been intersected, resulting in a final polygon mesh representation of the subject object 3300.

Although more computationally expensive than the processing performed by 3D point calculator 3090 in the first embodiment, the processing performed in the second embodiment is still effective at accurately calculating 3D points representing vertices of the subject object 3300.

Third Embodiment

A third embodiment of the present invention will now be described.

The components of the third embodiment and the processing operations performed thereby are the same as those in the first embodiment, with the exception of the processing operations performed by 3D point calculator 3090 at step S2-12 in FIG. 2 to calculate 3D points representing vertices of the subject object 3300.

More particularly, in the first embodiment, the initial volume defined at step S13-2 so that it will contain all of the points to be calculated on the surface of the subject object 3300 is repeatedly sub-divided into smaller volumes until sufficiently small volumes are generated that each can contain only a predetermined number of 3D points on the surface of the object 3300. When such smaller volumes are reached through the sub-division process, the 3D points are calculated and tested.

However, while this is a particularly efficient way of calculating the points representing points on the surface of the object, other methods are possible.

Therefore, in the third embodiment, the initial volume which will contain all of the calculated 3D points is divided into a plurality of parts without reference to the positions of the planar polygons making up the polyhedra and 3D point calculation is carried out without further sub-division of the parts.

More particularly, the volume defined at step S13-2 is divided into a plurality of parts (for example of the same shape and volume) and then each part is tested against the polyhedra to determine whether it is wholly outside at least one of the polyhedra generated at step S2-10.

If the volume part is outside at least one polyhedron, then the volume part is discarded. On the other hand, if the volume is at least partially within all of the polyhedra, the 3D points in the volume part at which planar polygons in the polyhedra intersect are calculated. In this way, each volume part is discarded or 3D points are calculated, but no further sub-division occurs.

To calculate the 3D points in a volume part, each combination of three planar polygons is considered and the intersection of these polygons is calculated and tested to determine whether it is within the volume part. This increases the number of intersections which need to be calculated and tested compared to the first embodiment described above, but is still an efficient way of generating the 3D computer model because volume parts can be discarded if they lie outside every polyhedra, and accordingly, not all possible intersections of the planar polygons making up the polyhedra have to be calculated and tested.

Fourth Embodiment

A fourth embodiment of the present invention will now be described.

The components of the fourth embodiment and the processing operations performed thereby are the same as those in the first embodiment, with the exception of the processing operations performed by 3D point calculator 3090 at step S2-12 and polygon generator 3100 at step S2-14 in FIG. 2 to calculate and connect 3D points representing vertices of the subject object 3300, which are different in the fourth embodiment.

These differences will now be described.

FIG. 26 shows the processing operations performed by 3D point calculator 3090 at step S2-12 in the fourth embodiment.

Referring to FIG. 26, at step S26-2, 3D point calculator 3090 considers all of the planar faces from all of the polyhedra generated at step S2-10, and considers the next set of three of these planar faces (this being the first such set the first time step S26-2 is performed).

At step S26-4, 3D point calculator 3090 calculates the point of intersection of the three planar faces considered at step S26-2. More particularly, in this embodiment, the point of intersection is calculated by calculating the point at which the three respective planes containing the three planar faces meet using a conventional plane intersection algorithm.

At step S26-6, 3D point calculator 3090 determines whether the point of intersection calculated at step S26-4 is within all of the polyhedra generated at step S2-10.

If it is determined at step S26-6 that the point is outside at least one polyhedron, then at step S26-8, the point is discarded because it cannot represent a point on the surface of the subject object 3300.

On the other hand, if it is determined at step S26-6 that the point is within all of the polyhedra, then at step S26-10, 3D point calculator 3090 determines whether the point is within all of the three planar faces considered at step S26-2 (it being noted that the point may be outside one or more of these planar faces because the point was calculated by calculating the point of intersection of the planes containing the faces and not by calculating the point of intersection of the planar faces themselves).

If it is determined at step S26-10 that the point is outside at least one of the planar faces, then at step S26-8 the point is discarded because it cannot represent a point on the surface of the subject object 3300.

On the other hand, if it is determined at step S26-10 that the point is within all three of the planar faces, then at step S26-12, the point is retained as a point on the surface of the subject object 3300. In addition, the point is assigned a "signature" comprising a triple formed from the three respective identifications of the planar faces which meet at the point.

At step S26-14, 3D point calculator 3090 determines whether there is another set of three planar faces. Steps S26-2 to S26-14 are repeated until each respective set of three planar faces has been processed in the way described above.

As a result of performing this processing, 3D point calculator 3090 has calculated and tested the point of intersection of every possible combination of three planar faces from the polyhedra generated at step S2-10, to generate a 3D computer model of the subject object 3300 comprising points in 3D space representing points on the surface of the subject object 3300.

At step S2-14, polygon generator 3100 connects the 3D points retained at step S26-12 using the signatures assigned to the points to determine which points should be connected together, thereby generating a polygon mesh representing the surface of the subject object 3300. Accordingly, the processing to connect the 3D points to generate a polygon mesh is performed after the 3D points resulting from the intersections of all of the polyhedra generated at step S2-10 have been calculated and tested.

The processing performed by polygon generator 3100 at step S2-14 in the fourth embodiment is the same as that performed in the first embodiment, with the exception that step S19-2 in FIG. 19 is not performed in the fourth embodiment because this processing is instead performed at step S26-12 in FIG. 26.

Many modifications can be made to the embodiments described above within the scope of claims.

For example, in the embodiments described above, the input data defines the intrinsic parameters of the camera. However, instead, default values may be assumed for some, or all, of the intrinsic camera parameters, or processing may be performed by processing apparatus 3002 to calculate the intrinsic parameter values in a conventional manner, for example as described in "Euclidean Reconstruction From Uncalibrated Views" by Hartley in Applications of Invariance in Computer Vision, Mundy, Zisserman and Forsyth eds, pages 237–256, Azores 1993.

In the first embodiment described above, the input data defines, for each pixel of each depth map, whether the pixel represents the subject object or something else (background), or processing is performed in apparatus 3002 to carry out this "segmentation" processing. However, such segmentation of the image data to define whether each pixel represents the subject object or background is not necessary for the rest of the processing in the first embodiment to operate successfully. This is because any background which is physically separate from the subject object will be removed when the polyhedra generated from the depth maps are intersected.

In the embodiments described above, the virtual vertices which are generated at step S8-12 are generated so that they all have the same 3D position. However, instead, the virtual vertices may be defined with small differences in their 3D positions. In this way, in the first embodiment, the processing at steps S14-36 to S14-40 can be replaced with a processing step which sets the state of the volume to "subdivide", and the processing at steps S13-14 and S13-16 need not be performed. The disadvantage with this modification to the first embodiment is, however, that many subdivisions of a 3D volume may be necessary to obtain a volume small enough that it contains a single one of the virtual vertices.

When subdividing a 3D volume popped off the stack in the first embodiment at steps S13-4 and S13-22, the subdivision carried out comprises the binary subdivision of the volume to generate eight new child volumes. However, different types of subdivision are, of course, possible.

In the embodiments described above, processing is performed by a computer using processing routines defined by programming instructions. However, some, or all, of the processing could be performed using hardware.

What is claimed is:

1. A method of processing data defining a plurality of depth maps of a subject object, to generate a 3D computer model of the subject object comprising points in a three-dimensional space representing points on the surface of the subject object, the method comprising:

processing each depth map to connect points therein to generate a respective two-dimensional mesh of connected points in each depth map;

projecting each two-dimensional mesh into three-dimensional space in dependence upon the position and orientation in the three-dimensional space of the depth map containing the mesh and the respective depths of the points in the mesh defined by the depth map, to generate a respective polyhedron from each depth map, each polyhedron comprising a three-dimensional mesh of connected vertices defining planar faces corresponding to the two-dimensional mesh, together with planar side faces for each edge of the three-dimensional mesh;

calculating points in the three-dimensional space representing points on the surface of the subject object by calculating the respective points at which a predetermined number of the planar surfaces from the generated polyhedra intersect.

2. A method according to claim 1, wherein each depth map comprises an array of pixels, and wherein, in the processing of a depth map to connect points therein, pixels are divided into sub-pixels and sub-pixels are connected to generate the two-dimensional mesh.

3. A method according to claim 1, further comprising processing each generated polyhedron prior to the intersection calculations, to replace each vertex in the polyhedron at which more than three planar faces meet with a plurality of vertices at each of which no more than three planar faces meet.

4. A method according to claim 3, wherein each replacement vertex is defined to have the same position in the three-dimensional space as the vertex which it replaces.

5. A method according to claim 1, wherein the calculation of points in the three-dimensional space representing points on the surface of the subject object comprises:

defining a volume of the three-dimensional space in which all points on the subject object must lie;

subdividing the volume into a plurality of volume parts;

testing the volume parts against the polyhedra generated from the depth maps, and:

discarding a volume part if it is wholly outside at least one of the polyhedra;

if a volume part is at least partially within all of the polyhedra, processing the data defining the planar surfaces which intersect the volume part and, in dependence upon the number of planar surfaces which intersect the volume part:

subdividing the volume part into a plurality of smaller volume parts for further testing;

calculating the 3D points in the volume part at which a predetermined number of the planar surfaces meet; or discarding the volume part.

6. A method according to claim 5, wherein a volume part is subdivided if the volume part is at least partially within all of the polyhedra and the number of planar surfaces which intersect the volume part is more than a predetermined number.

7. A method according to claim 5, wherein a volume part is discarded if the volume part is at least partially within all of the polyhedra and the number of planar surfaces which intersect the volume part is less than a predetermined number.

8. A method according to claim 5, wherein, when a volume part is tested, data is stored defining the planar surfaces which intersect the volume part, and when a smaller volume part is tested which was generated by subdivision of a parent volume part, only the planar surfaces which intersect the parent volume part are tested to determine whether they intersect the smaller volume part.

9. A method according to claim 5, wherein, when a volume part is tested, data is stored defining each polyhedron which the volume part is determined to lie wholly inside, and, when a smaller volume part is tested which was generated by subdivision of a parent volume part, tests are carried out to determine whether the smaller volume part lies inside each of the polyhedra not defined in the stored data, but no tests are carried out to determine whether the smaller volume part lies inside any of the polyhedra defined in the stored data.

10. A method according to claim 1, further comprising connecting the calculated points in the three-dimensional space representing points on the surface of the subject object to generate a 3D computer model comprising a polygon mesh representing the surface of the subject object.

11. A method according to claim 1, further comprising generating a signal conveying the 3D computer model.

12. A method according to claim 11, further comprising making a recording of the signal either directly or indirectly.

13. A storage device storing instructions for causing a programmable processing apparatus to become operable to perform a method as set out in claim 1.

14. A signal conveying instructions for causing a programmable processing apparatus to become operable to perform a method as set out in claim 1.

15. Apparatus for processing data defining a plurality of depth maps of a subject object, to generate a 3D computer model of the subject object comprising points in a three-dimensional space representing points on the surface of the subject object, the apparatus comprising:

a depth map point connector operable to process each depth map to connect points therein to generate a respective two-dimensional mesh of connected points in each depth map;

a mesh projector operable to project each two-dimensional mesh generated by the connection means into three-dimensional space in dependence upon the position and orientation in the three-dimensional space of the depth map containing the mesh and the respective depths of the points in the mesh defined by the depth map, to generate a respective polyhedron from each depth map, each polyhedron comprising a three-dimensional mesh of connected vertices defining planar faces corresponding to the two-dimensional mesh, together with planar side faces for each edge of the three-dimensional mesh; and a 3D point calculator operable to calculate points in the three-dimensional space representing points on the surface of the subject object by calculating the respective points at which a predetermined number of the planar surfaces from the polyhedra generated by the projection means intersect.

16. Apparatus according to claim 15, wherein each depth map comprises an array of pixels, and wherein the depth map point connector is arranged to divide pixels into sub-pixels and to connect sub-pixels to generate the two-dimensional mesh.

17. Apparatus according to claim 15, further comprising a vertex replacer operable to process each generated polyhedron prior to processing by the 3D point calculator, to replace each vertex in the polyhedron at which more than three planar faces meet with a plurality of vertices at each of which no more than three planar faces meet.

18. Apparatus according to claim 17, wherein the vertex replacer is arranged to define each replacement vertex to have the same position in the three-dimensional space as the vertex which it replaces.

19. Apparatus according to claim 15, wherein the 3D point calculator comprises:

a volume definer operable to define a volume of the three-dimensional space in which all points on the subject object must lie;

a volume divider operable to subdivide the volume into a plurality of volume parts; and a volume tester operable to test the volume parts against the polyhedra generated by the projection means, the volume tester being arrange to:

discard a volume part if it is wholly outside at least one of the polyhedra;

if a volume part is at least partially within all of the polyhedra, process the data defining the planar surfaces which intersect the volume part and, in dependence upon the number of planar surfaces which intersect the volume part:

subdivide the volume part into a plurality of smaller volume parts for further testing;

calculate the 3D points in the volume part at which a predetermined number of the planar surfaces meet; or discard the volume part.

20. Apparatus according to claim 19, wherein the volume tester is arranged to subdivide a volume part if the volume part is at least partially within all of the polyhedra and the number of planar surfaces which intersect the volume part is more than a predetermined number.

21. Apparatus according to claim 19, wherein the volume tester is arranged to discard a volume part if the volume part is at least partially within all of the polyhedra and the number of planar surfaces which intersect the volume part is less than a predetermined number.

22. Apparatus according to claim 19, wherein the volume tester is arranged to store data when a volume part is tested defining the planar surfaces which intersect the volume part, and is arranged to operate so that, when a smaller volume part is tested which was generated by subdivision of a parent volume part, only the planar surfaces which intersect the parent volume part are tested to determine whether they intersect the smaller volume part.

23. Apparatus according to claim 19, wherein the volume tester is arranged to store data when a volume part is tested defining each polyhedron which the volume part is determined to lie wholly inside, and is arranged to operate so that, when a smaller volume part is tested which was generated by subdivision of a parent volume part, tests are carried out to determine whether the smaller volume part lies inside each of the polyhedra not defined in the stored data, but no tests are carried out to determine whether the smaller volume part lies inside any of the polyhedra defined in the stored data.

24. Apparatus according to claim 15, further comprising a point connector operable to connect the calculated points in the three-dimensional space representing points on the surface of the subject object to generate a 3D computer model comprising a polygon mesh representing the surface of the subject object.

25. Apparatus for processing data defining a plurality of depth maps of a subject object, to generate a 3D computer model of the subject object comprising points in a three-dimensional space representing points on the surface of the subject object, the apparatus comprising:

connection means for processing each depth map to connect points therein to generate a respective two-dimensional mesh of connected points in each depth map;

projection means for projecting each two-dimensional mesh generated by the connection means into three-dimensional space in dependence upon the position and orientation in the three-dimensional space of the depth map containing the mesh and the respective depths of the points in the mesh defined by the depth map, to generate a respective polyhedron from each depth map, each polyhedron comprising a three-dimensional mesh of connected vertices defining planar faces corresponding to the two-dimensional mesh, together with planar side faces for each edge of the three-dimensional mesh; and 3D point calculation means for calculating points in the three-dimensional space representing points on the surface of the subject object by calculating the respective points at which a predetermined number of the planar surfaces from the polyhedra generated by the projection means intersect.

* * * * *